US010151596B2

(12) United States Patent
Stankoulov

(10) Patent No.: US 10,151,596 B2
(45) Date of Patent: Dec. 11, 2018

(54) CACHING MAP DATA FOR EFFICIENT VEHICLE RANGE PROJECTION

(71) Applicant: Abalta Technologies, Inc., Torrance, CA (US)

(72) Inventor: Pavel Stankoulov, San Diego, CA (US)

(73) Assignee: Abalta Technologies, Inc., San Diego, CA (US)

( * ) Notice: Subject to any disclaimer, the term of this patent is extended or adjusted under 35 U.S.C. 154(b) by 0 days.

(21) Appl. No.: 15/471,252

(22) Filed: Mar. 28, 2017

(65) Prior Publication Data

US 2017/0199047 A1   Jul. 13, 2017

Related U.S. Application Data

(62) Division of application No. 14/727,854, filed on Jun. 1, 2015, now Pat. No. 9,644,980, which is a division (Continued)

(51) Int. Cl.
*G01C 21/34* (2006.01)
*G01C 21/36* (2006.01)
*G06T 11/20* (2006.01)

(52) U.S. Cl.
CPC ..... *G01C 21/3469* (2013.01); *G01C 21/3697* (2013.01); *G06T 11/203* (2013.01); *B60L 2240/60* (2013.01); *B60L 2240/622* (2013.01); *B60L 2250/12* (2013.01); *B60L 2250/16* (2013.01); *B60L 2250/18* (2013.01); *B60L 2260/52* (2013.01); *B60L 2260/54* (2013.01);

(Continued)

(58) Field of Classification Search
CPC ............ G01C 21/3469; G01C 21/3697; G06T 11/203; G06T 2215/12; B60L 2240/60; B60L 2260/52
USPC ............................. 701/123, 409; 340/870.07
See application file for complete search history.

(56) References Cited

U.S. PATENT DOCUMENTS

| 8,332,096 B2 | 12/2012 | Riegelman et al. | |
| 2007/0219708 A1* | 9/2007 | Brasche | G01C 21/32 |
| | | | 701/457 |

(Continued)

FOREIGN PATENT DOCUMENTS

| DE | 102008037262 A1 | 5/2009 |
| DE | 102009016869 A1 | 10/2010 |

(Continued)

*Primary Examiner* — Marthe Y Marc-Coleman
(74) *Attorney, Agent, or Firm* — Genius Patent APC; Bruce Hare

(57) ABSTRACT

An automated method of caching map data for vehicle range projection using a computer system including a processor and a storage includes: retrieving, from the storage to the processor, data corresponding to an area of a map, wherein the retrieved data includes multiple links and multiple nodes; dividing, at the processor, the area of the map into a set of tiles; associating, at the processor, a portion of the retrieved data with each tile in the set of tiles; evaluating, at the processor, each particular link to determine whether the particular link spans multiple tiles from the set of tiles; and dividing, at the processor, the particular link into at least two sub-links if the particular link spans multiple tiles by adding a node at each point the particular link crosses a boundary between two tiles.

18 Claims, 33 Drawing Sheets

Related U.S. Application Data of application No. 13/924,512, filed on Jun. 21, 2013, now Pat. No. 9,121,719.

(60) Provisional application No. 61/801,011, filed on Mar. 15, 2013.

(52) U.S. Cl.
CPC ....... *G06T 2215/12* (2013.01); *Y02T 10/7291* (2013.01); *Y02T 90/16* (2013.01); *Y02T 90/161* (2013.01); *Y02T 90/162* (2013.01)

(56) References Cited

U.S. PATENT DOCUMENTS

| | | | |
|---|---|---|---|
| 2009/0204582 A1* | 8/2009 | Grandhi | G06F 17/3087 |
| 2010/0094496 A1 | 4/2010 | Hershkovitz et al. | |
| 2010/0138098 A1 | 6/2010 | Takahara | |
| 2011/0087390 A1 | 4/2011 | Pandit et al. | |
| 2011/0191388 A1 | 8/2011 | Matsunaga | |
| 2011/0241905 A1 | 10/2011 | Niwa | |
| 2012/0109408 A1 | 5/2012 | Siy et al. | |
| 2012/0134599 A1* | 5/2012 | Lee | G06F 17/30241 382/232 |
| 2012/0203459 A1* | 8/2012 | Spindler | G01C 21/32 701/533 |
| 2012/0253655 A1 | 10/2012 | Yamada et al. | |
| 2013/0006530 A1 | 1/2013 | Nishiuma et al. | |
| 2013/0147846 A1* | 6/2013 | Kalai | G06T 1/60 345/660 |
| 2014/0149372 A1* | 5/2014 | Sankar | G06F 17/30864 707/706 |
| 2014/0207363 A1 | 7/2014 | Kanno | |
| 2015/0156609 A1* | 6/2015 | Davis | H04W 4/021 455/457 |

FOREIGN PATENT DOCUMENTS

| | | |
|---|---|---|
| DE | 102011015777 A1 | 10/2012 |
| EP | 0638887 A2 | 2/1995 |
| EP | 2172740 A1 | 4/2010 |
| EP | 2589931 A1 | 5/2013 |
| EP | 2730891 A2 | 5/2014 |
| JP | 2009025128 A | 2/2009 |
| JP | 2010127678 A | 6/2010 |
| JP | 2010169423 A | 8/2010 |
| JP | 2011214894 A | 10/2011 |
| JP | 2012255757 A | 12/2012 |
| WO | 2005094462 A2 | 10/2005 |
| WO | 2008126683 A1 | 10/2008 |
| WO | 2011029562 A1 | 3/2011 |
| WO | 2011111145 A1 | 9/2011 |

* cited by examiner

CACHING MAP DATA FOR EFFICIENT VEHICLE RANGE PROJECTION

CROSS-REFERENCE TO RELATED APPLICATIONS

This application is a division of U.S. patent application Ser. No. 14/727,854, filed on Jun. 1, 2015, which issued on May 9, 2017 as U.S. Pat. No. 9,644,980. U.S. patent application Ser. No. 14/727,854 is a division of U.S. patent application Ser. No. 13/924,512, filed on Jun. 21, 2013, which issued on Sep. 1, 2015 as U.S. Pat. No. 9,121,719. U.S. patent application Ser. No. 13/924,512 claims priority to U.S. Provisional Patent Application Ser. No. 61/801,011, filed on Mar. 15, 2013.

BACKGROUND

Vehicles are ubiquitous in society. Vehicle operators do not have information that allows them to accurately determine a vehicle's range. In addition, current ways of estimating range (e.g., multiplying the remaining fuel in the vehicle by an average mileage) may suffer various inaccuracies that may alone or in combination cause significant errors between predicted and actual range.

In addition, electric vehicles (EVs) are becoming more prevalent in society. However, with limited infrastructure available, many operators of EVs may not be able to locate a charging station or determine whether the vehicle will be able to reach the station.

Therefore there exists a need for a system that is able to accurately project the range of a vehicle and provide a user-friendly map-based interface.

BRIEF SUMMARY

Some embodiments may provide a system that is able to receive data associated with a vehicle and determine at least one polygon that indicates the range the vehicle may be able to travel along any available pathway until the available fuel is exhausted.

A first exemplary embodiment of the invention provides a system adapted to determine a projected range of a vehicle. The system includes: a storage element adapted to store set of parameters associated with a vehicle; a map evaluation element adapted to retrieve information regarding a geographic area associated with a position of the vehicle; and a processing element adapted to determine the projected range of the vehicle based at least partly on the set of parameters and the retrieved information A second exemplary embodiment of the invention provides an automated method of projecting a range of a vehicle using a computer system. The method includes: retrieving map information regarding a geographic area, the map information including multiple links; generating a set of range projection links based at least partly on the retrieved information; generating a monochrome bitmap based at least partly on the set of range projection links; rendering the set of range projection links within the monochrome bitmap; and tracing the rendered links to generate a polygon outline of the range of the vehicle.

A third exemplary embodiment of the invention provides an automated method of caching map data for vehicle range projection using a computer system. The method includes: retrieving data corresponding to an area of a map; dividing the map area into a set of tiles; and associating a portion of the retrieved data with each tile in the set of tiles.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGs.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

Figure 1:
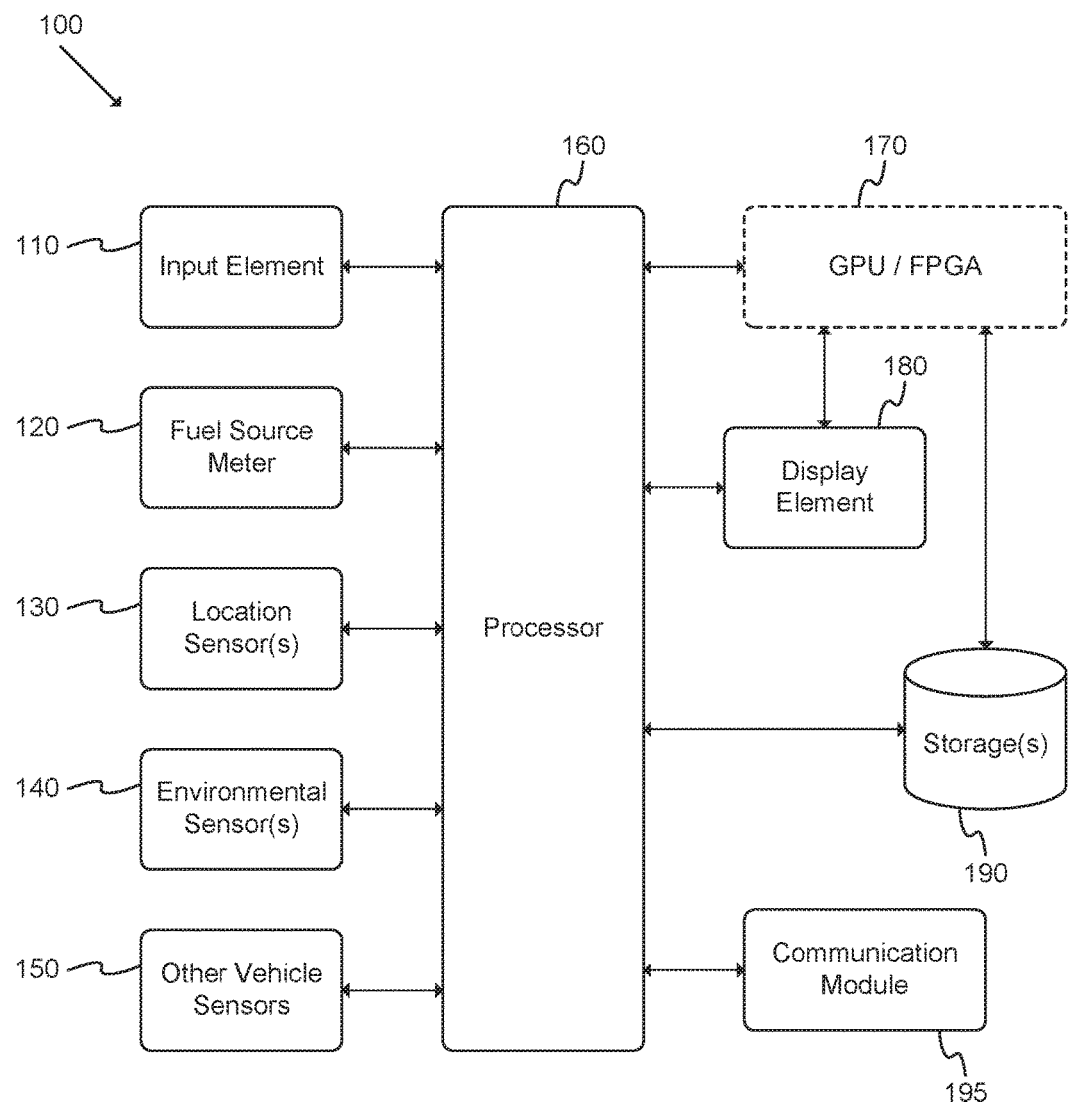
FIG. 1 illustrates a schematic block diagram of an in-vehicle system according to an exemplary embodiment the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Although various examples above and below may refer to range projections, range projection algorithms, and/or other factors associated with range, range is used as one example of the capabilities of some embodiments. In addition to (or instead of) projecting vehicle range, some embodiments may include the capability of determining a vehicle route and/or estimating vehicle emissions using the same systems, algorithms, data structures, etc. as those described above and below.

The features described above and below may be applied to various appropriate vehicles and/or types of vehicles. For instance, some embodiments may be used with "street" vehicles such as automobiles, trucks, vans, motorcycles, EVs, etc. As another example, some embodiments may be used with off-road vehicles such as snowmobiles, all-terrain vehicles (ATVs), etc. As yet another example, some embodiments may be used with various types of vessels such as personal watercraft, boats, ships, submersibles, diver propulsion devices (DPDs), etc. As another example, some embodiments may be used with various types of aircraft such as planes, helicopters, etc. As still another example, some embodiments may be used with various types of manned or unmanned vehicles such as spaceships, lunar rovers, etc.

Several more detailed embodiments of the invention are described in the sections below. Section I provides a conceptual overview of a system of some embodiments. Section II then describes various algorithms and structures used to model vehicle performance. Next, Section III describes various range projection algorithms. Section IV then describes display algorithms and GUIs of some embodiments. Lastly, Section V describes a computer system which implements some of the embodiments of the invention.

I. System Overview

Sub-section I.A provides a conceptual description of a hardware architecture of some embodiments. Sub-section I.B then describes a conceptual software architecture of some embodiments. Next, sub-section I.C describes an example GUI of some embodiments. Lastly, sub-section I.D describes various map attributes associated with some embodiments.

Various systems, components, processes, and/or other features described above and/or below may be implemented in various different ways. For instance, some embodiments may include combinations of hardware elements and software elements. As another example, various system elements may be provided by various separate devices or elements (e.g., a smartphone, a vehicle communication bus, a vehicle head unit or infotainment unit, etc.). Some embodiments may be provided as a complete on-board vehicle system, although such a system may also be able to interact with external devices if necessary or by preference. Some embodiments may include elements and/or features that may allow communication with a user (e.g., real-time feedback to a driver, download of driver performance data to a fleet supervisor, etc.) to interact with various system elements and/or features.

A. Hardware Architecture

FIG. 1 illustrates a schematic block diagram of an invehicle system 100 according to an exemplary embodiment the invention. Specifically, this figure shows various conceptual modules that may allow the system to interact with the vehicle, determine range projections, and/or interact with a user (e.g., an operator or passenger of the vehicle).

As shown, the system may include one or more input elements 110, fuel source meters 120, location sensors 130, environmental sensors 140, and/or other vehicle sensors 150. In addition, the system may include one or more processors 160, an optional graphics processing unit (GPU) and/or field programmable gate arrays (FPGA), at least one display elements 180, a set of storages 190, and optional communication (or connectivity) module 195.

Each input element 110 may allow a user to interact with the system. Such elements may include touch screens, keyboards, steering wheel controls, rotary knobs, Bluetooth or wireless links to external input devices, etc.

Each fuel source meter 120 may be able to determine an amount (and/or relative amount) of fuel available to vehicle. Such fuel source meters may measure various appropriate elements using various appropriate units, for instance, gasoline levels (e.g., in gallons, as a percentage of a full tank, etc.), battery charge levels (e.g., in Watt-hours (W-h), as a percentage of a full charge, etc.), etc. Some vehicles may include a single type of fuel source meter (e.g., a gasoline meter in a gasoline-powered vehicle, a battery charge meter in an electric vehicle, gasoline gallon equivalents (GGE) for a compressed natural gas (CNG) vehicle, etc.), while other vehicles may include multiple types of fuel source meters (e.g., a gasoline meter and a battery charge meter in a hybrid vehicle).

The set of location sensors 130 may be able to determine a position of the vehicle in various appropriate ways. Such location sensors may include, for instance, global navigation satellite system (GNSS) sensors (such as GPS, global navigation satellite systems (GLONASS), Galileo, BeiDou Satellite Navigation System (BDS), etc.), GNSS augmentation system, inertial and absolute positioning sensors (such as gyroscopes, accelerometers, speed pulse sensors, differential speed pulse, compass, etc.), radio signal positioning systems (such as Wi-Fi positioning, cell-tower triangulation, etc.), and any associated hardware and/or software.

Each environmental sensor 140 may be able to measure an appropriate environmental factor. For instance, such sensors may measure temperature (interior and/or exterior), humidity, altitude, barometric pressure, etc.

Each other vehicle sensor 150 (and/or set of sensors) may measure various other appropriate parameters that may affect the performance of a vehicle. Such parameters may include, for instance, weight of the vehicle, number of passengers, tire pressure, service history, fluid temperatures, etc.

The various elements 110-150 may each be able to receive instructions and/or data, as appropriate (e.g., over a bus, network, and/or other communication element associated with the vehicle) that may affect the operation of the elements. In some embodiments, the various elements may connect to the processor through various appropriate hardware and/or software interfaces (e.g., various cables, connectors, input modules, conversion modules (e.g., analog-to-digital, digital-to-analog, etc.), controller area network (CAN) bus, media oriented systems transport (MOST) bus, on-board diagnostics (OBD) interface, etc.).

Each processor 160 may be able to execute instructions and/or process data in various appropriate ways. The processor may be able to communicate among the other system elements, as appropriate.

Each GPU and/or FPGA 170 may provide various computing and/or display processing functionality that may allow for efficient system operation by offloading some operations that may otherwise be performed by the processor 160.

Each display element 180 may allow a user to view various outputs of the system 100. For instance, the display element 180 may display various maps, range projections, user interfaces, etc., as appropriate. In some embodiments, the display element may be combined with an input element 110 to provide a touch-screen element.

The set of storages 190 may be able to store various sets of instructions and/or data elements that may be used by various system components during operation. In addition, the storages may store map data that may be utilized by some embodiments. Such map data may be identified, retrieved, stored, and/or otherwise manipulated using the processor 160 and associated software of some embodiments.

The communication module 195 may communicate with other remote and/or local systems across one or more networks. The communication module may be able to communicate with, for instance, a smartphone, a telematics server, various web service providers, one or more in-vehicle infotainment system, etc. Such a communication module may communicate via local or global networks, as appropriate (e.g., Ethernet, Wi-Fi, Bluetooth, 3G, LTE, etc.). The system 100 may thus receive, for instance, environmental information, from remote systems, such as current or forecast weather conditions, real-time and predictive traffic conditions, etc. The system 100 may also report or send to remote servers, a smartphone, tablets, and/or other appropriate devices, estimated range, logging information, status information, a display range polygon, etc.

During operation, a user may invoke the range projection system 100 (e.g., by manipulating the input element 110). The system 100 may then monitor and/or communicate among various input elements 110-150 in order to retrieve various appropriate parameters. The processor 160 may perform various operations at least partly based on the retrieved parameters. Such operations may be at least partly based on data and/or instructions retrieved from the storage(s) 190. The processor 160 may also interact with the GPU/FPGA 170 and/or other elements to generate a visual display to be presented to a user. Such a display may be sent to the display element 180 for output.

One of ordinary skill in the art will recognize that system 100 is conceptual in nature and may be implemented in various specific ways without departing from the spirit of the invention. For instance, although the system has been described as having particular components and communication pathways, different systems may include various other components (and/or remove various components) and/or include various other communication pathways (e.g., a communication bus accessible to each of the various components).

Figure 2:
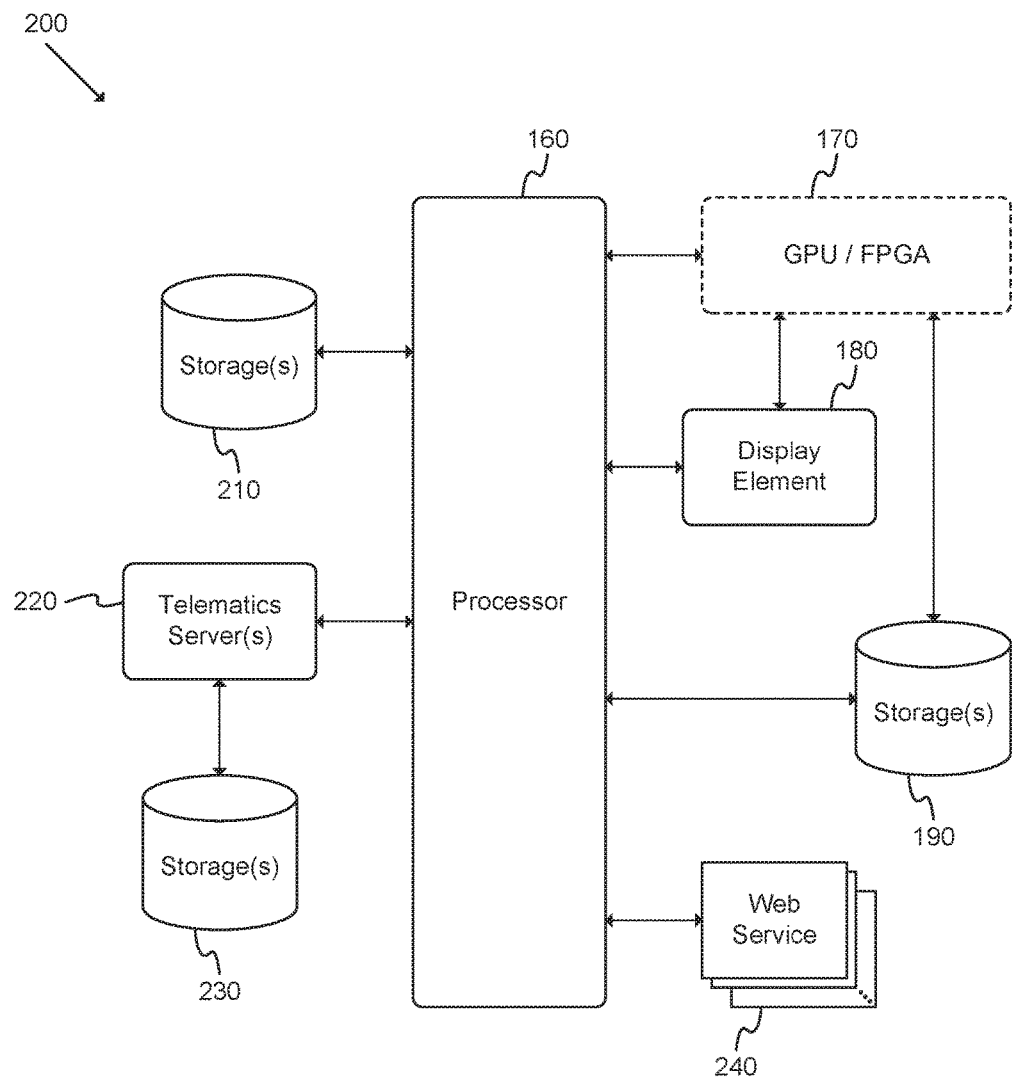
FIG. 2 illustrates a schematic block diagram of a stand-alone system of some embodiments.

FIG. 2 illustrates a schematic block diagram of a stand-alone (i.e., off-board) system 200 of some embodiments. Specifically, this figure shows the system as it may operate using offline data (e.g., log files) and/or online data (e.g., received from a vehicle in real-time). As shown, the system includes the same processor 160, GPU/FPGA 170, display element 180, and storage 190 as described above in reference to FIG. 1.

System 200 further includes a first set of storages 210, a telematics server 220, and a second set of storages 230 associated with the telematics server 220. The first set of storages 210 may include various log files that include information similar to that received from various input elements (e.g., elements 110-150 described above). The telematics server 220 may be adapted to utilize information communication technology (e.g., Internet, local area network (LAN), wireless local area network (WLAN), etc.) to interact with the system 200. The storages 230 may include various instructions and/or data that may be used by the telematics server 220.

System 200 may further interact with one or more web services 240 that may provide additional relevant information such as map data, weather conditions (historic, current and forecast), traffic information (real-time, historic, predictive), etc. Such web services may be provided by one or more third parties (e.g., via an API or other appropriate interface or resource).

During operation, data may be transformed among the storage(s) 210 and/or the telematics server 220. Such information may be used by the system 200 to operate in a similar manner to system 100 described above.

One of ordinary skill in the art will recognize that system 200 is conceptual in nature and may be implemented in various specific ways without departing from the spirit of the invention. For instance, although the system has been described as having particular components and communication pathways, different systems may include various other components (and/or remove various components) and/or include various other communication pathways (e.g., a communication bus accessible to each of the various components). In addition, although the system has been described as stand-alone, such a log-based or telematics-based system may also be provided in-vehicle or in other appropriate ways (e.g., through a user device such as smartphone, tablet, etc.).

B. Software Architecture

Figure 3:
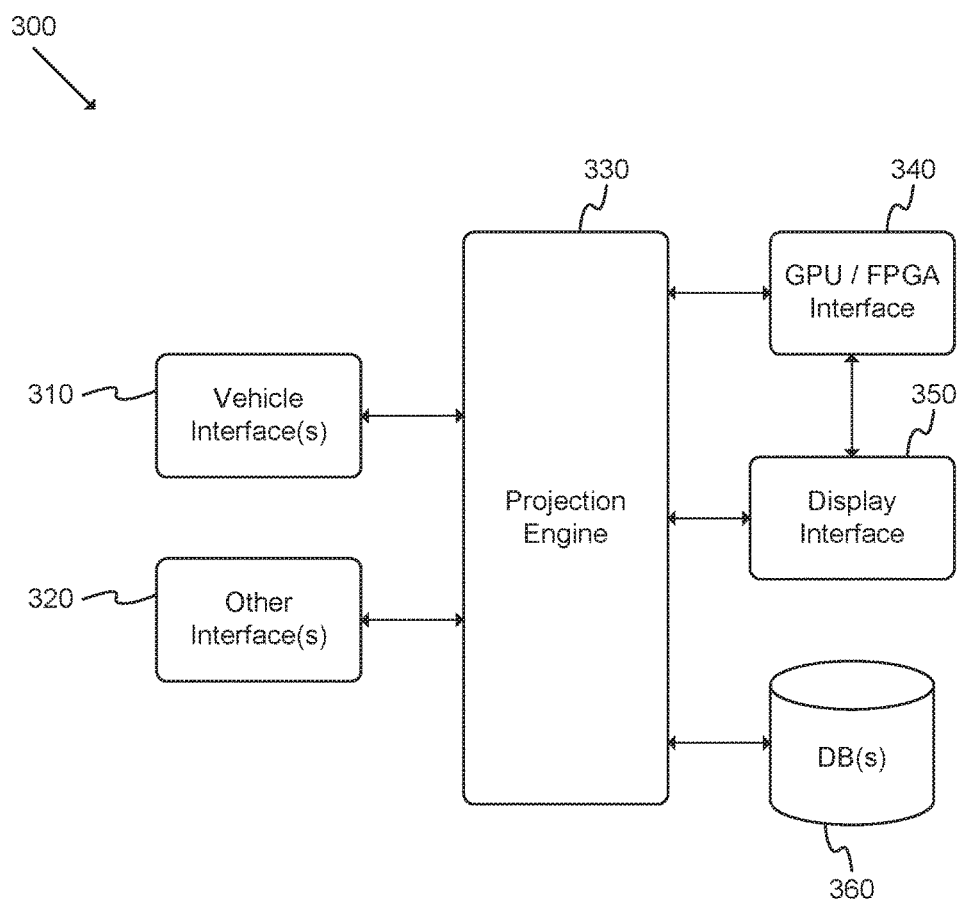
FIG. 3 illustrates a schematic block diagram of a software system of some embodiments

FIG. 3 illustrates a schematic block diagram of a software system 300 of some embodiments. As shown, the system may include one or more vehicle interfaces 310, one or more other interfaces 320, a projection engine 330, a GPU/FPGA interface 340, a display interface 350, and a set of databases 360.

Each vehicle interface 310 may be able to communicate between the processor 160 and one or more input devices (e.g., input elements 110-150 described above). Each other interface 320 may be adapted to communicate with one or more other elements and/or systems (e.g., a device such as a smartphone, a vehicle navigation system, etc.).

The projection engine 330 may send and receive data and/or instructions among various other system elements, as appropriate. The engine may be able to perform various calculation algorithms (e.g., range projection, route calculation, emissions estimation, etc.) to determine associated projections and/or generate various user interfaces to represent the determined projections.

The GPU/FPGA interface 340 may allow the projection engine 330 to communicate among one or more GPUs and/or FPGAs, as appropriate. The display interface 350 may allow the system to provide display data to a visual display (e.g., a vehicle head unit, a smartphone screen, etc.). The databases 360 may include various data elements associated with the operation of various system components of some embodiments (e.g., map databases, vehicle profiles, topographic information, etc.).

During operation, the projection engine 330 may receive data from the various input interfaces 310-320, process the received data (where the processing may be based at least partly on data received from the DBs 360). The data processing may be at least partially performed by passing data across the GPU/FPGA interface 340 to associated GPU(s) and/or FPGA(s). The processed data may be provided to the display interface 350 in a manner that allows the associated display to provide the data to a user.

System 300 may be implemented using various combinations of client applications (i.e., applications that run on client devices), server applications (i.e., applications that run on one or more remote server devices), etc. In addition, such a system may be implemented using various combinations of hardware elements (e.g., a smartphone, a vehicle head unit, a server, etc.).

One of ordinary skill in the art will recognize that system 300 is conceptual in nature and may be implemented in various specific ways without departing from the spirit of the invention. For instance, although the system has been described as having particular components and communication pathways, different systems may include various other components (and/or remove various components) and/or include various other communication pathways (e.g., a communication bus accessible to each of the various components). In addition, although the projection engine 330 has been described as a single element, different embodiments may include various different sub-elements (e.g., a polygon calculation engine, an environment evaluation engine, etc.).

C. Example Graphical User Interface

Figure 4:
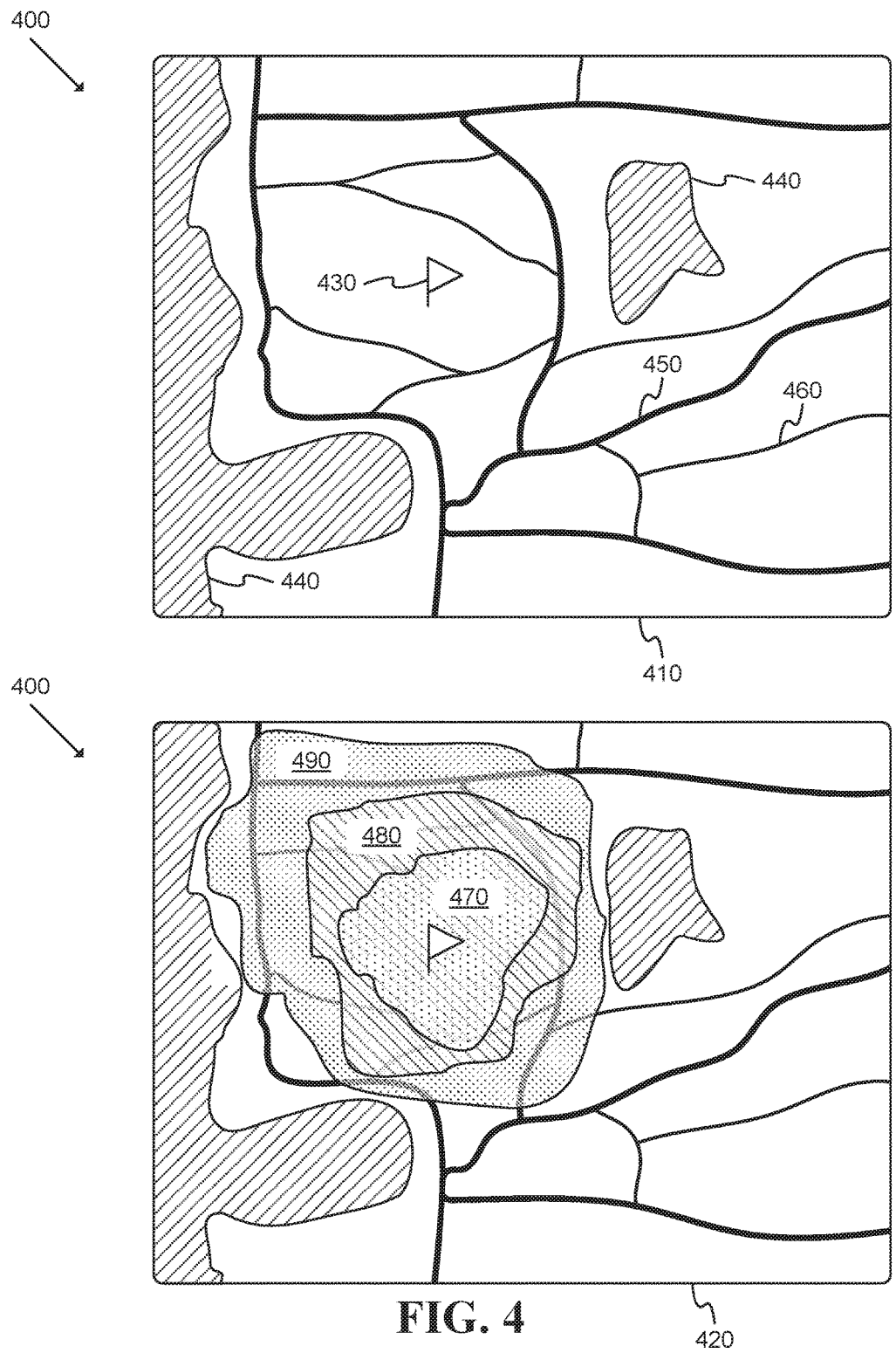
FIG. 4 illustrates various example graphical user interfaces (GUIs) provided by some embodiments.

FIG. 4 illustrates a display area 400 capable of displaying various example graphical user interfaces (GUIs) 410-420 provided by some embodiments. The display area 400 may be provided by one or more appropriate visual display elements (e.g., element 180).

As shown, a first GUI 410 may display, in the display area 400, a set of graphical elements. Such elements may represent, for example, a vehicle position 430, a restricted area 440 (i.e., areas the vehicle cannot reach or is restricted from reaching, such as lakes, parks, bays, military bases, etc.), one or more major roadways 450, and/or one or more minor roadways 460.

A second GUI 420 may display an indication of an area 470 indicating the range associated with fifty percent of available fuel (or some other threshold and/or parameter), an area 480 indicating the range associated with seventy-five percent of available fuel, and an area 490 indicating the range associated with one hundred percent of available fuel.

As described below, various ranges may be displayed in various appropriate ways. For instance, some embodiments may differentiate among the ranges 470-490 using different colors, shading patterns or densities, etc.

One of ordinary skill in the art will recognize that GUIs 410-420 are conceptual in nature and may be implemented in various specific ways without departing from the spirit of the invention. For instance, although the GUIs have been described as having particular visual components and features, different GUIs may include various other components (and/or remove various components) and/or include various other features.

D. Map Attributes

Various map attributes may be used by the algorithms applied by various elements of some embodiments. For instance, some embodiments may utilize length (e.g., the length between two shape points, the length of a link, etc.), speed (e.g., speed limit information, average speed for a road category, etc.), slope and/or height (e.g., elevation information associated with each shape point, incline or decline gradient associated with the shape point, etc.), road curvature, traffic patterns (e.g., historic traffic speed, actual traffic speed, etc.), type of roadway (e.g., "level 1" or major roadways, "level 2" or secondary roadways, etc.), and/or other elements.

Figure 5:
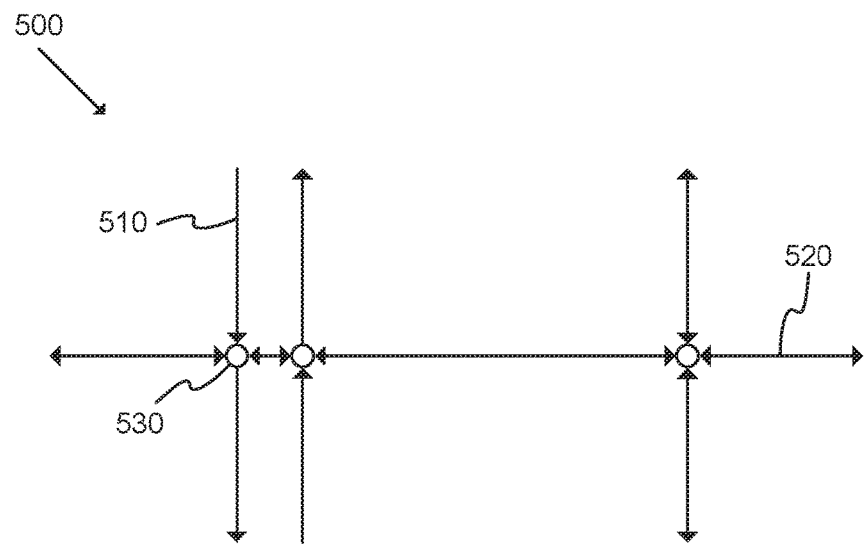
FIG. 5 illustrates a conceptual map having vehicle segments based on an example road structure.

FIG. 5 illustrates a conceptual map 500 having vehicle segments 510-520 based on an example road structure. In this example, some vehicle segments are one-way 510, while other segments are two-way 520. Segments may be defined as uninterrupted stretches of road where the relevant attributes are the same (e.g. speed, road class, etc.) among physical features such as intersections, crosswalks, traffic lights, stop signs, etc. In this example, open circles 530 are used to designate segment nodes (e.g., traffic lights, intersections, etc.).

Figure 6:
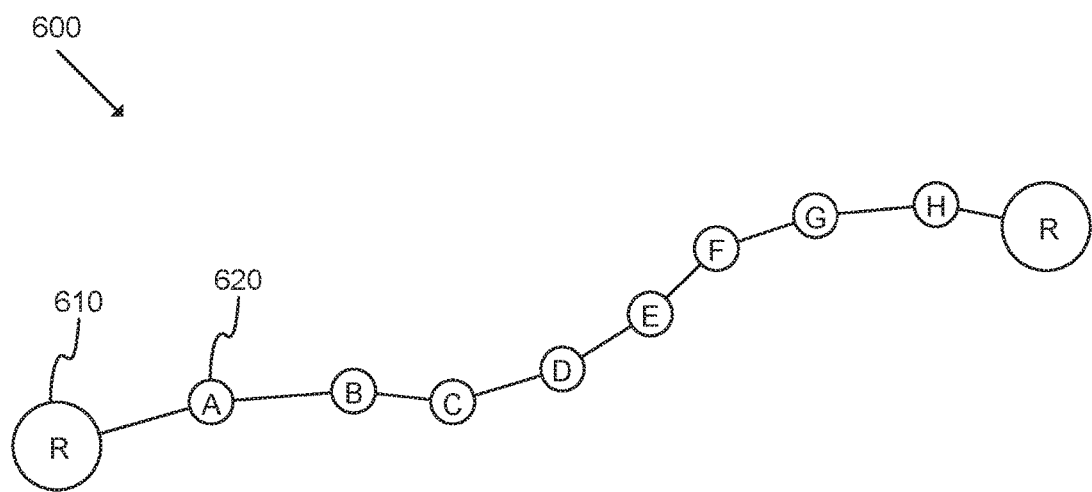
FIG. 6 illustrates a link having end points and multiple ordered shape points.

FIG. 6 illustrates a link (or "segment") 600 having end points (or "nodes") 610 and multiple ordered shape points 620. In this example, a first node (or "reference node") 610 may be a start point for the link. The second node may be an end point for the link. A link may include various attributes (e.g., road class, posted speed limit, average speed, length, number of lanes, direction of travel, etc.). In addition to two nodes 610, the link may include a number of ordered shape points 620, which may include the world coordinates of the shape point (longitude and latitude), elevation, and/or other appropriate shape point attributes such as slope, curvature, heading, etc. In this example, the shape points proceed from left to right (and from 'A' to 'H', alphabetically). When stored in a database or in memory, the shape point coordinates may be represented as absolute coordinates, relative coordinates (delta), approximated with a curve (e.g. a spline), etc. and may be compressed using standard compression methods.

Each segment (and/or shape point) may have various appropriate attributes. For instance, each segment may be associated with one or more directions (e.g., a natural direction, a travel direction, etc.). A natural direction of a segment (or "link") may be based on the order of shape points in the link. Some mapping databases may order points from left to right (or west to east) and top to bottom (or north to south), for instance.

A travel direction of a link may be defined in various appropriate ways (e.g., none or no travel allowed, positive or travel is allowed in a positive natural direction, negative or travel is allowed in a negative natural direction, travel is allowed in positive and negative directions, etc.).

One of ordinary skill will recognize that the map structures of FIGS. 5-6 may be implemented in various different ways without departing from the spirit of the invention. For instance, different embodiments may have different numbers of points included in each link. As another example, different embodiments may include various other features or types of roadways (e.g., multi-lane roads such as freeways, toll roads, etc.).

Figure 7:
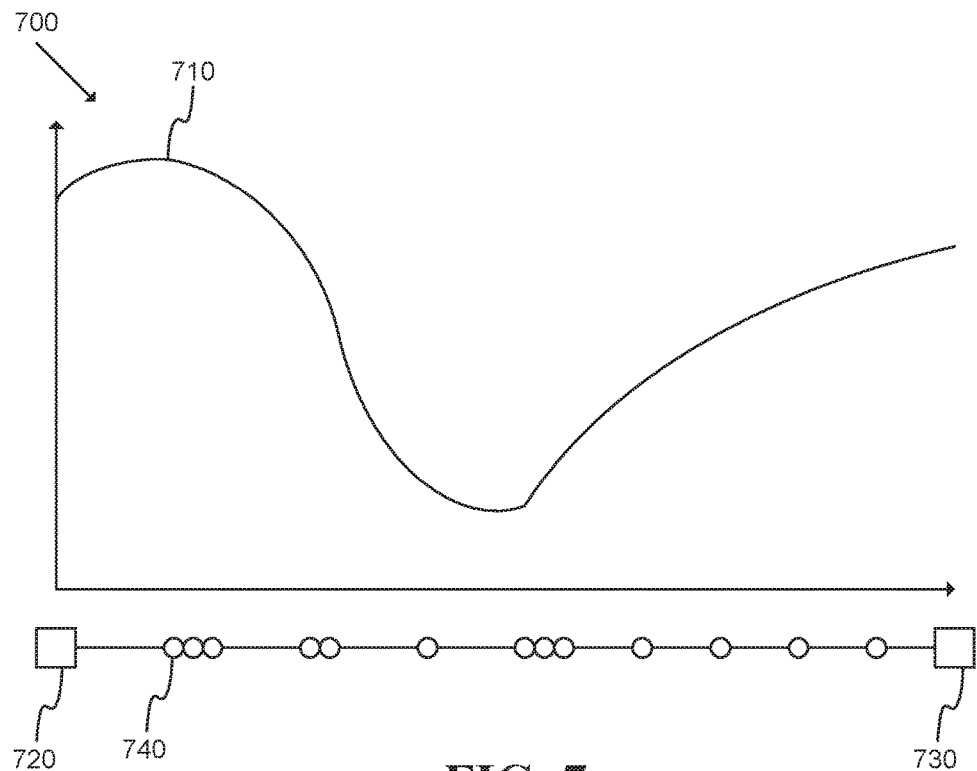
FIG. 7 illustrates an x-y plot representing a set of shape points and associated slope of a path, as used by some embodiments.

FIG. 7 illustrates an x-y plot 700 representing a set of shape points and associated slope of a path 710, as used by some embodiments. The x-y plot 700 shows elevation versus linear distance in this example. As shown, path 710 may begin at point 720 and extend to point 730. Various shape points 740 may be included along the path 710. Each shape point may include an angle of slope at that point and may define the topography of the path 710 from start 720 to finish 730.

Different embodiments may define shape points in various different ways (e.g., each shape point may be associated with a particular elevation, each shape point may define a change in slope based on a previous shape point, etc.).

Figure 8:
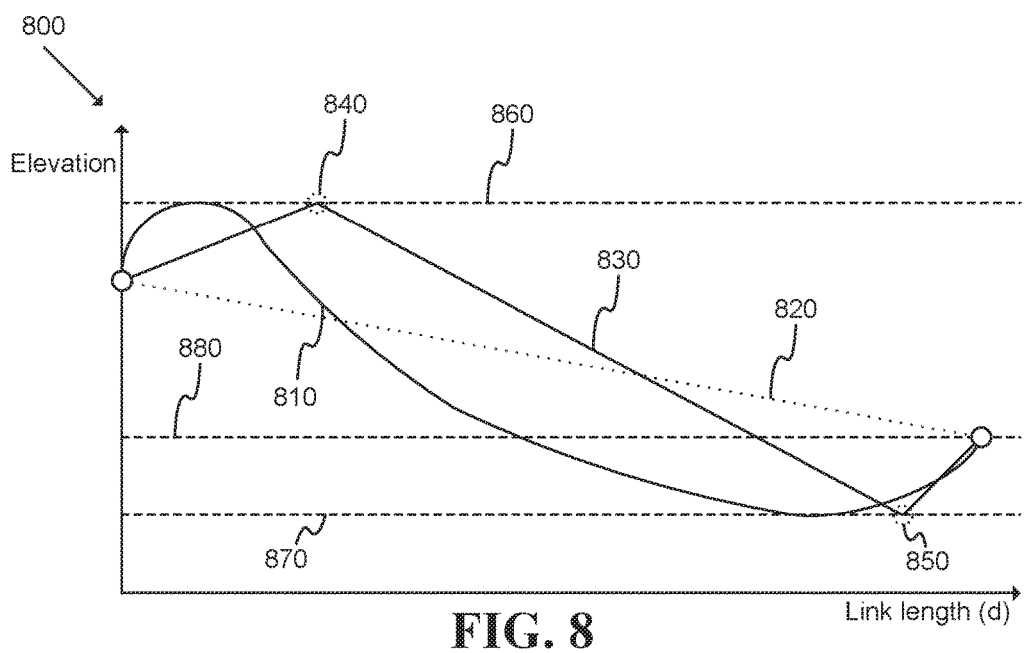
FIG. 8 illustrates an x-y plot associated with an algorithm used to approximate the slope of a path.

FIG. 8 illustrates an x-y plot 800 associated with an algorithm used to approximate the slope of a path. The plot depicts distance along the x-axis and elevation along the y-axis. As shown, the plot includes an actual path 810 (and associated slope information), a straight-line approximated path 820, an improved approximated slope path 830 with a maximum inflection point 840 and minimum inflection point 850, a maximum height 860, a minimum height 870, and a current height 880.

In some embodiments, the maximum inflection point 840 (represented as a value along the x-axis of plot 800) may be calculated as the product of the link distance (or length) and the difference between the maximum height 860 and the current height 880 divided by the difference between the maximum height 860 and the minimum height 870. Likewise, in some embodiments, the minimum inflection point 850 (represented as a value along the x-axis of plot 800) may be calculated as the product of the link distance and the difference between the current height 880 and the minimum height 870 divided by the difference between the maximum height 860 and the minimum height 870.

As shown in FIG. 8, such an approach to approximating slop may yield improved results over a straight-line approximation.

II. Vehicle Modeling

Sub-section II.A provides a conceptual description of basic cost modeling provided by some embodiments. Sub-section II.B then describes a vehicle profile of some embodiments. Next, sub-section II.C provides a conceptual description of a system that implements basic vehicle modeling in some embodiments. Sub-section MD then describes adaptive cost modeling of some embodiments. Next, sub-section ILE provides a conceptual description of a system that implements basic vehicle modeling in some embodiments. Lastly, sub-section II.F describes estimation of vehicle emissions.

Vehicle "costs" may include various elements (e.g., energy usage, fuel usage, driving time, driving distance, etc.). Thus some embodiments may determine not only whether a particular route is within an energy usage range but may determine whether a particular destination is within a time threshold.

A. Basic Cost Modeling

Different cost models may include various different parameters and may be associated with various measurable criteria. Such criteria may not be measurable (and/or otherwise known) in all cases and may thus be assumed or otherwise ascertained. In addition, different particular embodiments may include different sets of operating criteria. Such criteria may include, for instance, air resistance, vehicle weight, incline and/or altitude, speed, traffic features (e.g., stop signs, traffic lights, etc.), turn cost (e.g., deceleration and acceleration associated with a typical turn), real-time traffic (e.g., traffic congestion on a hot day may cause an air conditioner to use a disproportionate amount of energy versus normal conditions), driving style, road curvature, etc.

Some embodiments may calculate an energy cost, $E_C$, using equation (1) below, where $E_C$ is the energy cost in W-h, $E_{link}$ is the energy cost to traverse a link (in W-h), and $E_{node}$ is the cost, in W-h, to proceed from the link to a connected link (e.g., by making a turn).

$$E_C = E_{link} + E_{node} \tag{1}$$

A link cost may be calculated at least partly based on the energy needed to traverse a given stretch of road (i.e., the running resistance). The main factors in determining the running resistance may include rolling resistance of the road, aerodynamic drag, and climbing resistance.

The running resistance, $F_W$, may be calculated, in Newtons, using equation (2) below, where $F_{Ro}$ is the rolling resistance in Newtons, $F_L$ is the aerodynamic drag in Newtons, and $F_{St}$ is the climbing resistance in Newtons.

$$F_W = F_{Ro} + F_L + F_{St} \tag{2}$$

The rolling resistance, $F_{Ro}$, may be calculated, in Newtons, using equation (3) below, where $f$ is a coefficient of rolling resistance (set to an appropriate value, e.g., 0.009, 0.010, 0.011, etc.), m is the vehicle mass in kilograms (m may include the curb weight of the vehicle, passenger weight, and any other loads, where passenger weight and other loads may be estimated if unknown), g is a gravitational acceleration constant in meters per second squared), and θ is the gradient angle of the road in radians.

$$F_{Ro} = f \cdot m \cdot g \cdot \cos(\theta) \tag{3}$$

The aerodynamic drag, $F_L$, may be calculated, in Newtons, using equation (4) below, where $\rho$ is air density in kg per meter cubed (e.g., 1.202 kg/m³ at an altitude of two hundred meters above sea level), $c_w$ is a drag coefficient and may be based at least partly on a parameter associated with a vehicle profile, A is the largest cross-sectional area of the vehicle in meters squared and may be based on a parameter associated with a vehicle profile, v is the vehicle speed in meters per second, and $v_o$ is the headwind speed in meters per second (which may be set to zero when not known).

$$F_L = 0.5 \cdot \rho \cdot c_w \cdot A \cdot (v+v_o)^2 \quad (4)$$

The climbing resistance, $F_{St}$, may be calculated, in Newtons, using equation (5) below, where m is the vehicle mass in kilograms (m may include the curb weight of the vehicle, passenger weight, and any other loads, where passenger weight and other loads may be estimated if unknown), g is a gravitational acceleration constant in meters per second squared), and θ is the gradient angle of the road in radians.

$$F_{St} = m \cdot g \cdot \sin(\theta) \quad (5)$$

The running resistance, $F_W$, may be converted to a road energy cost, $E_{road}$, using equation (6) below, where d is the distance traveled in meters (d may be derived from the length of a link, the distance between shape points, etc.).

$$E_{road} = F_W \cdot d / 3600 \quad (6)$$

Road energy may be calculated by substituting equations (3), (4) and (5) into equation (2) and then into (6), resulting equation (7) below.

$$E_{road} = m \cdot (g \cdot d/3600) \cdot (f \cdot \cos(\theta) + \sin(\theta)) + A \cdot (0.5 \cdot \rho \cdot c_w \cdot v^2 \cdot d)/3600 \quad (7)$$

Equation (7) may be rewritten as equations (8)-(10) below.

$$E_{road} = m \cdot C_R + A \cdot C_A, \text{ where} \quad (8)$$

$$C_R = (g \cdot d/3600) \cdot (f \cdot \cos(\theta) + \sin(\theta)); \text{ and} \quad (9)$$

$$C_A = (0.5 \cdot \rho \cdot c_w \cdot v^2 \cdot d)/3600 \quad (10)$$

The road energy cost coefficient, $C_R$, may then be applied to any vehicle by multiplying the coefficient by the vehicle mass to calculate the actual energy value. Likewise, the air drag energy cost coefficient, $C_A$, may be applied to any vehicle by multiplying the coefficient by the vehicle cross section area A to calculate the actual energy value. The link energy, $E_{link}$, may be calculated as the value of a road energy, $E_{road}$, over the link distance.

In some embodiments, the road energy cost coefficient and the air drag energy cost coefficient may be pre-calculated for each road link and stored with a map database. This may allow for a more efficient runtime implementation of the algorithm.

The energy cost of a stop, $E_{stop}$, may be calculated, in W-h, using equation (11) below, where $E_{acc}$ is the energy used during vehicle acceleration and may be calculated using equation (12) below, and $E_{regen}$ is the energy returned to the vehicle during regenerative braking (when available) and may be calculated using equation (13) below. In equation (12), $P_{max}$ is the maximum motor power of the vehicle in Watts (and may be derived from a vehicle profile parameter), t is the acceleration time in seconds, and v is the velocity of the vehicle. In some embodiments, the acceleration time, t, may be approximated by multiplying v by an acceleration coefficient (that may be derived from a vehicle profile parameter). In equation (13), $c_{regen}$ is the regeneration coefficient (which may be derived from a vehicle profile parameter). Some embodiments may include other coefficients (e.g., a coefficient associated with loss from gear power).

$$E_{stop} = E_{acc} - E_{regen} \quad (11)$$

$$E_{acc} = P_{max} \cdot t(v)/3600 \quad (12)$$

$$E_{regen} = (c_{regen} \cdot m \cdot v^2/2)/3600 \quad (13)$$

A node cost may be calculated in various different ways depending on the type of node and/or other factors associated with the node (e.g., traffic density, speed limit, etc.).

The node cost, $E_{node}$, for a stop sign, for instance, may be calculated using equation (14) below, where $E_{stop}$ is the energy cost of a stop calculated using equation (11) above, for instance.

$$E_{node} = E_{stop} \quad (14)$$

The node cost, $E_{node}$, for a traffic light, for instance, may be calculated using equation (15) below, where p is the probability of encountering a red light (e.g., thirty percent).

$$E_{node} = p \cdot E_{stop} \quad (15)$$

The node cost, $E_{node}$, for all other cases may be calculated using equation (16) below, where $E_{trans}$ represents the cost of transition from one link to another when going straight or at a slight angle, α is the turn angle, φ is the minimum angle threshold that may be used to identify a turn, and $E_{t\_norm}$ is the energy consumed for a "normal" turn (e.g., a right turn in right-hand traffic countries, a left turn from a one-way road, etc.). $E_{trans}$ may be set to zero if the speeds of the connected links are the same or may be calculated as $E_{acc}$ ($v_2 - v_1$) if the speed of the second link ($v_2$) is greater than the first ($v_1$), or may be calculated as $E_{regen}$ ($v_1 - v_2$) if the speed of the second link is less than the first.

$$E_{node} = E_{trans}, \text{ if } \alpha < \phi \quad (16)$$
$$= E_{t\_norm}, \text{ if right turn}$$
$$= E_{stop}, \text{ if left turn}$$

(16)

The normal turn cost, $E_{t\_norm}$, may be calculated using equation (17) below, where $v_1$ is the speed of the current (or "from") link, $v_2$ is the speed of the next (or "to") link, and $v_s$ is the safe speed to take the turn and may be calculated based on the critical speed to make the turn using centripetal acceleration equation (18) below, where $R_v$ is the turn radius for the vehicle (and may be derived from a vehicle profile parameter) and ff is the friction factor between tires and roadway and may be set to a minimum expected value (e.g., 0.3). In cases where the safe speed, $v_s$, exceeds the link speed ($v_1$ or $v_2$), the associated energy component (e.g., $E_{acc}$ or $E_{regen}$) may be set to zero.

$$E_{t\_norm} = E_{acc}(v_2 - v_s) - E_{regen}(v_1 - v_s) \quad (17)$$

$$v_s = \sqrt{(g \cdot R_v \cdot \text{ff})} \quad (18)$$

The link cost, $E_{link}$, and node cost, $E_{node}$, described above may be calculated using vehicle dynamics and may represent mechanical energy. However, a vehicle will have a fuel source (e.g., gasoline tank, battery, etc.) that may store energy in a different form (e.g., electrical energy). Thus, the stored energy may need to be converted to mechanical energy. As one example, equation (19) below may be used to calculate the electrical energy, $E_e$, needed by an EV to produce a given amount of mechanical energy, $E_m$, where PTE(v) is a powertrain efficiency factor (that may be derived from various vehicle profile parameters, as described below).

$$E_e = E_m / \text{PTE}(v) \quad (19)$$

The energy cost, $E_e$, may be converted to a fuel quantity (e.g., for a gasoline powered vehicle) by dividing the energy cost by an appropriate conversion factor. In some embodiments, all cost calculations may be performed using mechanical energy values. Thus, any input energy cost, $E_e$, should be reduced by the powertrain efficiency factor, PTE (v), as shown below in equation (20).

$$E_{cost} = E_e \cdot \text{PTE}(v) \quad (20)$$

The powertrain efficiency factor, PTE(v), may be calculated as shown below in equation (21), where v is velocity and a, b, c, and d are parameters of the function. If a more accurate representation is desired a higher degree polynomial may be used. The polynomial function may be calculated from initially known vehicle powertrain data points (that can be obtained from the vehicle manufacturer or determined empirically) and interpolated into an n-degree polynomial function using an appropriate method (e.g., least square).

$$\text{PTE}(v) = av^3 + bv^2 + cv + d \quad (21)$$

Some embodiments may represent the powertrain efficiency (and/or other appropriate variables) as a table. Such a table may be used to store empirical data (e.g., a powertrain efficiency value and an associated speed) and be used to generate values using linear approximations among the empirical data points. Such an approach may allow for efficient and easy implementations that reduce the amount of computation and/or memory needed to determine various values (e.g., powertrain efficiency).

Some embodiments may store such table data using a dictionary (or "map") where the key is speed (e.g., as measured in km/h) and the value is a corresponding efficiency. Alternatively, the table may be implemented as a sorted array of speed and efficiency factor pairs.

When an efficiency factor is needed for a given speed, the nearest value may be found using binary search and then a linear approximation may be used to calculate the needed intermediate value.

To improve runtime efficiency, some embodiments may format the table to have a fixed set of speeds (e.g., for every integer value from zero to one hundred and sixty km/h), each with a corresponding efficiency value, where each efficiency value is pre-calculated. Such an approach results in an array of elements, where the index is the speed and the value is the efficiency factor. Accuracy may be improved by increasing the number of elements in the array. When an efficiency value for a given speed is needed at runtime, a quick index lookup for the closest value may be performed.

Some embodiments may include an additional field for each element that indicates whether the value is interpolated or derived empirically. Such a field may be implemented as, for instance, a Boolean flag.

Some embodiments may include a timestamp for each element that represents when the value was updated in the table (and may also represent whether a value was interpolated or derived empirically). Such a timestamp may be, for example, a number of minutes or days from a predefined start time. The availability of the timestamp may allow the approximated values to be recalculated based on new empirical values being added. The timestamp may be used to provide a weight in such a calculation (e.g., newer values may be weighted more than the older values).

Although the various calculation algorithms, equations, parameters, coefficients, constants, etc., of sub-section II.A may have been described with reference to various specific details, one of ordinary skill in the art will recognize that different embodiments may be implemented in various different ways. For instance, different embodiments may use different units (e.g., miles instead of km in for vehicles intended to be operated in the United States). As another example, some embodiments may include additional calculations based on various other parameters, factors, etc., than those described above. For instance, some embodiments may optimize cost prediction using the adaptive cost model described below in reference to sub-section II.D.

B. Vehicle Profile

A vehicle profile may be a data structure (e.g., an object) that may store various parameters associated with a vehicle. Such parameters may include, for instance, mass (or weight), drag coefficient, cross-section area, maximum motor power, acceleration coefficient (e.g., the amount of time needed to achieve a one meter per second increase in velocity), brake regeneration efficiency coefficient, drivetrain efficiency coefficient, and/or other appropriate parameters.

The parameters included in the vehicle profile may include default units and/or values that may be used when vehicle-specific data is not available and/or not appropriate.

C. Basic Cost Modeling System

Figure 9:
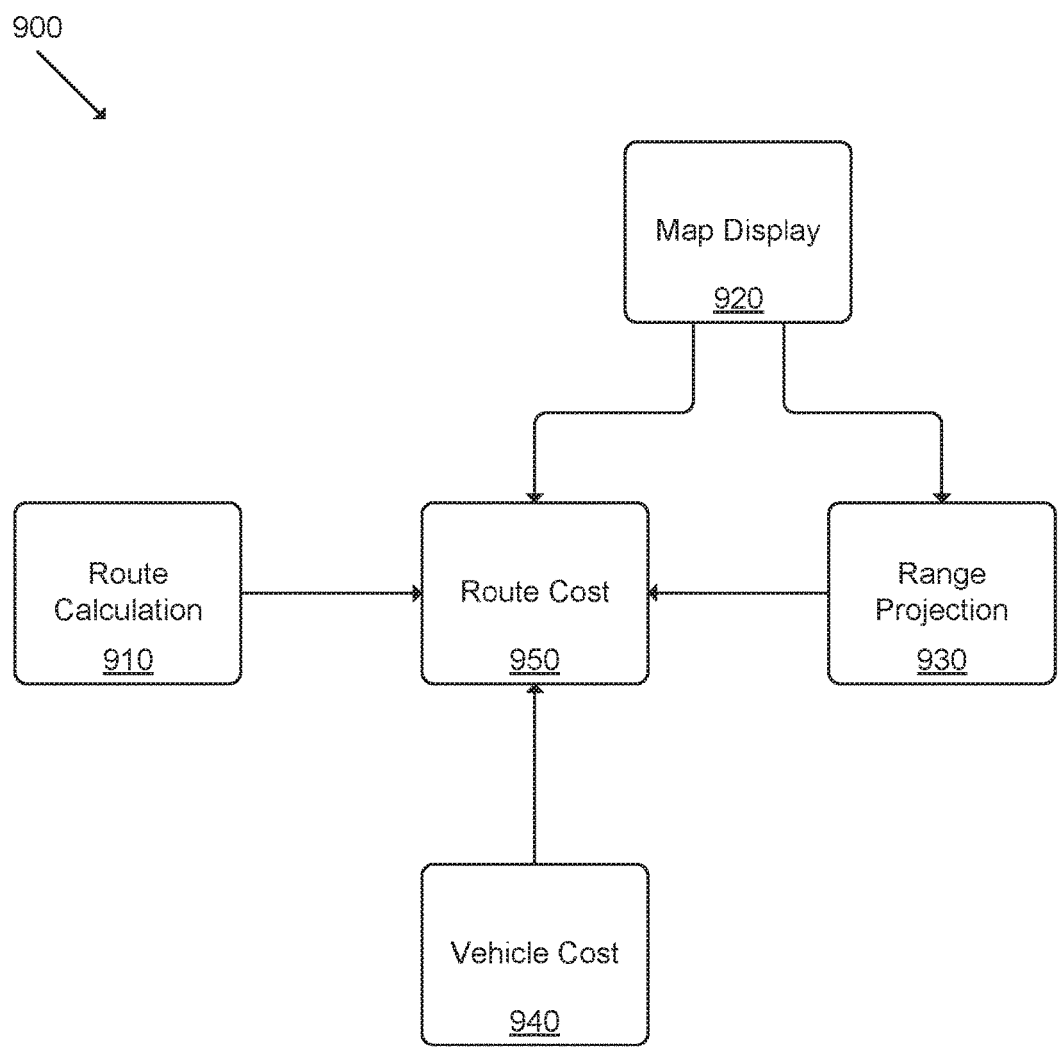
FIG. 9 illustrates a schematic block diagram of a system that uses a vehicle cost model of some embodiments.

FIG. 9 illustrates a schematic block diagram of a system that uses a vehicle cost model 900 of some embodiments. As shown, the system (or "engine") may include a route calculation element (or "module") 910, a map display element 920, a range projection element 940, a vehicle cost element 940, and a route cost element 950.

In some embodiments, the route calculation module 910 may be adapted to identify various potential routes available to a vehicle. Such routes may be identified in various appropriate ways (e.g., by reviewing roadways, intersections, etc. in areas of a map toward which a vehicle is proceeding, by receiving navigation information associated with a vehicle and/or route, etc.). The route calculation module may use the route cost element 950 to calculate optimal routes with minimum energy usage (energy efficient routes), multi-cost routes where the routes is optimized by one parameter (e.g., time) and bounded by another (e.g., energy, routing via charge stations, etc.).

The map display module 920 may be adapted to receive cost information and associate the information with a section of a map being rendered for display. The range projection module 930 may evaluate data received from other modules (e.g., available fuel, slope, distance, temperature, etc.) and determine ranges along particular paths that may be available to a vehicle. The vehicle cost module 940 may be adapted to provide information related to the cost of operating a vehicle under various conditions. The vehicle cost module may be adapted to provide cost information associated with operating various types of vehicles (e.g., gasoline-powered, hybrid vehicles, EVs, CNG vehicles, etc.) under various types of operating conditions. The route cost module 950 may be adapted to provide calculation cost classes. Cost implementations may be provided for standard routing modes (e.g., fastest, shortest, most energy efficient, etc.).

One of ordinary skill in the art will recognize that system 900 is conceptual in nature and may be implemented in various different ways without departing from the spirit of the invention. For instance, various other modules, storages, interfaces, etc. may be included in some embodiments. In addition, various modules may be omitted in some embodiments.

Various map attributes may be utilized when calculating vehicle cost. For instance, some embodiments may use length (e.g., length in meters of a link), speed (e.g., speed limit information, average speed, etc.), slope, curvature (which may be provided as a circle radius associated with each shape point), stop signs, traffic lights, and/or other signaling elements, and/or traffic pattern information.

D. Adaptive Cost Modeling

In some embodiments, a single generic adjustment factor, $f_{GA}$, may be calculated as shown below in equation (22), where $e_B$ is a basic energy efficiency of a vehicle as calculated using the basic energy model described above in sub-section II.A, and $e_A$ is the actual energy efficiency factor of the vehicle as received (or calculated) by the system or entered by a user.

$$f_{GA} = e_A/e_B \quad (22)$$

Such a factor may be especially useful for systems where there is no direct feedback from the engine, but the system reports its average fuel or energy use. For example, some electric vehicles report the average W-h usage per mile. This information may be passed to the system or the user may enter the information using one or more appropriate GUIs.

The factor may then be applied to the basic model calculation as shown below in equation (23), where $E_{eBasic}$ is the energy cost calculated using the basic vehicle model and $E_{eActual}$ a refined calculation based on the adjustment factor $f_{GA}$.

$$E_{eActual} = E_{eBasic} \cdot f_{GA} \quad (23)$$

Use of a generic adjustment factor may allow for a basic approximation of the performance to be expected from an actual vehicle. However, such a factor may not be able to account for all performance variables (e.g., driving style, specific vehicle characteristics, etc.). In some embodiments the generic adjustment factor may be based at least partly on other variables (e.g., weather, trip length, etc.).

The generic factor may be used for various vehicle types (e.g., electric, gasoline, etc.) that have on-board computer systems that monitor average fuel efficiency. Such a parameter encompasses driving style and specific vehicle characteristics. For many vehicles, the actual energy usage for a given trip (or overall) can be retrieved directly from a vehicle bus (e.g., CAN, MOST, OBD, etc.).

Some embodiments implement a more accurate adaptive modeling technique that may utilize a number of separate factors, take road structure into account, and/or distinguish among vehicle, trip and/or driver specific factors.

In some embodiments, such a multi-factor adaptive model may be implemented as shown below in equation (24), where $E_{eBasic}$ is the energy, in W-h, calculated using the basic vehicle model, $E_{eActual}$ is a refined calculation based on the multi-factor adjustment, $f_V(V)$ is the vehicle factor, $tf_V(V)$ is the trip vehicle factor, $f_{DS}(v, FC, W, G_s)$ is the driver style factor, $E_{Acc}(T°, t)$ is the energy consumed by accessories (e.g., air conditioner, heater, etc.) as a function of temperature and travel time, $f_{Acc}(T°)$ is the accessory usage factor as a function of temperature, and $tf_{Acc}(T°)$ is the trip accessory usage factor as a function of temperature.

$$E_{eActual} = E_{eBasic} \cdot f_V(V) \cdot tf_V(V) \cdot f_{DS}(v,FC,W,G_s) + E_{Acc}(T°,t) \cdot f_{Acc}(T°) \cdot tf_{Acc}(T°) \quad (24)$$

The driver style factor, $f_{DS}(v, FC, W, G_s)$ may be a function that determines the efficiency factor of the current driver based on various parameters. Such parameters may include, for instance: v, or the speed associated with a stretch of road, where different drivers may have different acceleration and/or deceleration profiles; FC, or the functional road class, W, or weather condition, $G_S$, or slope, and/or other appropriate factors.

The functional road class, FC, may allow for a number of road classes (e.g., highways or freeways, major roads, local roads, etc.). Depending on the road class drivers may behave differently. On a highway, a driver may be more likely to speed, for example, while on local roads there could be more instances of sudden braking or acceleration. The functional class may to some degree be reflected by the speed condition, but the assignment of distinct classes may allow for a more accurate representation. Each class may be represented by, for instance, a different value (e.g., integers from one to five, where one indicates highways and freeways, two indicates major roads, etc.).

The weather condition, W, may be a number that represents specific environmental conditions from among a predefined set of possibilities (e.g., "sunny" or one, "raining" or two, "snowing" or three, etc.). The weather condition may be based at least partly on information received from vehicle sensors (e.g., temperature, wiper status, defroster status, etc.), and/or information received from one or more external sources (e.g., a web service that provides current information and/or forecasts, emergency weather alert systems, etc.).

The gradient slope, $G_S$, may be a number that represents a grade level of the road slope as obtained from, for example, a map database. For efficiency, the gradient may be defined as a limited number of discrete grade levels (e.g., "flat" or zero, "low grade" or one, "medium grade" or two, "high grade" or three, etc.). Alternatively, the gradient may be defined as a slope, percentage rise, and/or other appropriate ways.

One of ordinary skill in the art will recognize that the various driver-specific (and/or vehicle-specific) variables described above may not include all combinations of variables that may be included in some embodiments. For instance, various other variables, conditions, parameters, etc. than those mentioned may be included (e.g., time of day, visibility, historical information regarding a section of a roadway, etc.) in a similar way to the existing elements (i.e., using a limited number of discrete levels to quantify each element). Such variables may be applied in various different ways (e.g., using a look-up table, based on one or more linear or non-linear functions, etc.).

Because $f_{DS}$ is a multi-parameter function $f_{DS}$, and/or other multi-parameter functions, may be broken into separate tables (or functions), as appropriate. For instance, some embodiments may utilize a combined driving style function that is implemented as a one-dimensional array based on speed. In some embodiments, such a combined driving style function may be used when information for actual (and/or specific) conditions is limited or non-existent. Some embodiments may represent the driving style as an array of functions, each functions based on a different set of variables (e.g., road class, weather, gradient, etc.), which may be indexed by a set of variables (e.g., speed).

In some embodiments, a multi-parameter function may be evaluated by using a set of input variables to find a corresponding table. The nearest empirical value in the table for a particular variable (e.g., input speed) may be found (i.e., the nearest speed for which a factor has previously been recorded). Next, the drive style factor may be selected, depending on whether there is a previously recorded factor for similar conditions and/or how close the previously recorded factor was to the current speed. If the absolute difference between the recorded factor speed and current speed is less than a minimum threshold (e.g., 10 km/h), a linear approximation from a look-up table may be returned. Alternatively, if the absolute difference is greater than the minimum threshold and less than a maximum threshold (e.g., 20 km/h), the factor may be calculated as a linear combination of the combined factor and the multi-parameter factor. If the absolute difference is greater than the maximum threshold, then the combined factor may be used.

The driving style factor function may be updated dynamically at every road link. This factor may be calculated for each stretch of road (or road link) where the speed (from, for instance, a map database) is the same and the slope grade is the same. The basic energy model described above in sub-section II.A above may be used to calculate a cost for the given stretch of road using the expected speed from the map database and including the current vehicle factor. The result may be compared to the energy efficiency reported by the vehicle for that stretch of the road. The difference may be used to update the driving style factor function. The combined driving style function and the function for the specific road conditions (e.g., taking into account road class, weather, slope factor, etc.) may be updated as appropriate.

Some embodiments may divide the single driving style factor into multiple factors and include the factors in the energy calculation at the link and node level instead of the overall energy calculation. One example is a link adjustment factor that may be based at least partly on one or more variables (e.g., speed, climbing resistance, road class, weather condition, slope, etc.).

Another example is a starting stopping factor that may be based at least partly on the speed from which to stop and the target speed to which to accelerate after the stop. Such a factor may be a scalar value that is constantly updated or be a function of two speeds (e.g., speed from which to stop and speed to accelerate to). The factor may be applied to each node (or intersection) energy cost calculation. The factor may be calculated from a vehicle in use every time a stop is detected and the estimated energy use may be compared to the consumed energy reported by the vehicle.

Still another example is an intersection turn factor that may be at least partly based on a turn angle. Such a factor may reflect how aggressively a driver turns at intersections and may be applied to nodes where a vehicle is expected to make a right or left turn. The factor may be calculated at intersections in real time based on the estimated energy use and the actual use reported by the vehicle.

E. Adaptive Cost Modeling System

Figure 10:
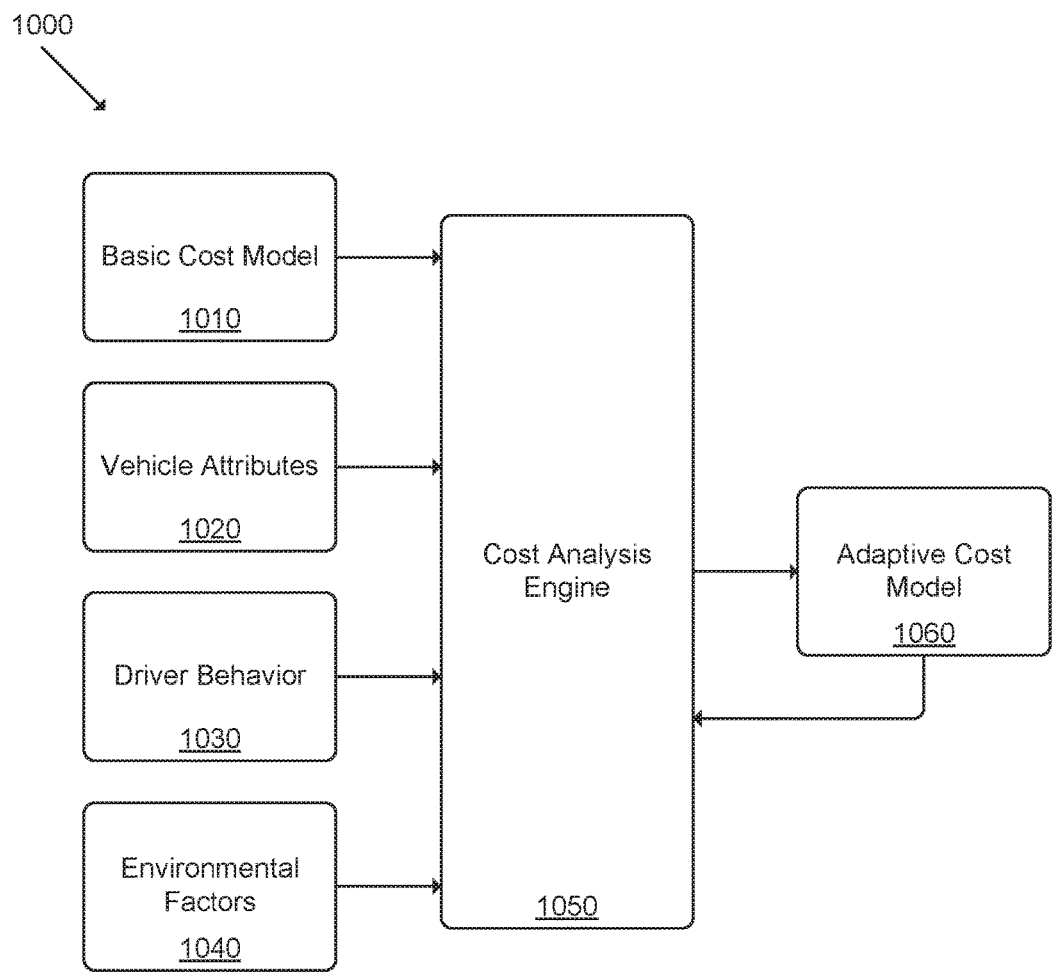
FIG. 10 illustrates a schematic block diagram of a conceptual system used to perform adaptive modeling in some embodiments.

FIG. 10 illustrates a schematic block diagram of a conceptual system 1000 used to perform adaptive modeling in some embodiments. As shown, the system may include a basic cost model element 1010, a vehicle attributes element 1020, a driver behavior element 1030, and environmental factors element 1040, a cost analysis engine 1050, and an adaptive cost model element 1060.

The basic cost model 1010 may include modeling information that is not specific to any particular driver or vehicle (e.g., the algorithms described above in sub-section II.A may use a generic basic cost model). The vehicle attributes element 1020 may include information that is specific to a particular vehicle and/or vehicle type. For instance, some vehicle attributes may be associated with types or models (e.g., a fleet of delivery vans may include a single make and model of vehicle) such as curb weight, maximum engine power, etc. Other vehicle attributes may be associated with a particular vehicle (e.g., maintenance information, historic mileage data, etc.). The driver behavior element 1030 may include information related to various vehicle drivers (e.g., speed behavior, stopping and acceleration profiles, etc.). The environmental factors element 1040 may include information related to various appropriate environmental factors (e.g., temperature, humidity, etc.).

The adaptive cost model 1060 may include information related to a specific vehicle, driver, specific environmental conditions, and/or other appropriate elements. The cost analysis engine 1050 may be adapted to process information received from the other elements in order to refine the adaptive cost model 1060.

As one specific example, the adaptive cost model 1060 may initially use a mileage estimate associated with the basic cost model 1010 (e.g., a default mileage estimate). The adaptive cost model 1060 may be updated with an improved mileage estimate based on various vehicle attributes 1020 (e.g., specified mileage for the vehicle type, historic mileage for the actual vehicle, etc.), driver attributes 1030 (e.g., a particular driver may typically accelerate relatively quickly, thus reducing mileage, especially under stop and start driving conditions), environmental factors 1040 (e.g., mileage may vary depending on temperature, elevation, etc.), and/or the adaptive cost model 1060 itself (e.g., a historic mileage value may be updated based on mileage obtained on the current journey).

One of ordinary skill in the art will recognize that system 1000 is conceptual in nature and may be implemented in various different ways in different embodiments. For instance, different embodiments may include different specific elements. As another example, various components may be combined in some embodiments and/or various components may be divided into sub-components in some embodiments.

Figure 11:
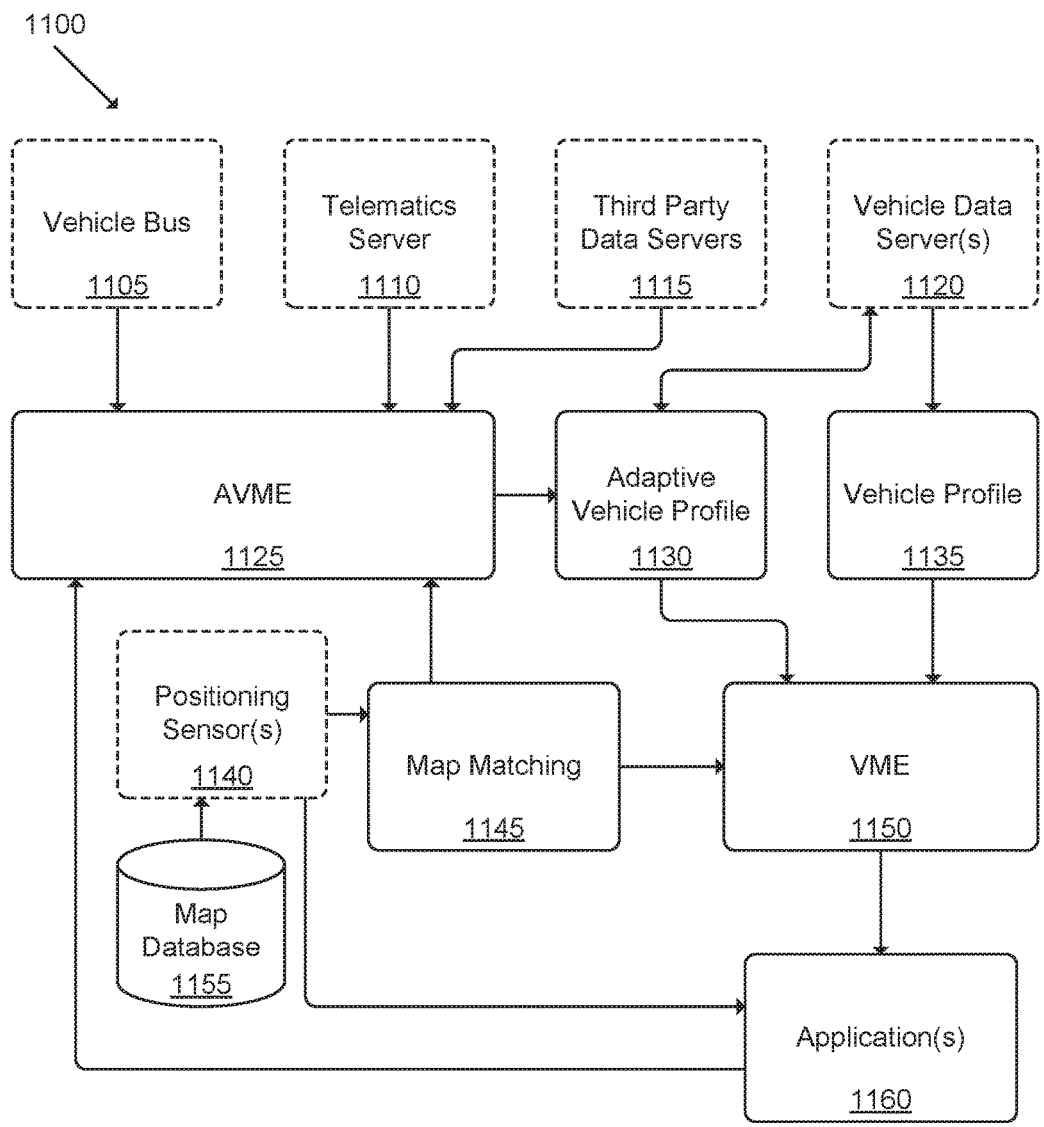
FIG. 11 illustrates a schematic block diagram of an online/offline system used to perform adaptive modeling in some embodiments.

FIG. 11 illustrates a schematic block diagram of an online/offline system 1100 used to perform adaptive modeling in some embodiments. As shown, the system may include a vehicle bus 1105, a telematics server 1110, third party data servers 1115, vehicle data servers 1120, an adaptive vehicle model estimator (AVME) 1125, an adaptive vehicle profile 1130, a vehicle profile 1135, various positioning sensors 1140, a map matching module 1145, a vehicle model estimator (VME) 1150, a map database 1155, and one or more applications 1160. In some embodiments the components represented with dashed lines may be external the system 1100 (e.g., the vehicle bus 1105, telematics server 1110, third party data servers 1115, vehicle data servers 1120, and positioning sensors 1140). In some embodiments, the positioning sensors may be replaced by one or more vehicle logs, thus permitting offline analysis.

A real-time vehicle estimation system (RTVES) of some embodiments may include the solid-line components of system 1100 (i.e., the internal components used in both online and offline situations). The RTVES may include hardware and/or software that uses real-time vehicle information and some form of vehicle modeling for various purposes (e.g. route calculation, range projection, safety, emission estimation, etc.). The RTVES may be included in an on-board black box inside the vehicle, application inside an infotainment unit, a smartphone application, etc. The RTVES may receive vehicle information directly from the vehicle bus, through a telematics server, and/or from other appropriate sources. The RTVES may also receive positioning information from the vehicle and/or sensors on the device itself The AVME 1125 may be responsible for calculation of the adaptive vehicle profile 1130. The AVME 1125 may use real-time vehicle data from the vehicle bus 1105, the telematics server 1110, and/or other appropriate resources. The AVME 1125 may compare the estimated vehicle model returned by the VME 1150 (that is based on the static vehicle profile) with data read from the vehicle. The AVME 1125 may then calculate and update the adaptive vehicle profile 1130. The AVME 1125 may use the positioning sensors 1140, the map matching module 1145 and the map database 1155 to determine if the data can be used to calculate the adaptive vehicle values and, if so, how. The AVME 1125 may use various adaptive algorithms of some embodiments.

In addition to the input from the vehicle, the AVME may receive input from the applications 1160, where a user may enter specific preferences or values reported by the vehicle to help adjust the adaptive vehicle profile 1130. This ability may, for example, be used to set a single generic factor from a smartphone application that is not connected to the vehicle in any way.

The adaptive vehicle profile 1130 may be a file or local database that is able to store parameters specific to the current vehicle as calculated by the AVME 1125. The profile 1130 may be uploaded to the vehicle data servers 1120 for aggregation and storage. The profile 1130 may also be downloaded from the servers 1120 upon system startup.

The VME 1150 may calculate the vehicle model estimates based on the static vehicle profile 1135 and dynamic adaptive vehicle profile 1130. The VME 1150 may utilize information from the positioning sensors 1140, the map matching module 1145 and/or the map database 1155 to estimate various vehicle parameters along the road, such as energy use, fuel use, emissions, etc. The VME 1150 may use basic and/or adaptive energy models. The VME 1150 may also be used by various sets of applications 1160.

The vehicle profile 1135 may be a file or a database that includes static vehicle information based on the manufacturer information for the selected vehicle make, model and year. The vehicle profile 1135 may be used to develop the basic energy model of some embodiments.

The applications 1160 represent different kinds of modules or applications running on the RVES that may use the VME 1150. The applications 1160 may provide route calculation, range projection, emissions estimations, and/or other appropriate functions.

The map matching module 1145 may receive positioning sensor 1140 data and determine where on the road network (as returned by the map database 1155) the vehicle is located. This information may be used by the AVME 1125, VME 1150 and/or applications 1160.

The map database 1155 may include information related to the road network around the vehicle. The map database may include road connectivity, road attributes (such as speed, road class, etc.), information about stop signs, traffic lights, etc.

The vehicle bus 1105 may be a sub-system that provides access to vehicle sensors and internal computers. The RTVES may connect to the vehicle bus via, for example, an OBD port, directly via CAN, MOST or other vehicle bus interface, and/or other appropriate ways.

The telematics server 1110 may communicate with a telematics unit (TU) in the vehicle. The telematics server may receive real-time vehicle information and provide a web services application programming interface (API) to the RTVES.

The positioning sensors 1140 may include various positioning sensors available to the RTVES. The positioning sensors may include GNSS sensors (such as GPS, GLONASS, Galileo, BDS, etc.), GNSS augmentation system, inertial and absolute positioning sensors (such as gyroscopes, accelerometers, speed pulse sensors, differential speed pulse, compass, etc.), radio signal positioning systems (such as Wi-Fi positioning, cell-tower triangulation, etc.), and any associated hardware and/or software. The positioning sensors may be available on the vehicle through a vehicle bus (e.g., CAN, MOST, etc.), or those available on the infotainment unit, or even the sensors from the user's smartphone if the application is used in the car.

The vehicle data server 3420 may be used to manage the vehicle profiles 1130-1135. The vehicle data server 3420 may be able to aggregate the adaptive profiles and run analysis and provide feedback to the driver or update the static information for a given vehicle type.

The third party data servers 1115 may provide additional environmental information that can be used for vehicle modeling, such as weather conditions, temperature, etc.

One of ordinary skill in the art will recognize that system 1100 is conceptual in nature and may be implemented in various different ways without departing from the spirit of the invention. For instance, various different components may be included, various illustrated components may be omitted, etc.

F. Emission Estimation

Figure 12:
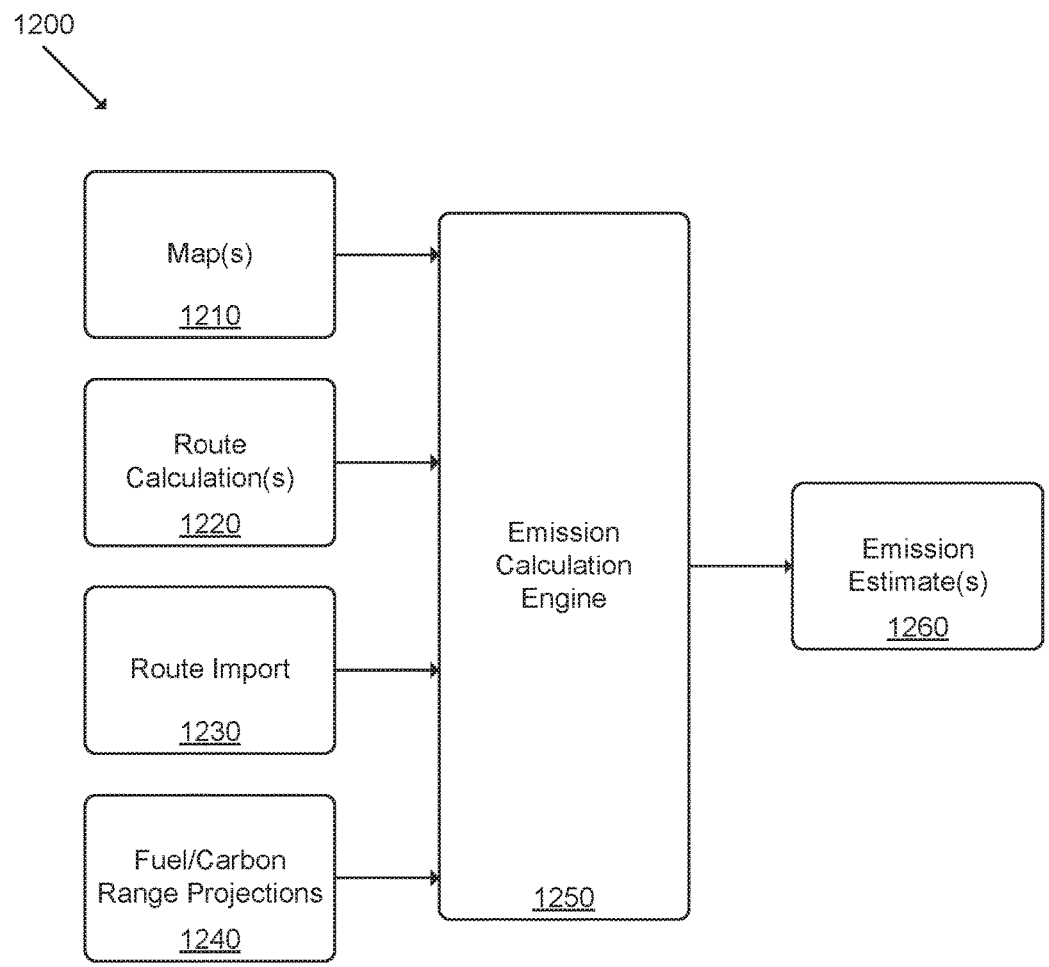
FIG. 12 illustrates a schematic block diagram of a system used to generate vehicle emissions estimates in some embodiments.

FIG. 12 illustrates a schematic block diagram of a system 1200 used to generate vehicle emissions estimates in some embodiments. As shown, the system may include map elements 1210, route calculation elements 1220, a route import module 1230, fuel (and/or carbon) range projection elements 1240, an emission calculation engine 1250, and one or more emission estimate elements 1260.

Such a system 1200 may be implemented as an on-board system adapted to provide real-time feedback and/or to calculate values based on driver behavior, current engine condition, and/or other relevant real-time factors. The system may be able to assist in meeting reporting standards and/or emissions caps.

The map elements 1210 may each include information related to various geographic areas (e.g., elevation, stop/start points, real-time traffic, speed, etc.). The route calculation elements 1220 may include various sets of links, shape points, and/or other appropriate types of route information. The route import module 1230 may be able to process and/or format various routes such that the data is able to be manipulated in an efficient way by the emission calculation engine 1250. The fuel range projections 1240 may include data representing various polygons, distances, and/or other appropriate measures of range.

The emission calculation engine 1250 may be adapted to receive various appropriate types of information and generate one or more emission estimates 1260. In some embodiments, emissions estimate calculations may be performed using equation (21) below, where $Q_f$ is the fuel quantity needed to produce the needed mechanical energy, $E_m$. $E_m$ is the mechanical energy required to traverse a given link. The mechanical energy may be determined using the various algorithms, systems, and models (including the adaptive model) described above. Such factors may include idle energy (e.g., time when a vehicle is running and stopped). GGE is the gasoline gallon equivalent and defines the number of Watt-hours able to be generated from one gallon of fuel. TE(v) is the thermal efficiency of the vehicle motor based on speed (which may be derived from a table, modeled as a function and included in the vehicle profile).

$$Q_f = E_m / (GGE \cdot TE(v)) \qquad (21)$$

Some embodiments may provide emissions estimates (e.g., using a system such as system 1200) using a web service API. Such an API may allow third parties to integrate back-end elements. Various features described above may be provided, such as route calculation (e.g., by calculating an energy efficient route, estimated fuel consumption (EFC), estimated trip emissions (ETE), etc.), route import (e.g., by supporting import of various file types for an existing route and generating EFC and/or ETE values), trail import (e.g., based on real track data), carbon or fuel range projections (e.g., based on extending range projection algorithms to calculate range based on $CO_2$ emissions or a specified amount of fuel, as a range per dollar, etc.).

One of ordinary skill in the art will recognize that system 1200 is conceptual in nature and may be implemented in various different ways without departing from the spirit of the invention. For instance, various different components may be included, various illustrated components may be omitted, etc.

III. Projection Algorithms

Sub-section III.A provides a description of conceptual data structures used by some embodiments. Next, sub-section III B describes the basic range projection algorithm of some embodiments. Sub-section III.C then describes a multi-stage projection algorithm of some embodiments. Next, Sub-section III.D then describes a fan-out algorithm of some embodiments. Sub-section III.E then describes a center-out algorithm of some embodiments. Next, sub-section III.F then describes a bitmap-based algorithm of some embodiments. Sub-section III.G then describes handling of restricted areas by some embodiments. Lastly, sub-section III.H describes data caching and retrieval algorithms used by some embodiments.

The data structures and algorithms described below may be implemented, alternatively and/or conjunctively, using systems such as those described above in reference to FIGS. 1-3 or below in reference to FIG. 37, and/or other appropriate systems. Various processes may be performed at various appropriate times (e.g., during compilation of software and/or data, at run-time, etc.).

A. Data Structures

Figure 13:
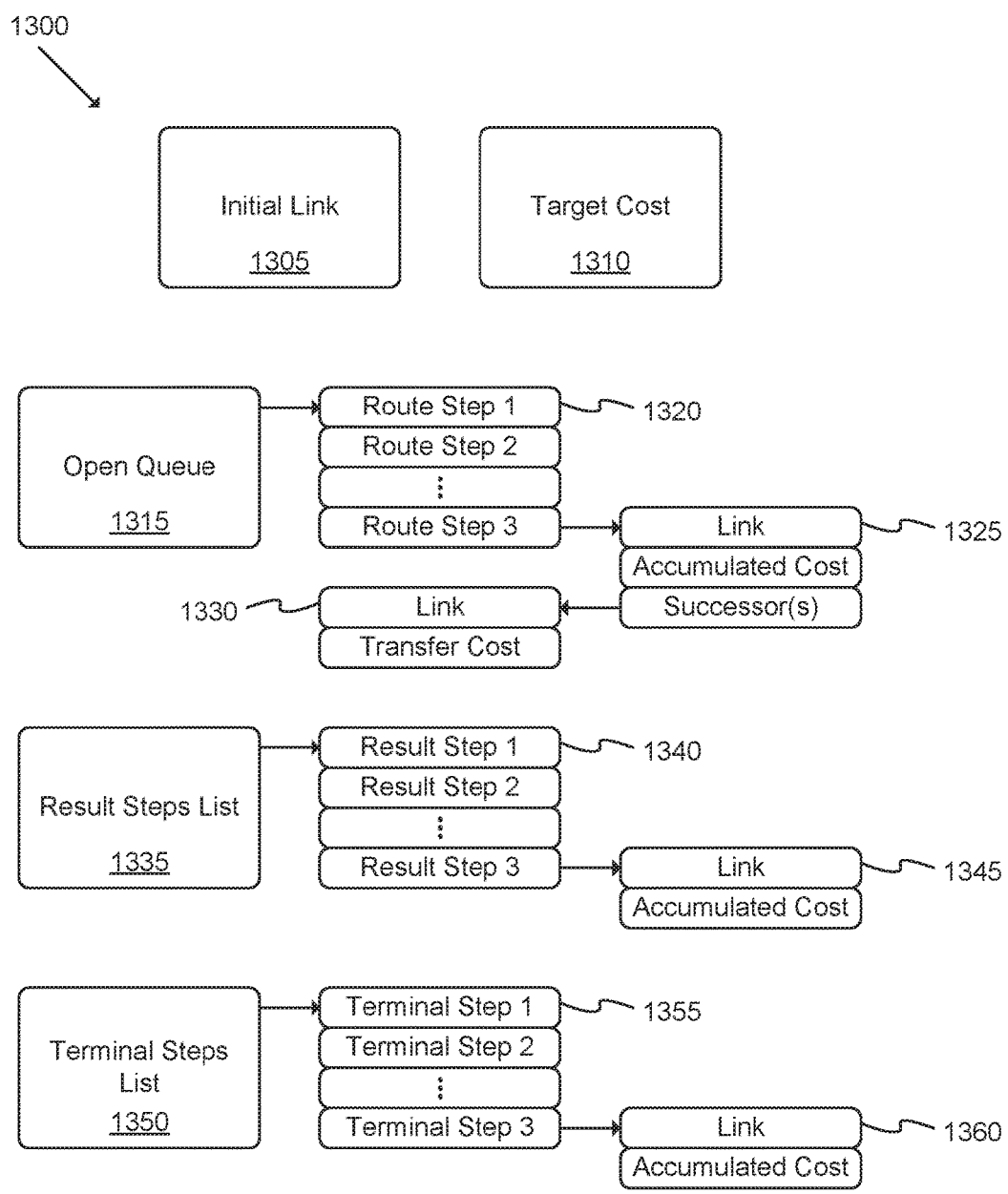
FIG. 13 illustrates a data structure diagram of a conceptual set of data structures used by some embodiments.

FIG. 13 illustrates a data structure diagram 1300 of a conceptual set of data structures used by some embodiments. Such data structures may be associated with a basic range projection in some embodiments. As shown, the data structures may include an initial link 1305, a target cost 1310, an open queue 1315 that may refer to a set of route steps 1320, each of which may refer to a set of sub-elements 1325 that may include further sub-elements 1330, a result steps list 1335 that may refer to a set of result steps 1340, each of which may refer to various sub-elements 1345, and a terminal steps list 1350 that may refer to a set of terminal steps 1355, each of which may refer to various sub-elements 1360.

In some embodiments, the initial link 1305 and target cost 1310 may be provided when a range projection is requested. Such elements may be included in an appropriate request. The open queue 1315 may include a list of route steps 1320 that is sorted by cost. Each route step may refer to various sub-elements 1325 such as a link (which may itself refer to sets of nodes and/or shape points) or set of links, an accumulated cost associated with a path that includes the route step, a list of successor routes (if any), and/or other sub-elements. Each successor route may refer to various sub-elements 1330 such as a link and a transfer cost (and/or cost to traverse) associated with the link and relative to the link associated with the predecessor route step.

Each result step 1340 may include various sub-elements 1345 (e.g., a link, an accumulated cost, etc.). The result steps may be used to define a range polygon in some embodiments. Each link may include references to one or more nodes, shape points, and/or other appropriate sub-elements (not shown).

Each terminal step 1355 may include various sub-elements 1360 (e.g., a link, an accumulated cost, etc.). The terminal steps may be used to define the boundaries of a range polygon in some embodiments. Each link may include references to one or more nodes, shape points, and/or other appropriate sub-elements (not shown).

The result steps list 1335 may refer to all accessible links (i.e., links that are within range). The terminal steps list 1350 may refer to terminal links (i.e., links where the target cost is reached, dead-end links, and/or other links that don't have successors).

In some embodiments, each terminal step 1355, result step 1340, and/or route step 1330 may include a sub-element (not shown) that refers to a direction of travel. In this way, some embodiments may determine the nodes, associated with each link, that define the outer boundary of a range projection area.

Figure 14:
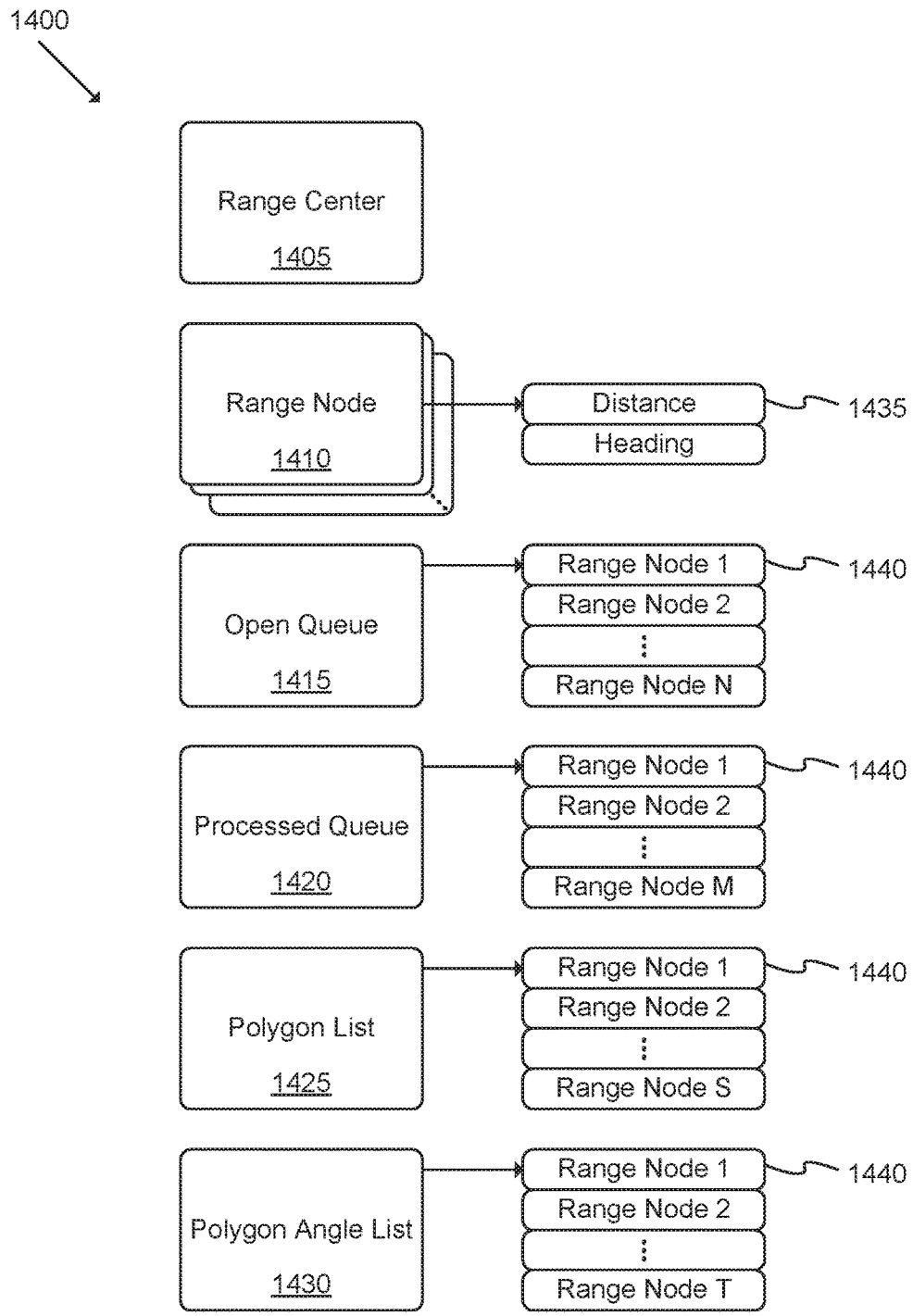
FIG. 14 illustrates a data structure diagram of a conceptual set of data structures used by some embodiments in a center-out implementation.

FIG. 14 illustrates a data structure diagram 1400 of a conceptual set of data structures used by some embodiments in a center-out implementation. As shown, the data structures may include a range center element 1405, multiple range nodes (or shape points) 1410, an open queue 1415, a processed queue 1420, a polygon list 1425, and a polygon angle list 1430.

Each range center element 1405 may include data representing a center of a projection range (e.g., current vehicle position) and may include data formatted in various appropriate ways (e.g., polar coordinates, x/y coordinates, etc.).

Each range node 1410 may include various sub-elements 1435 such as distance, heading, etc. The open queue 1415 may include a set of range node references 1440 to range nodes that have not yet been evaluated. The processed queue 1420 may include a set of range node references 1440 to range nodes that have already been processed. The polygon list 1425 may include a set of range node references 1440 referring to range nodes that are included in a particular polygon (e.g., a range projection polygon). The polygon angle list 1430 may include a set of range node references 1440 to range nodes that define angles along the edge of a polygon of some embodiments.

One of ordinary skill in the art will recognize that the data structures presented in FIGS. 13-14 are for example purposes only and various different embodiments may be implemented with various different data structures including various different classes of data, references to data elements, etc.

B. Basic Range Projection

Figure 15:
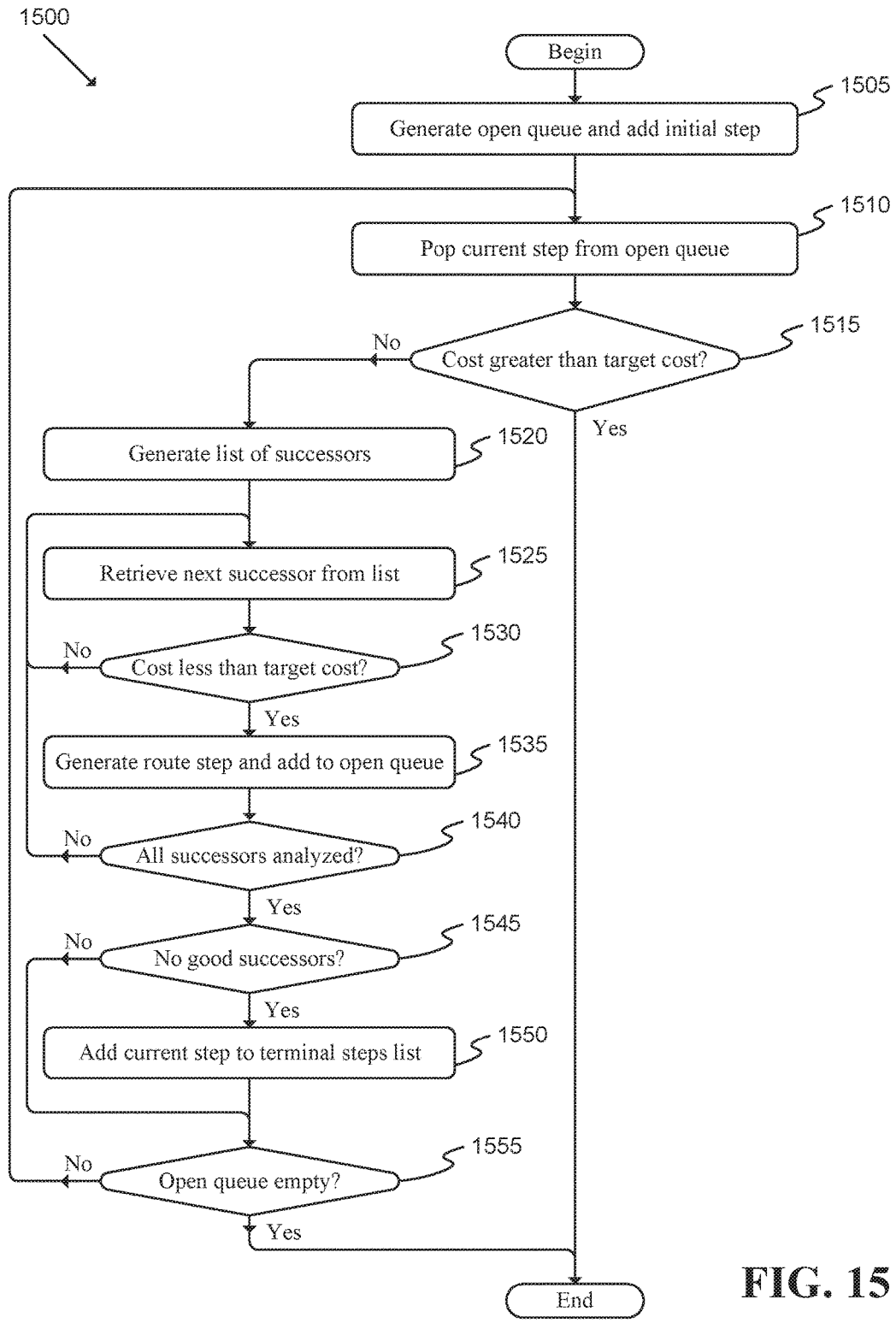
FIG. 15 illustrates a flow chart of a conceptual process used by some embodiments to generate a range projection.

FIG. 15 illustrates a flow chart of a conceptual process 1500 used by some embodiments to generate a range projection. The process may be implemented using data structures described above in reference to FIG. 13. Such a process may begin when, for instance, a particular request is made. In some embodiments, process 1500 may receive a start link and target cost (e.g., a cost associated with a threshold of energy consumption, fuel usage, etc.).

Next, the process may generate (at 1505) an open queue and add an initial step to the queue. The initial step may also be added to a result steps list. The initial step may be generated based at least partly on the start link and may include a link and associated cost. Multiple costs may be stored and/or calculated for each route step (e.g., energy, time, etc.). Process 1500 may then pop (at 1510) a current step from the open queue by retrieving the next step in the queue (i.e., the step with the lowest cost) and deleting the retrieved step from the queue. The open queue may be sorted by cost (and may be re-sorted every time a current step is popped from the queue).

The process may then determine (at 1515) whether the cost of the current step is greater than the target cost. If the process determines the current step cost is greater than the target cost. If the process determines that the current step cost is greater, the process may end (because the open queue is sorted by cost and no steps with higher cost may be used to extend the range) and then may end.

Alternatively, if the process determines (at 1515) that the current step cost is less than the target cost, the process may then generate (at 1520) a list of successor links or steps (i.e., steps including links that are able to be reached from the current step). Such a list may be generated in various appropriate ways. For instance, each link, and thus each step, may include various references to other links that are connected to the current link. Alternatively, each node may include references to a set of connected links.

Process 1500 may then retrieve (at 1525) the next successor step from the list and determine (at 1530) whether the accumulated cost of the successor step is less than the target cost. As described above in reference to FIG. 13, each successor step may reference a link, transfer cost, accumulated cost, and/or other appropriate elements. If the process determines (at 1530) that the cost is greater than the target cost, the process may repeat operations 1525-1530 until the process determines (at 1530) that the cost is less than the target cost.

If the process determines (at 1530) that the cost of the successor step is less than the target cost, the process may then generate (at 1535) a route step based on the successor step and add the route step to the open queue. The route step may also be added to the result steps list. Such a route step may be generated in various appropriate ways and may include various sub-elements (e.g., a link, accumulated cost, successor links or steps, etc.). In some embodiments, the successor step may be further analyzed to determine whether the result steps list already includes the link, and if so, adding the successor link to the open queue only if the accumulated cost of the successor link is less than the cost of the link previously stored in the result steps list. In this way, the algorithm may avoid re-exploring links that have already been processed and thus provide no possibility of improving the accumulated cost.

Next, process 1500 may determine (at 1540) whether all successor links of the current step have been analyzed. If the process determines that all successors have not been analyzed, the process may repeat operations 1525-1540 until the process determines that all successors have been analyzed.

If the process determines (at 1540) that all successors have been analyzed, the process may then determine (at 1545) whether there are any good successors (i.e., successors that have an accumulated cost less than the target cost). If the process determines that there are no good successors, the process may add (at 1550) the current step to a terminal steps list. After adding (at 1550) the current step, or, if the process determines (at 1545) that there are good successors, the process may determine (at 1555) whether the open queue is empty.

If the process determines (at 1555) that the open queue is empty, the process may end. Alternatively, if the process determines that the open queue is not empty, the process may repeat operations 1510-1555 until the process determines (at 1515) that the cost is greater than the target cost or the process determines (at 1555) that the open queue is empty and then end.

One of ordinary skill in the art will recognize that while process 1500 has been described with reference to various specific details, the process may be implemented in various different ways without departing from the spirit of the invention. For instance, various operations may be omitted in some embodiments and/or various other operations may be added in some embodiments. As another example, different embodiments may perform the operations different orders. As yet another example, the process may be divided into a set of sub-processes and/or be included as a sub-process in a macro process. In addition, different embodiments may perform the process based at least partly on various criteria (e.g., at each request received, continuously, at regular intervals, etc.).

C. Multi-Stage Projections

Figure 16:
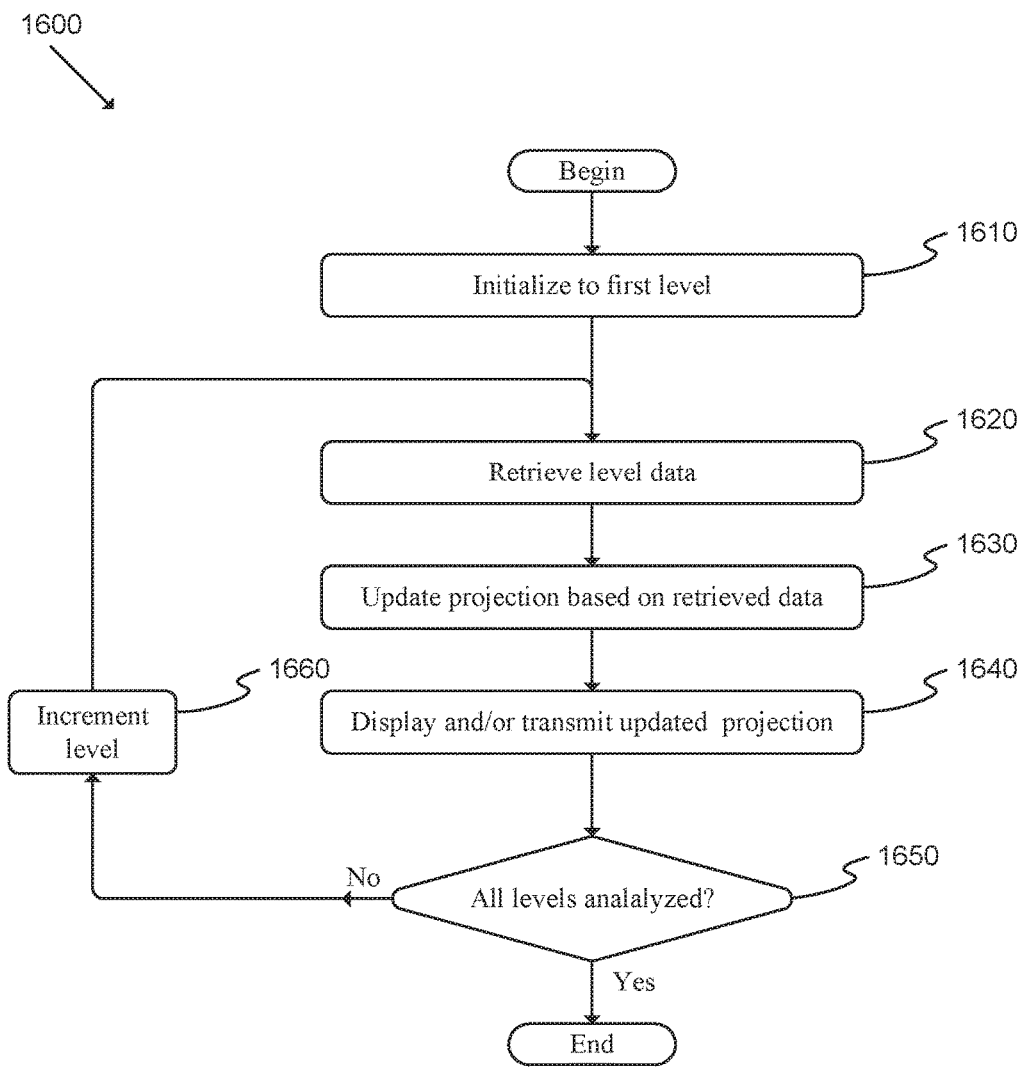
FIG. 16 illustrates a flow chart of a conceptual process used by some embodiments to implement multi-stage range projection calculation and/or display.

FIG. 16 illustrates a flow chart of a conceptual process 1600 used by some embodiments to implement multi-stage range projection calculation and/or display. Such a process may begin, for example, when a user launches an application of some embodiments, when a request for a projection is made, etc.

As shown, process 1600 may initialize (at 1610) to a first level of roadway (or other appropriate data type). In some applications, map data may be provided that includes a level associated with each roadway (where "roadway" may refer to any way of travel that is available to the vehicle for which a projection is sought). In some embodiments, the first level may be associated with major roadways (e.g., freeways, state routes, etc.).

Next, the process may retrieve (at 1620) data associated with the current level. Such data may be retrieved from an appropriate map database, storage, and/or other appropriate resource. The process may then update (at 1630) the projections based at least partly on the retrieved data. In the case of the first level, an initial projection may be generated (at 1630) as there may not be an existing projection to update.

The process may then display (at 1640) the updated projection and/or transmit the updated projection to a client device. Such display may include rendering (and/or otherwise formatting) data to be displayed on an appropriate resource (e.g., a vehicle head unit, a smartphone screen, etc.), while transmission may include formatting an appropriate response object and sending the object to the client over a network connection (wired or wireless).

Next, process 1600 may determine (at 1650) whether all available levels have been analyzed. Such a determination may be made in various appropriate ways (e.g., a map database may specify a number of available levels, a user may select a number of levels to use, a default setting may be applied, etc.). If the process determines that all levels have not yet been analyzed, the process may increment (at 1660) the level (e.g., from level 1 to level 2, from level 2 to level 3, etc.). Operations 1620-1660 may be repeated iteratively for each level until the process determines (at 1650) that all levels have been analyzed, at which point the process may end.

One of ordinary skill in the art will recognize that while process 1600 has been described with reference to various specific details, the process may be implemented in various different ways without departing from the spirit of the invention. For instance, various operations may be omitted in some embodiments and/or various other operations may be added in some embodiments. As another example, different embodiments may perform the operations different orders. As yet another example, the process may be divided into a set of sub-processes and/or be included as a sub-process in a macro process. In addition, different embodiments may perform the process based at least partly on various criteria (e.g., at each request received, continuously, at regular intervals, etc.).

Figure 17:
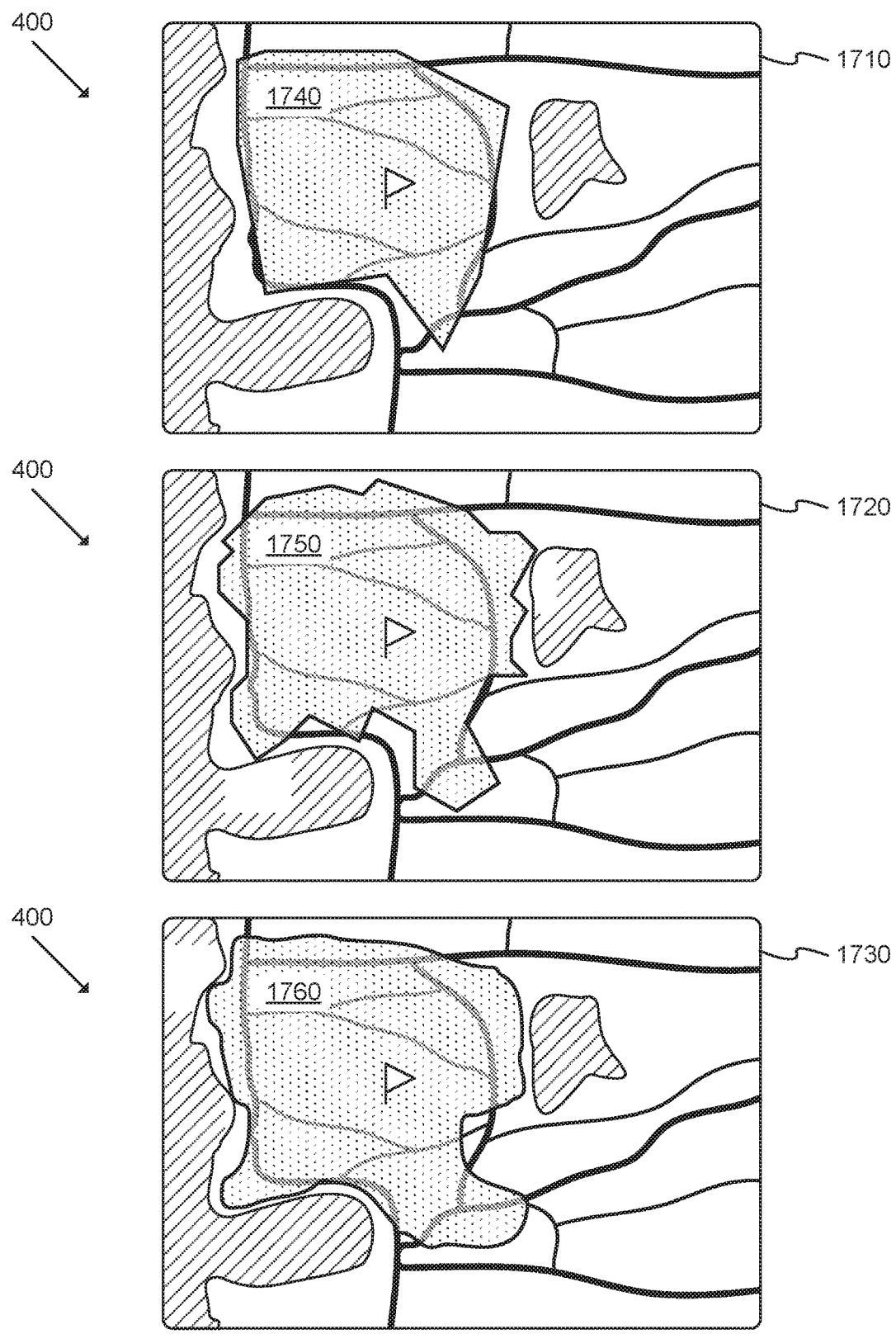
FIG. 17 illustrates several example GUIs associated with a multi-stage projection algorithm of some embodiments.

FIG. 17 illustrates several example GUIs 1710-1730 associated with a multi-stage projection algorithm of some embodiments. Specifically, this figure shows the progression of range projection polygons that may be displayed to a user during operation. As shown, the GUIs may be displayed in display area 400.

In this example, the first GUI 1710 shows a first polygon 1740 associated with a first range projection (e.g., a "rough" projection using only a first class of roadway). The second GUI 1720 shows a second polygon 1750 that may have been evaluated to a "major" street level (e.g., by incorporating a second class of roadway into the projection algorithm). The third GUI 1730 shows a third polygon 1760 that may have been further refined to a "minor" street level (e.g., by incorporating a third class of roadway into the projection algorithm). Different embodiments may refine the project polygon to different levels (and different numbers of levels and/or projections) associated with different features, roadway types, and/or other relevant parameters, as appropriate.

During operation, a display element may provide the first polygon 1740 to a user soon after a range finding request is received. The second polygon 1750 may be displayed a short time later, as the system refines the range. The third polygon 1760 may be displayed some time after, as the system further refines the range. In this way, a user may receive a fast, intuitive indication of the range, which may then be further refined as more processing time is available.

One of ordinary skill in the art will recognize that the GUIs 1710-1730 may be implemented in various different ways without departing from the spirit of the invention. For instance, the various range projection areas may be displayed with different colors, shadings, etc. As another example, different embodiment may have different numbers of stages used to refine the projection. As yet another example, in some embodiments, a user may select various display options that may partly determine a progression of displayed areas and various parameters associated with such display (e.g., a user may select multiple accuracy thresholds that may activate a display update, a user may select various time thresholds allowed for updated ranges, etc.).

D. Fan-Out Projection

Figure 18:
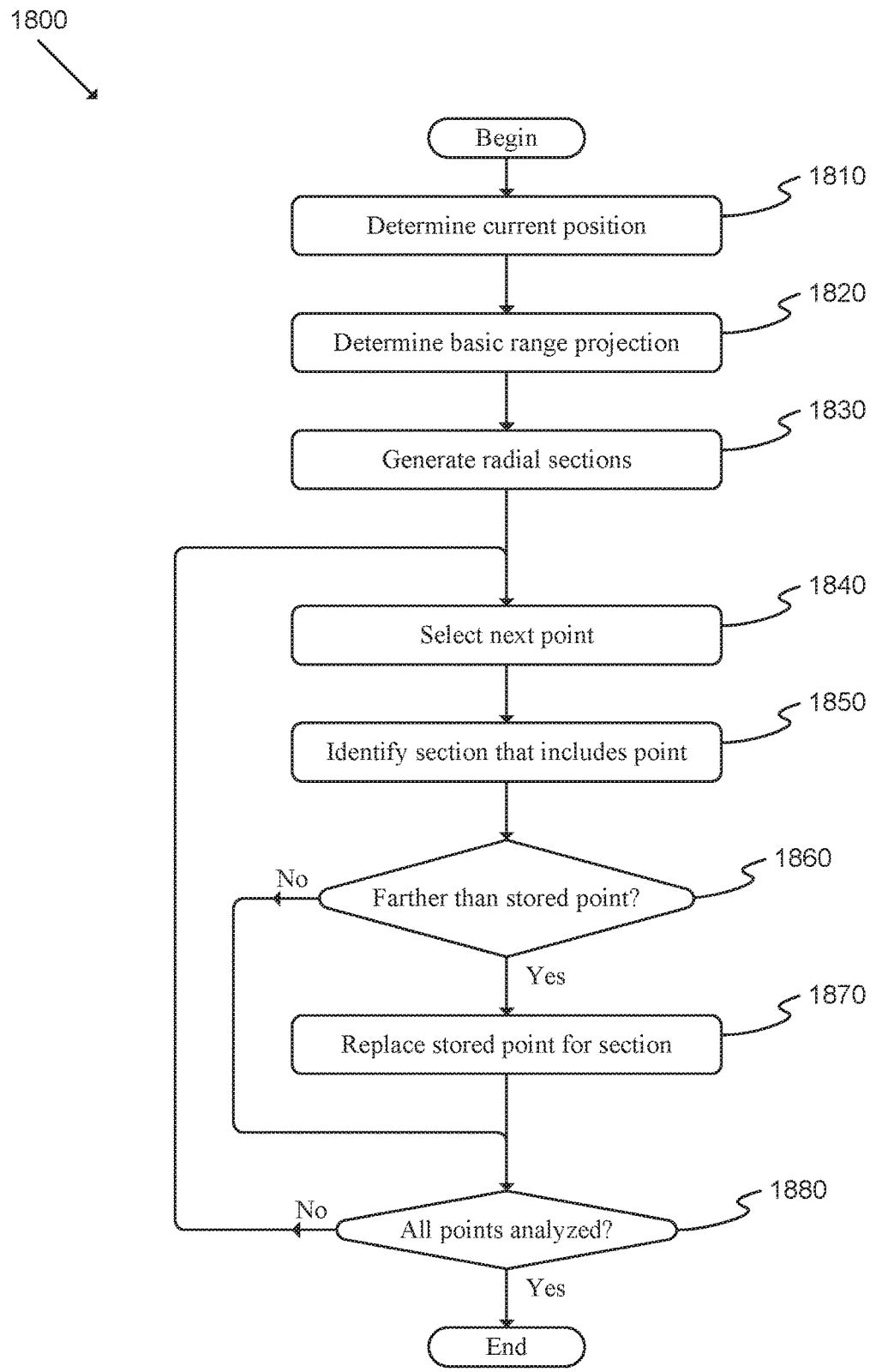
FIG. 18 illustrates a flow chart of a process used to determine a range of a vehicle using a fan-out algorithm.
Figure 19:
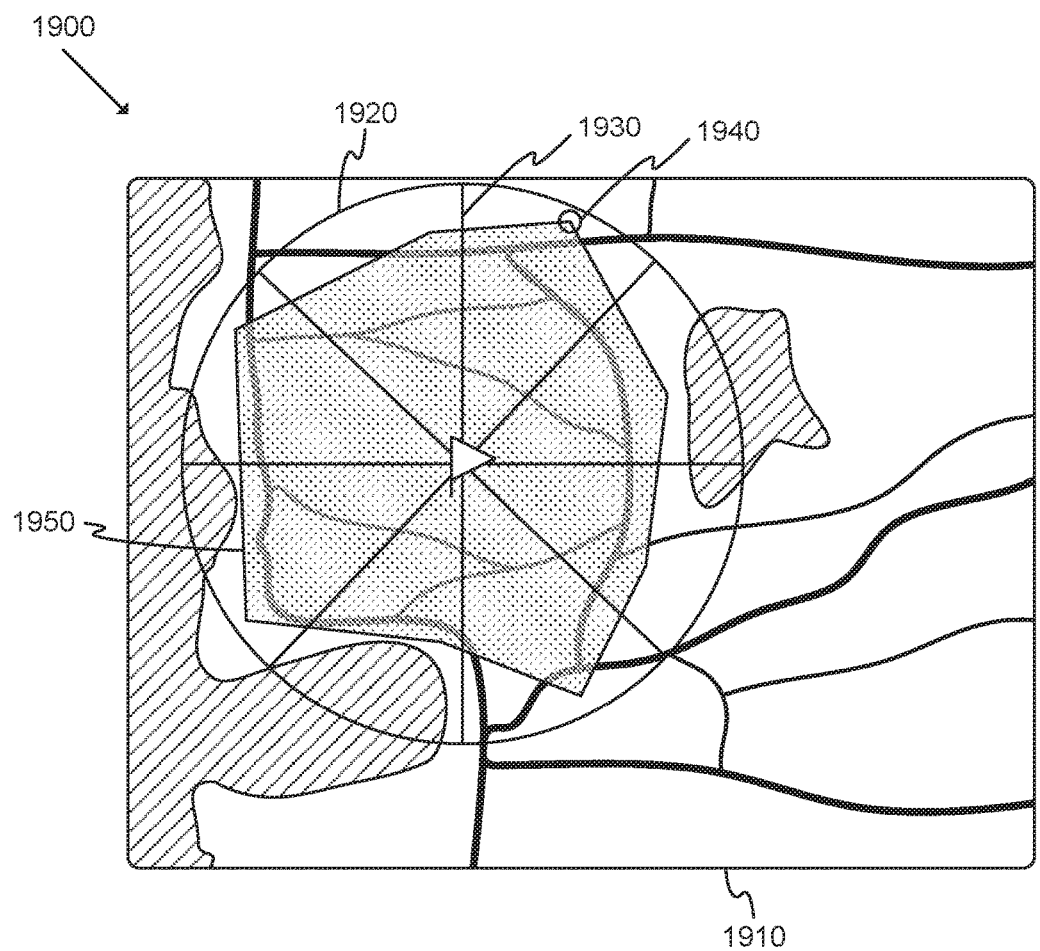
FIG. 19 illustrates an example GUI of some embodiments representing the result of the process of FIG. 18.

FIG. 18 illustrates a flow chart of a process 1800 used to determine a range polygon of a vehicle using a fan-out algorithm. A conceptual graphical representation of the result of process 1800 is shown in FIG. 19 below. Such a process 1800 may begin, for instance, when a user launches a range finder application of some embodiments.

The process may then determine (at 1810) a current position (e.g., by retrieving GPS information from an appropriate resource). Next, the process may determine a basic range projection (at 1820) as described above in reference to process 1500 and calculate terminal nodes (or "points") based on the basic range projection. The terminal nodes may be determined using the terminal steps list, by using the end points of the links in the direction of range projection exploration. Process 1800 may then generate radial sections (at 1830) that start from the center of the projection and extend out in all directions at regular angle intervals.

Next, the process may select (at 1840) a next terminal point (or a first point, if appropriate) for evaluation. The process may then identify (at 1850) the section that includes the point.

The process may then determine (at 1860) whether the next point is farther from the current position than a stored point for the identified section. When the process determines that the next point is farther (or determines that no point has been previously stored), the process may replace (at 1870) the stored point. Alternatively, the process may continue to operation 1880.

After replacing (at 1870) the stored point or determining (at 1860) that the stored point was closer to the center of the projection polygon than the next point, the process determines (at 1880) whether all points have been analyzed. If the process determines that all points have not been analyzed, the process returns to operation 1840. Operations 1840-1880 may then be performed iteratively until the process determines (at 1880) that all points have been analyzed, at which point the process may end.

Such a process may thus identify the terminal point in each section that is within range of the vehicle and farthest from the center of the evaluation range (i.e., the current vehicle position).

One of ordinary skill in the art will recognize that while process 1800 has been described with reference to various specific details, the process may be implemented in various different ways without departing from the spirit of the invention. For instance, various operations may be omitted in some embodiments and/or various other operations may be added in some embodiments. As another example, different embodiments may perform the operations different orders. As yet another example, the process may be divided into a set of sub-processes and/or be included as a sub-process in a macro process. In addition, different embodiments may perform the process based at least partly on various criteria (e.g., at each request received, continuously, at regular intervals, etc.).

FIG. 19 illustrates an example GUI 1900 of some embodiments representing the result of process 1800. As shown, the GUI 1900 includes a section 1910 of a map, a circle 1920, a set of spokes 1930 defining the radial sections, a set of farthest points 1940 and a resulting polygon 1950. The circle 1920 and spokes 1930 may not be displayed in a typical GUI presented to a user, but are included for descriptive purposes.

Each radial section of the circle 1920 may include a single point 1940 that may be used to define an outer edge of the polygon 1950. Each point 1940 may be connected to the point in each adjacent radial section by a straight line.

One of ordinary skill in the art will recognize that GUI 1900 may be implemented in various different ways without departing from the spirit of the invention. For instance, different embodiments may include different specific display elements. As another example, different embodiments may use different colors, line styles, and/or other features to distinguish among various items. In addition, different embodiments may include various different numbers of radial section, different radii relative to the displayed area 1910, etc.

E. Center-Out Projection

Figure 20:
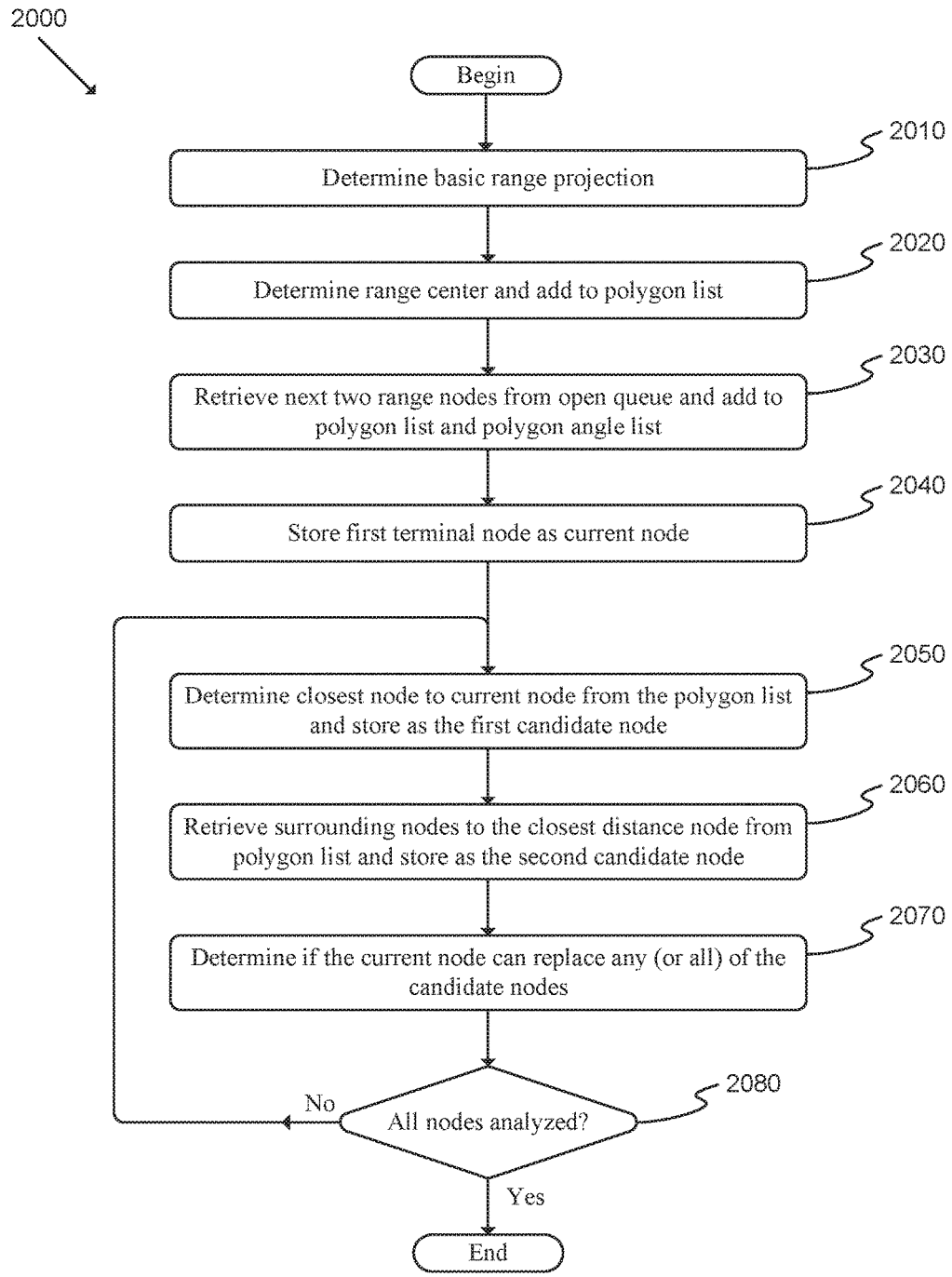
FIG. 20 illustrates a flow chart of a process used to determine a range of a vehicle using a center-out algorithm.
Figure 26:
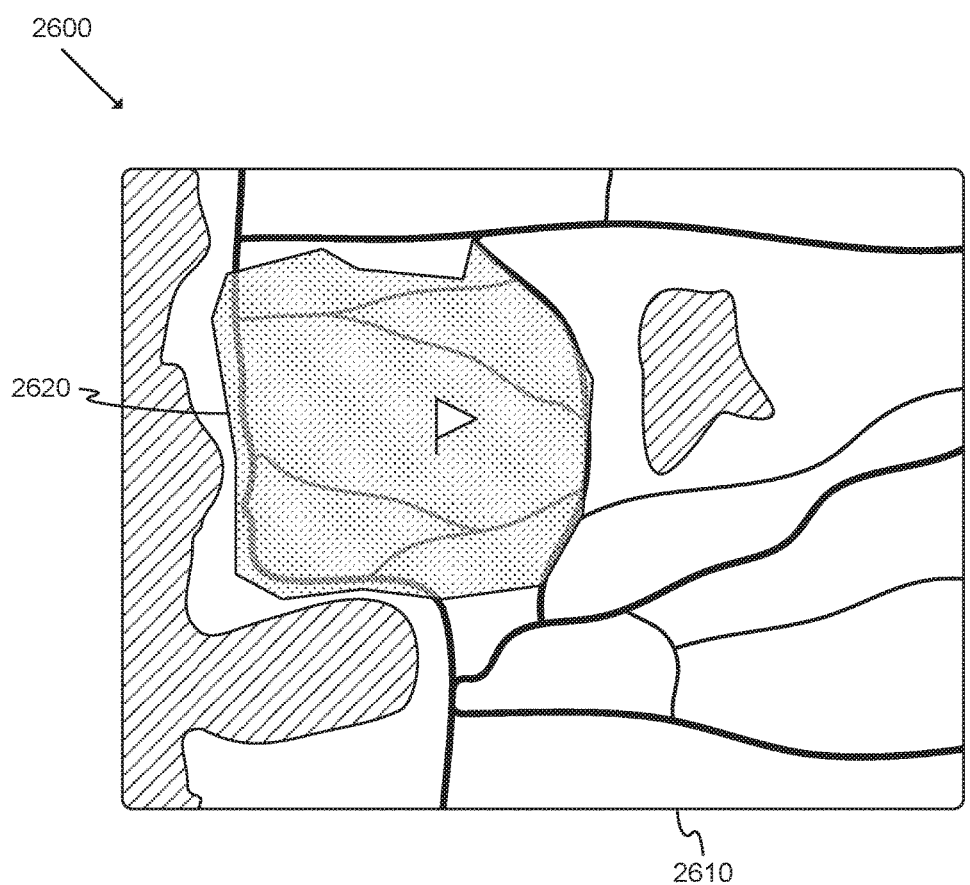
FIG. 26 illustrates an example GUI of some embodiments representing the result of a center-out projection such as that of the process of FIG. 20.

FIG. 20 illustrates a flow chart of a process 2000 used to determine a range of a vehicle using a center-out algorithm. A conceptual graphical representation of the result of process 2000 is shown in FIG. 26 below. Such a process 2000 may begin, for instance, when a user launches a range finder application of some embodiments.

As shown, the process may determine (at 2010) a basic range projection which may calculate a set of terminal points as described in reference to process 1500 and add the terminal points to an open queue. Next, process 2000 may determine (at 2020) the range center and add the center to a polygon list. The range center may be specified using various appropriate coordinate systems. Next, the process may retrieve (at 2030) the next two range nodes from the open queue and add the nodes to the polygon list and a polygon angle list. The open queue may include all available terminal nodes that have not yet been analyzed.

The process may then store (at 2040) the first terminal node as the current node. Next, the process may determine (at 2050) the closest node to the current node from the polygon list and store the node as the first candidate node. The process may then retrieve (at 2060) surrounding nodes to the closest distance node from the polygon list and store the nodes as second (and third, fourth, etc., as appropriate) candidate nodes. Next, the process may determine (at 2070) whether the current node may replace any (or all) of the candidate nodes.

Next, the process may determine (at 2080) whether all nodes have been analyzed. Such a determination may be made in various appropriate ways (e.g., by determining whether all nodes in the open queue have been analyzed).

If the process determines that all nodes have not been analyzed, the process may repeat operations 2050-2080 until the process determines (at 2080) that all nodes have been analyzed, at which point the process may end.

One of ordinary skill in the art will recognize that while process 2000 has been described with reference to various specific details, the process may be implemented in various different ways without departing from the spirit of the invention. For instance, various operations may be omitted in some embodiments and/or various other operations may be added in some embodiments. As another example, different embodiments may perform the operations different orders. As yet another example, the process may be divided into a set of sub-processes and/or be included as a sub-process in a macro process. In addition, different embodiments may perform the process based at least partly on various criteria (e.g., at each request received, continuously, at regular intervals, etc.).

Figure 21:
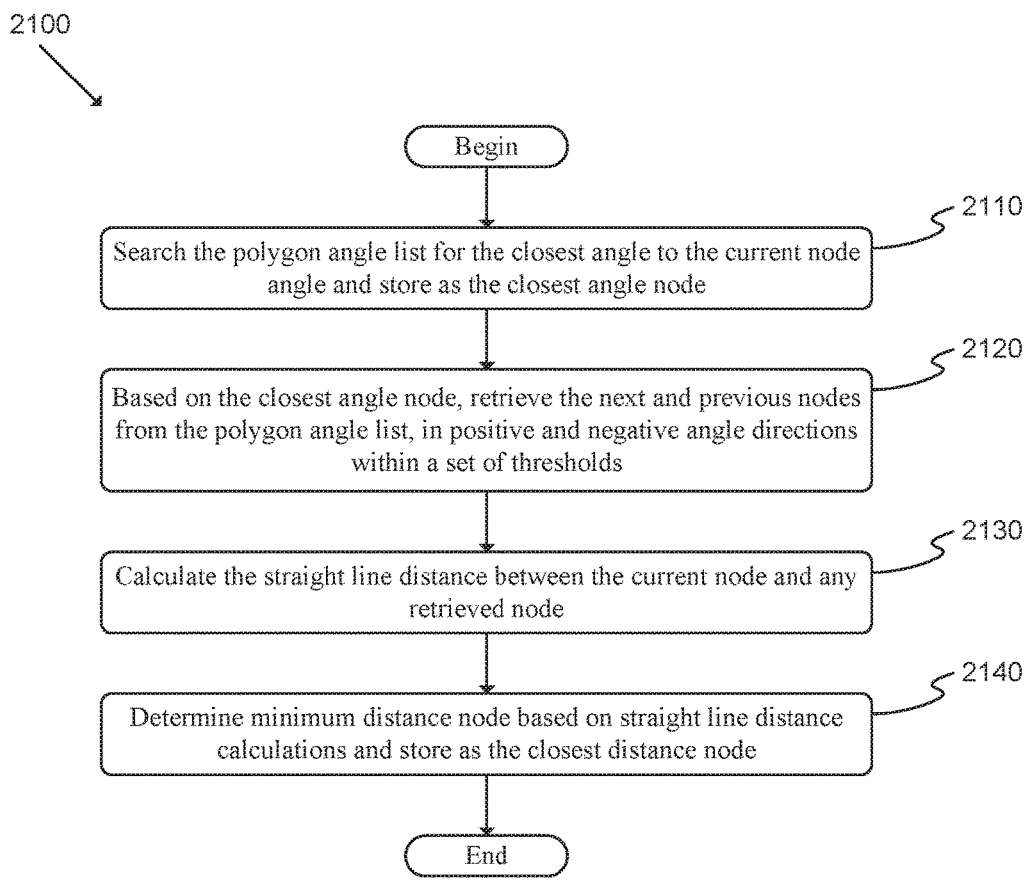
FIG. 21 illustrates a flow chart of a process used to identify a closest node in some embodiments.

FIG. 21 illustrates a flow chart of a process 2100 used to identify a closest node in some embodiments. Such a process may be implemented, for example, as at least a portion operation 2040 described above in reference to process 2000.

As shown, the process may search (at 2110) the polygon angle list for the closest angle to the current node angle and store the associated node as the closest angle node. Next, the process may, based at least partly on the closest angle node, retrieve (at 2120) the next and previous nodes from the polygon angle list, in positive and negative angle directions within a set of thresholds.

Process 2100 may then calculate (at 2130) a straight line distance between the current node and any retrieved node. Next, the process may determine (at 2140) the minimum distance node based on straight line distance calculations and store the minimum distance node as the closest node. The process may then end.

One of ordinary skill in the art will recognize that while process 2100 has been described with reference to various specific details, the process may be implemented in various different ways without departing from the spirit of the invention. For instance, various operations may be omitted in some embodiments and/or various other operations may be added in some embodiments. As another example, different embodiments may perform the operations different orders. As yet another example, the process may be divided into a set of sub-processes and/or be included as a sub-process in a macro process. In addition, different embodiments may perform the process based at least partly on various criteria (e.g., at each request received, continuously, at regular intervals, etc.).

Figure 22:
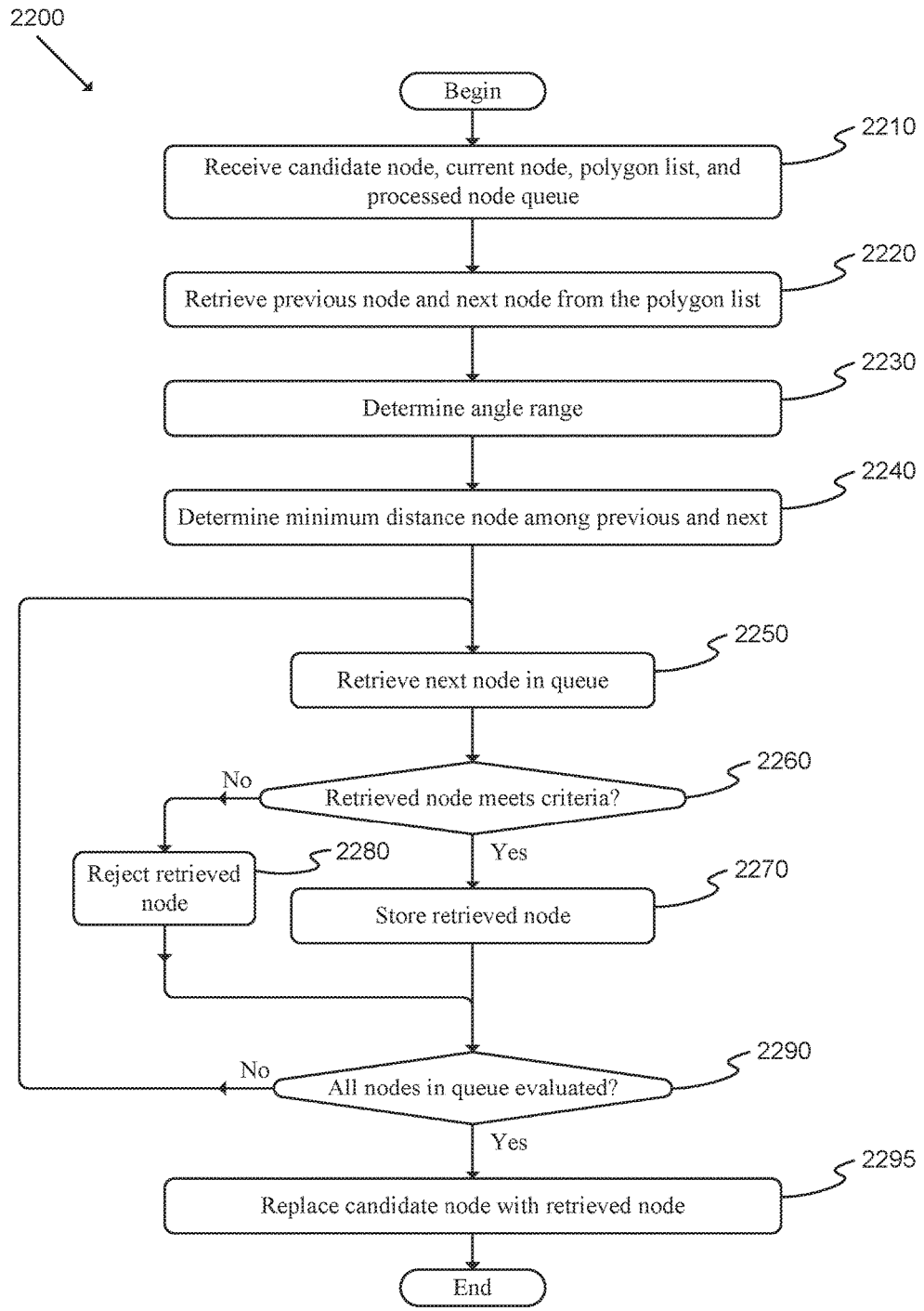
FIG. 22 illustrates a flow chart of a process used to determine whether an identified closest node can replace a candidate node.

FIG. 22 illustrates a flow chart of a process 2200 used to determine whether an identified closest node can replace a candidate node. Such a process may be implemented, for example, as at least a portion of operation 2060 described above in reference to process 2000.

As shown, process 2200 may receive (at 2210) a candidate node, a current node, a polygon list, and a processed node queue. Next, the process may retrieve (at 2220) a previous node and next node from the polygon list. The process may then determine (at 2230) an angle range among the nodes. The process may then determine (at 2240) a minimum distance node among the previous and next nodes.

The process may then retrieve (at 2250) the next node in the queue. The process may then determine (at 2260) whether the retrieved node meets the evaluation criteria (one example evaluation criteria will be described below in reference to FIG. 23). If process 2200 determines (at 2260) that the retrieved node does meet the criteria, the process may store (at 2270) the retrieved node. Alternatively, the process may reject (at 2280) the retrieved node.

Process 2200 may then determine (at 2290) whether all nodes have been evaluated. If the process determines that all nodes have not yet been evaluated, the process may iteratively perform operations 2250-2290 until the process determines (at 2290) that all nodes have been evaluated and then replace (at 2295) the candidate node with the retrieved node and end.

One of ordinary skill in the art will recognize that while process 2200 has been described with reference to various specific details, the process may be implemented in various different ways without departing from the spirit of the invention. For instance, various operations may be omitted in some embodiments and/or various other operations may be added in some embodiments. As another example, different embodiments may perform the operations different orders. As yet another example, the process may be divided into a set of sub-processes and/or be included as a sub-process in a macro process. In addition, different embodiments may perform the process based at least partly on various criteria (e.g., at each request received, continuously, at regular intervals, etc.).

Figure 23:
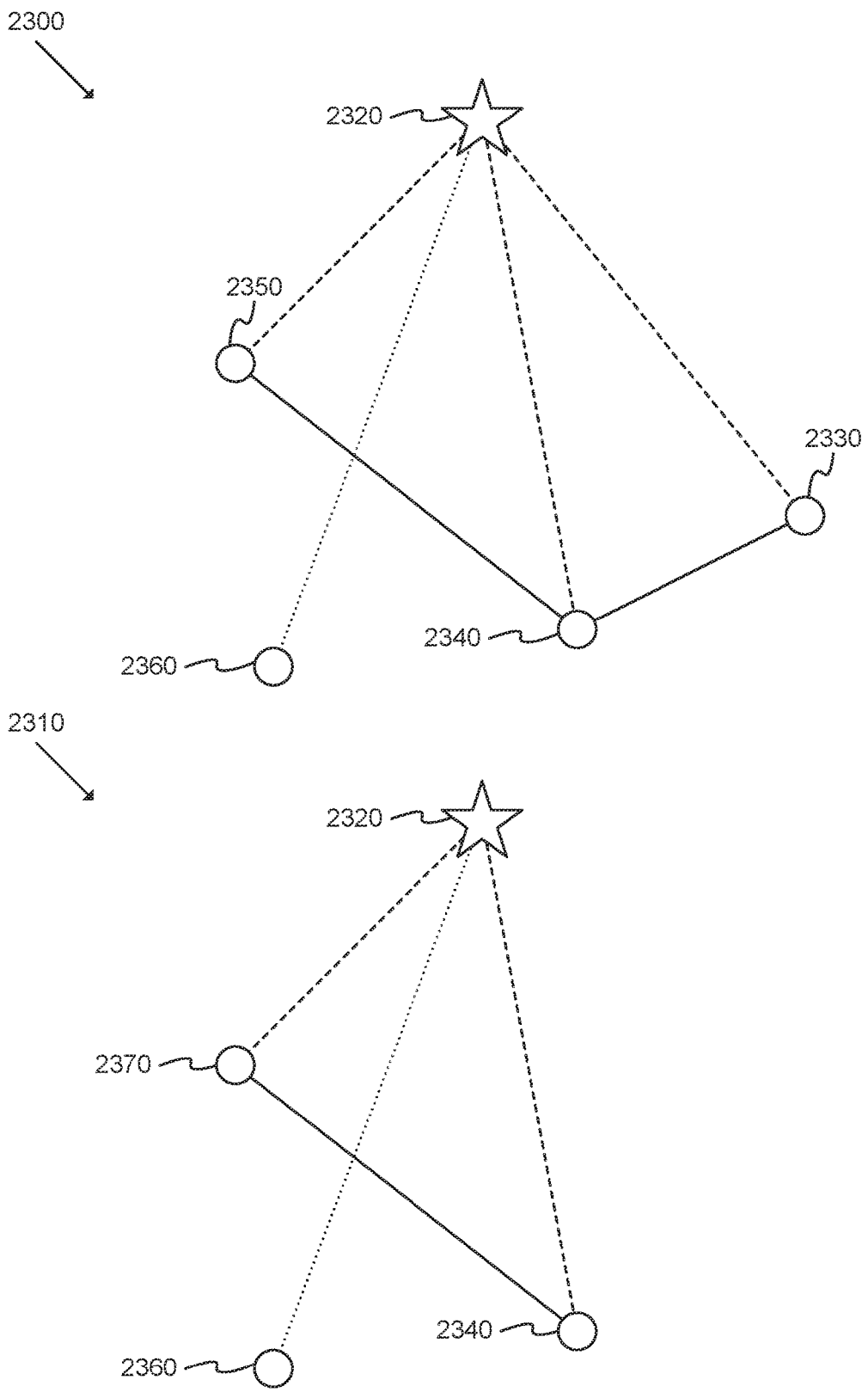
FIG. 23 illustrates graphical representations showing the evaluation criteria of the process of FIG. 22.

FIG. 23 illustrates graphical representations 2300-2310 showing the evaluation criteria of the process 2200. The first representation 2300 includes a range center 2320, a previous node 2330, a current node 2340, a next node 2350, and a check node 2360. In some embodiments, a determination of the angle of the check node 2360 may be made to determine whether the check node is within minimum and maximum angle thresholds (e.g., whether the angle of the line connecting the check node 2360 to the range center 2320 is within the range of angles defined by the previous node 2330 and the next node 2350. If the check node 2360 is not within the minimum and maximum angle thresholds, the node is rejected, and the next node in the queue may be retrieved. If the check node is within the thresholds, the evaluation may continue.

Next, some embodiments may determine whether the link formed from the range center 2320 to the check node 2360 intersects the line from the previous node 2330 to the current node 2340 or the line from the current node to the next node 2350. In the example of representation 2300, the line from the range center 2320 to the check node 2360 intersects the line from the current node 2340 to the next node 2350. Thus, the next node 2350 us assigned as the "from" node. If the distance from the range center 2320 to the check node 2360 is less than the distance from the range center 2320 to the from node, the check node 2360 is rejected as a candidate and the next node in the queue may be retrieved.

Otherwise, if the check node 2360 is outside the polygon formed by the range center 2320, current node 2340, and from node 2370, as shown in the example representation 2310, the current node 2340 may be rejected as a candidate and the next candidate node may be evaluated. Once there are no more nodes to explore, the current node 2360 may be able to replace the candidate node in the polygon list and the polygon angle list may be updated accordingly.

Different embodiments may include various modifications that may allow improved performance. For instance, shape points of the last links that connect to the processed nodes can be considered range nodes (i.e., terminal nodes that were reached by a projection algorithm as the end of an optimization path, road dead ends, or near restricted areas). Such range nodes may be defined by a distance from the range center and a heading angle. Some embodiments may include all nodes within a projection as range nodes, thus allowing the potential to create a more detailed and accurate shape.

Figure 24:
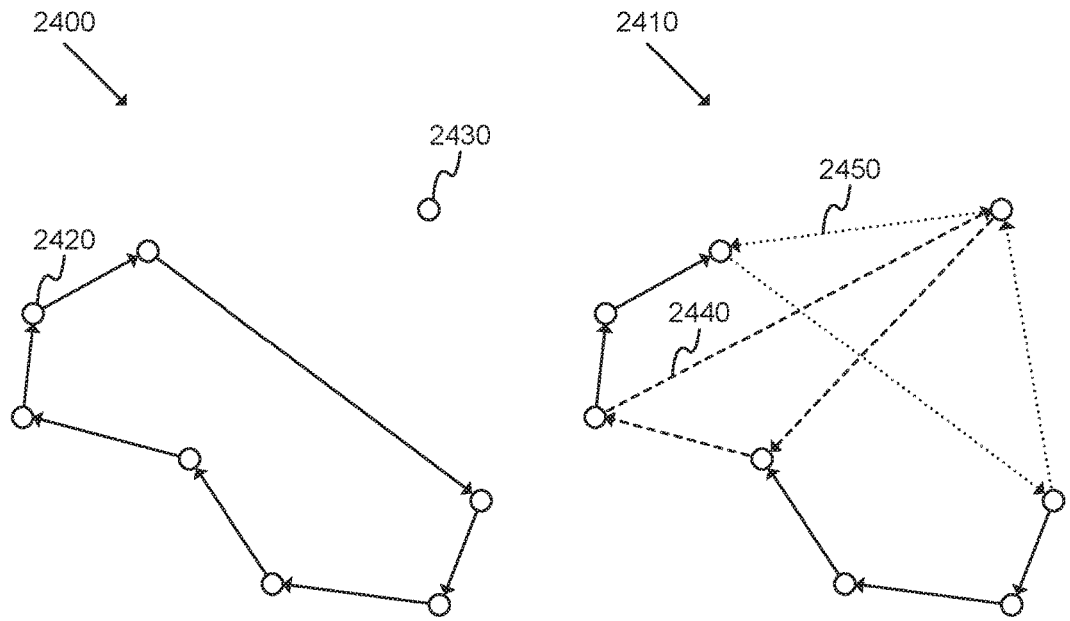
FIG. 24 illustrates graphical representations showing corrections that may be made to eliminate self-intersecting lines when projecting a polygon in some embodiments.

FIG. 24 illustrates graphical representations 2400-2410 showing corrections that may be made to eliminate self-intersecting lines when projecting a polygon in some embodiments. In some embodiments, the points in the polygon list may be ordered in a specific direction (e.g., clockwise). The points may be inserted into the list such that the angle is increasing (for clockwise direction). Some embodiments may determine whether a current node forms a clockwise or counterclockwise oriented triangle when combined with a line under evaluation.

For instance, in the example of representation 2400, the various points 2420 are shown flowing in a clockwise direction. In addition, the current node 2430 is outside the polygon formed by points 2420 and thus may be a candidate to replace one or more of the points.

The representation 2410 includes a first triangle 2440 formed among the current node 2430 and two candidate nodes and a second triangle 2450 formed among current node 2430 and two other candidate nodes. The node 2430 may be rejected in the case of the first triangle 2440 because the triangle is clockwise oriented, while the node may be evaluated in the case of the second triangle 2450 because the triangle is counterclockwise oriented. Such a determination may be made in various appropriate ways (e.g., by using the cross products of the vectors by multiplying and summing the three sets of coordinates and determining if the result is positive or negative.

Figure 25:
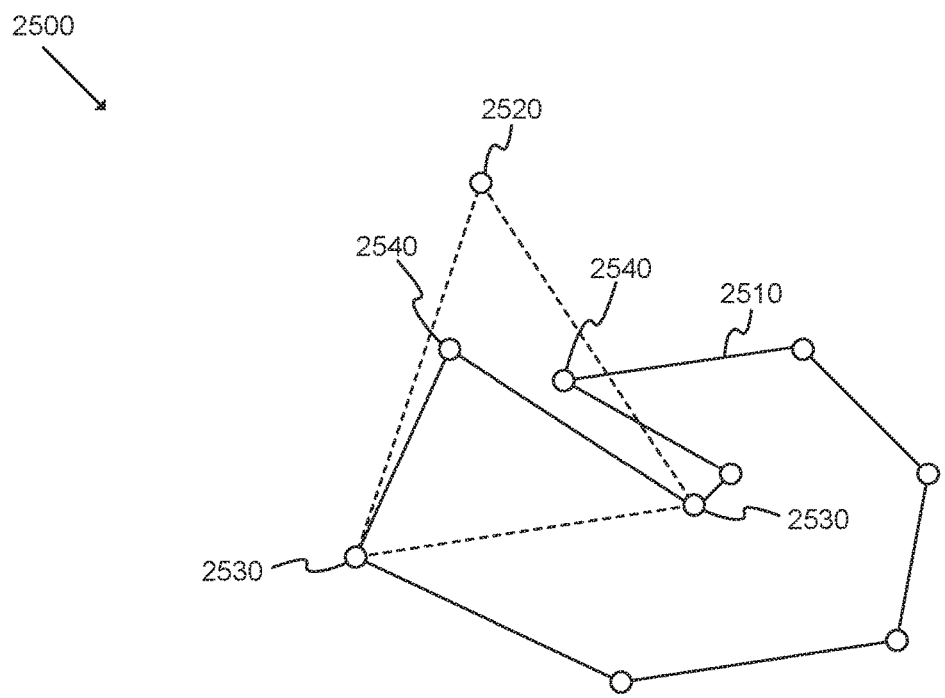
FIG. 25 illustrates a graphical representation showing an example polygon with a complicated shape and a corresponding verification in some embodiments that the existing polygon will be intersected.

FIG. 25 illustrates a graphical representation 2500 showing an example polygon 3610 with a complicated shape and a corresponding verification in some embodiments that the existing polygon will be intersected. As shown, a current node 2520 is currently under consideration to replace one or more candidate nodes 2530. A triangle is formed among the current node 2520 and candidate nodes 2530. Next, a determination may be made whether any other nodes are within the triangle (in this example, nodes 2540 are within the triangle, as shown). Such a determination may be made in a similar way to the description of representation 2310 above.

One of ordinary skill in the art will recognize that the example representations of FIGS. 24-25 are for example purposes only and different embodiments may implement such features in various different ways without departing from the spirit of the invention.

FIG. 26 illustrates an example GUI 2600 of some embodiments representing the result of a center-out projection such as that of process 2000. As shown, the GUI 2600 includes a section 2610 of a map and a resulting polygon 2620.

One of ordinary skill in the art will recognize that GUI 2600 may be implemented in various different ways without departing from the spirit of the invention. For instance, different embodiments may include different specific display elements. As another example, different embodiments may use different colors, line styles, and/or other features to distinguish among various items.

F. Bitmap-Based Projection

Figure 27:
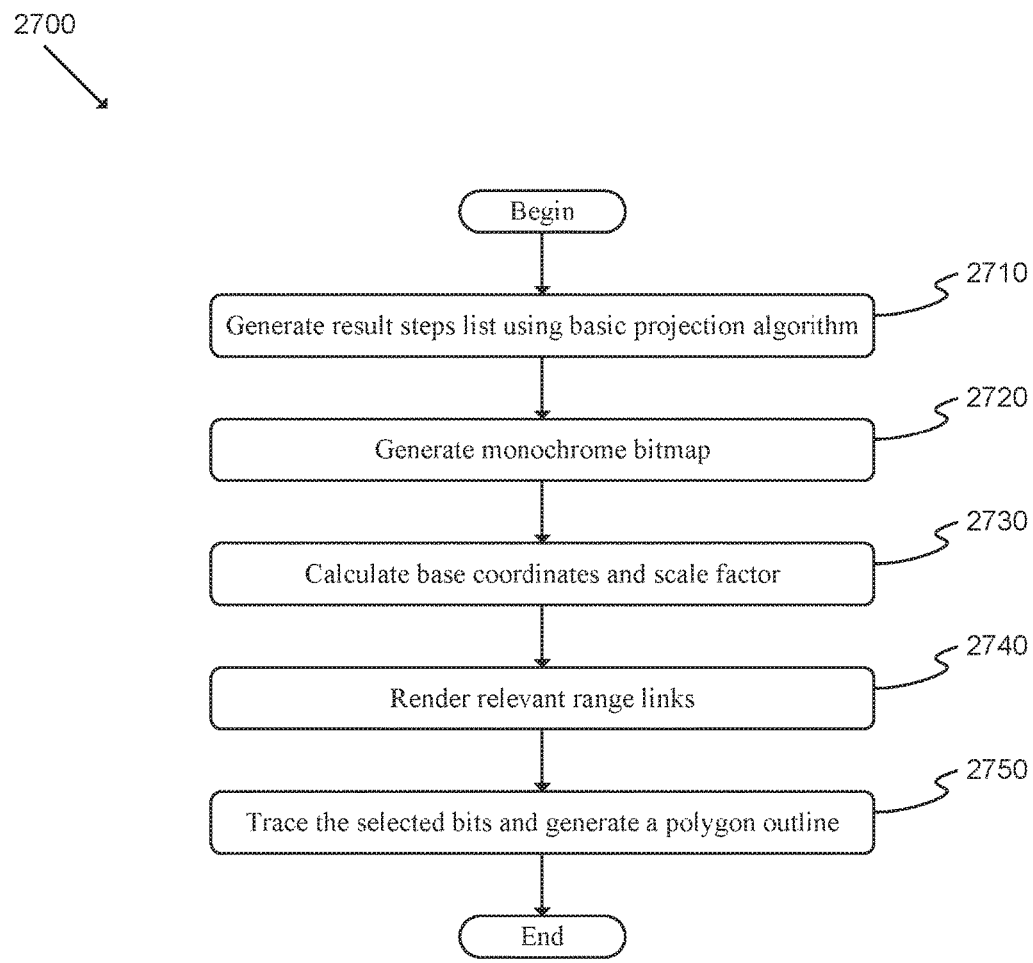
FIG. 27 illustrates a flow chart of a process used to project a range of a vehicle using a bitmap-based algorithm.

FIG. 27 illustrates a flow chart of a process 2700 used to project a range of a vehicle using a bitmap-based algorithm. Such a process may begin, for instance, when a user requests a range projection using an application of some embodiments.

As shown, the process may then generate (at 2710) a result steps list (that includes all links that are within range) using the basic range projection algorithm described above in reference to process 1500. Next, the process may generate (at 2720) an in-memory monochrome bitmap with either fixed size or dynamic size based on the vehicle range. Next, the process may calculate (at 2730) base coordinates and a scale factor. For example, in some embodiments the base coordinates may be associated with the lower left corner (i.e., southwest corner) of a map area under evaluation. The scale factor may be associated with the size of the bitmap and/or the maximum range of the vehicle as determined using the basic range projection algorithm.

Process 2700 may then render (at 2740) relevant range links (or "segments" or "edges") to the monochrome bitmap. Relevant links may include any links that are accessible by the vehicle as a result of the range calculation performed using the basic projection algorithm (e.g., all links included in the result steps list). For large ranges the algorithm may be optimized to include only the outer links of the range (e.g., the outer twenty percent of the range based on distance, cost, and/or other appropriate factors and/or parameters) and thus reduce the processing burden.

Each edge may be drawn as, for instance, a single line between the start and end nodes, each edge could be drawn with all shape points, each could be drawn with an appropriate thickness (e.g., one pixel, four pixels, etc.). To draw the edges, the first point may be retrieved and assigned as the current point. The current point may be transformed to pixel coordinates. The next point may be retrieved, assigned as the next point and transformed to pixel coordinates (e.g., by subtracting longitude and latitude coordinates from the base coordinates and scaling by the pixel scaling factor). If the transformed points don't match (i.e., if transformed current point and next point don't overlap) then a line may be drawn between the two points on the bitmap. The next point may be assigned to the current point and the next point retrieved until all points are examined.

As a result, the monochrome bitmap may include bits defined as TRUE (or logic "1") for locations that are accessible and defined as FALSE (or logic "0") for locations that are not accessible and/or where there are no roads.

The process may then trace (at 2750) the selected bits (e.g., the in-range bits) and generate a polygon outline of the selected bits. Such tracing may be performed by identifying a starting point (e.g., by scanning the image from the bottom right corner to find the rightmost non empty pixel).

The starting point may be set as the current point and the current direction defined as "up". Next, the current point may be added to the result algorithm based on a selected outline generalization algorithm before determining the next best direction by exploring whether there are any non-pixels in a counterclockwise direction around the current point starting from the current direction.

The algorithm may then move to the next point in the selected direction, set the current point to the next point, set the current direction to the new direction (if changed) and if the current point is different from the start point, add the current point to the result polygon. Each result point added to the outline polygon may be reverse transformed to world coordinates by scaling the pixel coordinates using the scale factor and adding the base coordinates.

Different embodiments may use different outline generalization algorithms. For instance, some embodiments may use no generalization (e.g., every outline point may be added to the result polygon). This creates the most detailed polygon but also includes the most points which could result in slow performance when drawing a map (and/or if a polygon needs to be sent from a server over a wireless connection).

As another example, some embodiments may use area generalization to make sure each new point does not span too large an area from the previous point. An indicator of the area (e.g., the triangle formed among the previous point, midpoint, and endpoint and calculated using the cross product parallelogram spanned by the vectors from the previous point to the midpoint and the midpoint to the endpoint divided by two) may be compared to minimum and/or maximum thresholds (e.g., the signed parallelogram area may be compared to a set of thresholds) to determine whether to replace the midpoint with the new point.

As still another example, some embodiments may use angle-based generalization to determine whether the new angle of the last line in the outline, extended to the new point would extend the range of line angles that the last line has swept over would exceed a threshold. If so, the last line may not be extended to the new point and a new line will connect the last point in the outline to the new point. Alternatively, if the angular range is acceptable, the line may be extended to the new point.

One of ordinary skill in the art will recognize that while process 2700 has been described with reference to various specific details, the process may be implemented in various different ways without departing from the spirit of the invention. For instance, various operations may be omitted in some embodiments and/or various other operations may be added in some embodiments. As another example, different embodiments may perform the operations different orders. As yet another example, the process may be divided into a set of sub-processes and/or be included as a sub-process in a macro process. In addition, different embodiments may perform the process based at least partly on various criteria (e.g., at each request received, continuously, at regular intervals, etc.).

Figure 28:
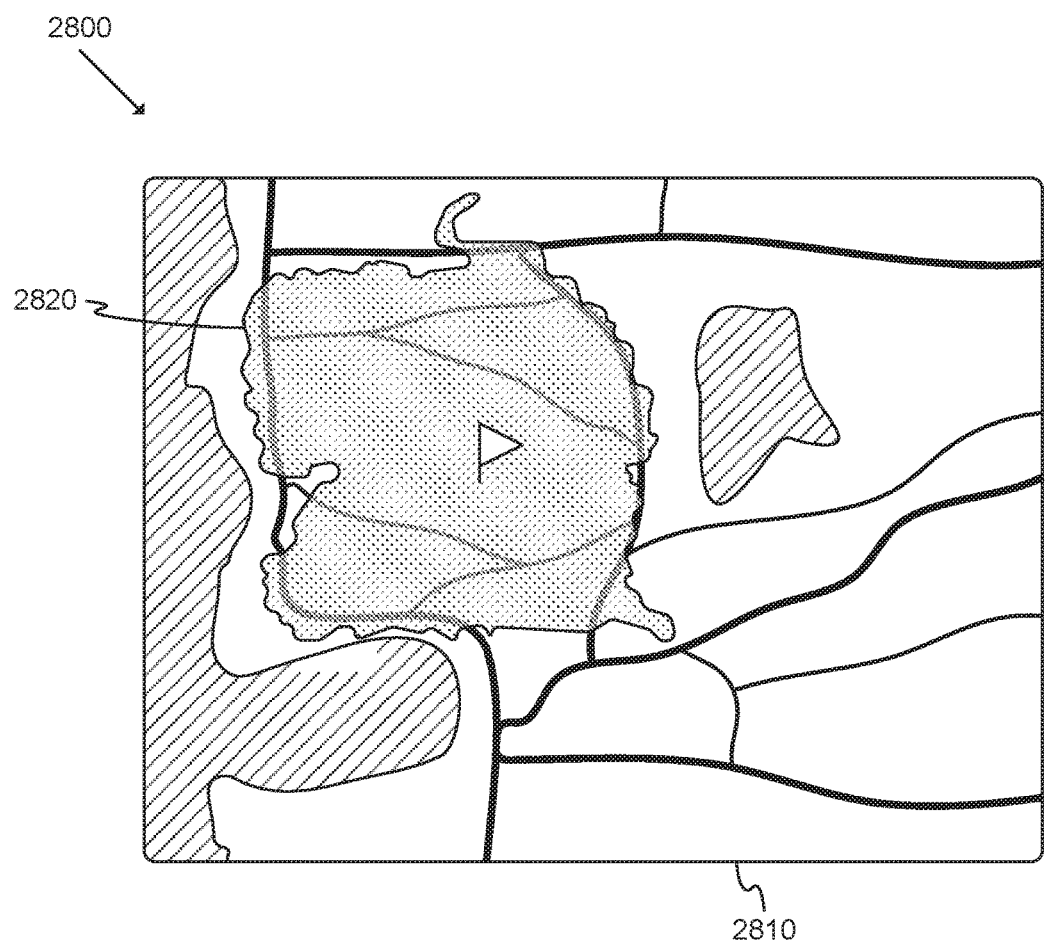
FIG. 28 illustrates an example GUI of some embodiments representing the result of the process of FIG. 27.

FIG. 28 illustrates an example GUI 2800 of some embodiments representing the result of process 2700. As shown, the GUI 2800 includes a section 2810 of a map and a resulting polygon 2820.

One of ordinary skill in the art will recognize that GUI 2800 may be implemented in various different ways without departing from the spirit of the invention. For instance, different embodiments may include different specific display elements. As another example, different embodiments may use different colors, line styles, and/or other features to distinguish among various items.

G. Restricted Area Handling

As described above a range projection polygon may be generated by connecting the end terminal points using various appropriate algorithms. In some situations however, there are natural and/or man-made (or designated) restricted areas where a vehicle may not travel. Examples of such areas are lakes, bays, oceans, military bases, parks, etc. In situations where such areas are present in or around the range projection region, a polygon that simply connects the end points of the range paths will cut through or completely encompass such areas. Such handling of restricted areas may result in an incorrect range projection map being provided to a user.

Some embodiments provide an efficient way of dealing with restricted areas by associating a special flag (in the map database) with the nodes or links that border such restricted areas. The process of finding neighboring links and marking them as such may be performed by a map compiler during the map compilation process. During the actual range generation process when links with this special flag are reached they may be marked as end nodes and may be included in the final polygon. In this way, the range polygon may follow the contour of the restricted areas with minimal computational overhead.

Range projection is a computationally intensive process as it requires the exploration of an entire road graph from a predefined position and in all direction until the desired cost (energy level in a case of electric vehicles) is reached. The range projection polygon may be built from the endpoints of each path. The end of a path may be a link where the desired cost is reached or a dead-end road.

In some cases there are natural or man-made restricted areas where it is desirable for the range polygon to follow the contour of the neighboring road as that is the furthest place where the vehicle can reach. However, if the polygon is built from the end of a path nodes or dead-end roads, the resulting polygon might cut through the restricted areas.

If a polygon only connects the end points of a path or dead-ends, when the vehicle is close to the restricted area (e.g., a bay) the road that follows the coast line will not be included (as it is still in the range of the desired energy level) and as a result the polygon will cut through the bay. One way to overcome this problem is to analyze the shape points of the roads and compare them to the polygon lines and then adjust the shape of the polygon including points that are internal. However, this approach requires analyzing all of the nodes inside the polygon and as such would be very computationally intensive while providing no guarantee that the correct shape will be created.

Another approach is to create the polygon based on the rules described above, but then intersect it with the polygons of the natural features. This will achieve a better looking range projection polygon, but might still be incorrect. The polygon should display a driving range and border points should signify places where the user can reach with a vehicle. If a natural feature polygon is used however, the nearest roads could be quite far from the range projection border, because the clipping is done against the natural feature borders not the actual roads. Clipping polygons could also be quite computationally intensive operation and might not execute fast enough on certain devices.

A better solution for the above problem is to mark nodes or links that border restricted areas with a special flag. When the flag is set and the basic range projection algorithm described above reaches such a node or link the point is automatically included in the terminal steps list (and, potentially, in a range projection polygon). The flag may utilize one bit and may not increase the overall database size dramatically or at all. The range projection algorithm may thus be kept simple and efficient by requiring only a simple check for the special flag to determine if the link should be added to the projection polygon.

Figure 29:
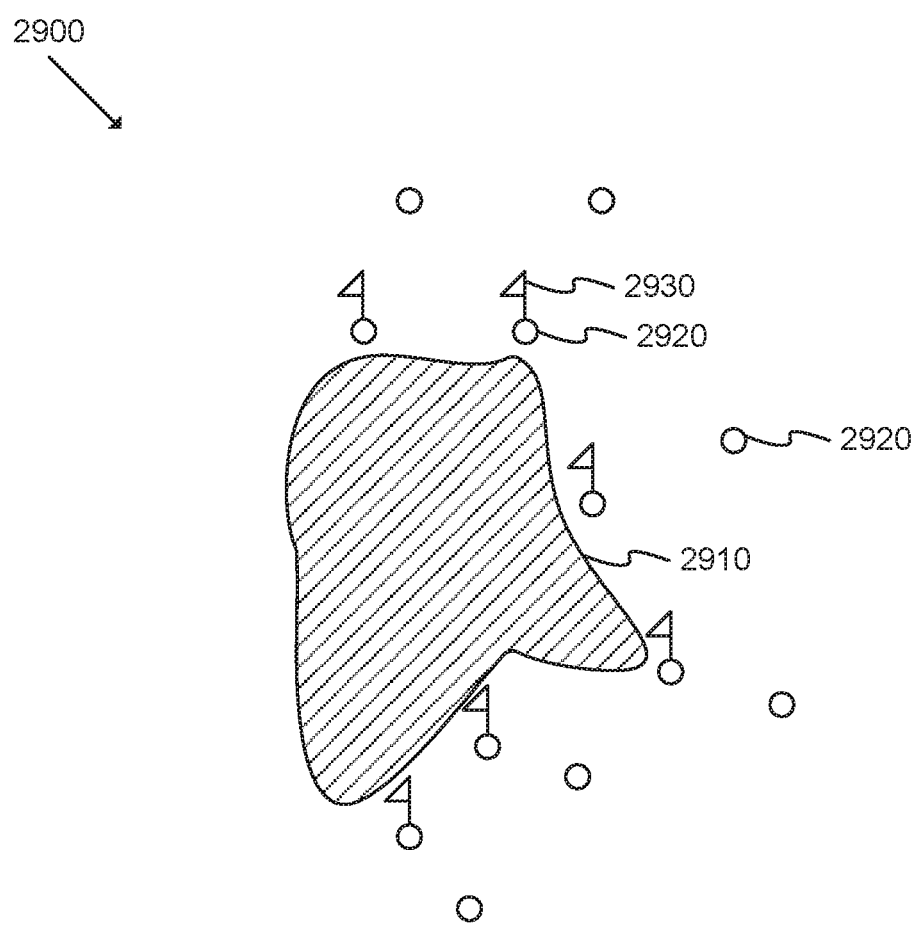
FIG. 29 illustrates a conceptual map view associated with restricted area handling in some embodiments.

FIG. 29 illustrates a conceptual map view 2900 associated with restricted area handling in some embodiments. As shown, a restricted area 2910 may be surrounded by various nodes 2920. Nodes or links of the closest roads may include a flag or other appropriate indicator 2930 such that the nodes (or links) of the closest roads to the restricted area are identified. Such indicators are shown for example purposes, and in actual implementations may be a flag or other data element that may not be visible on any display. In some embodiments the flagged nodes may thus define a border around the restricted area.

Figure 30:
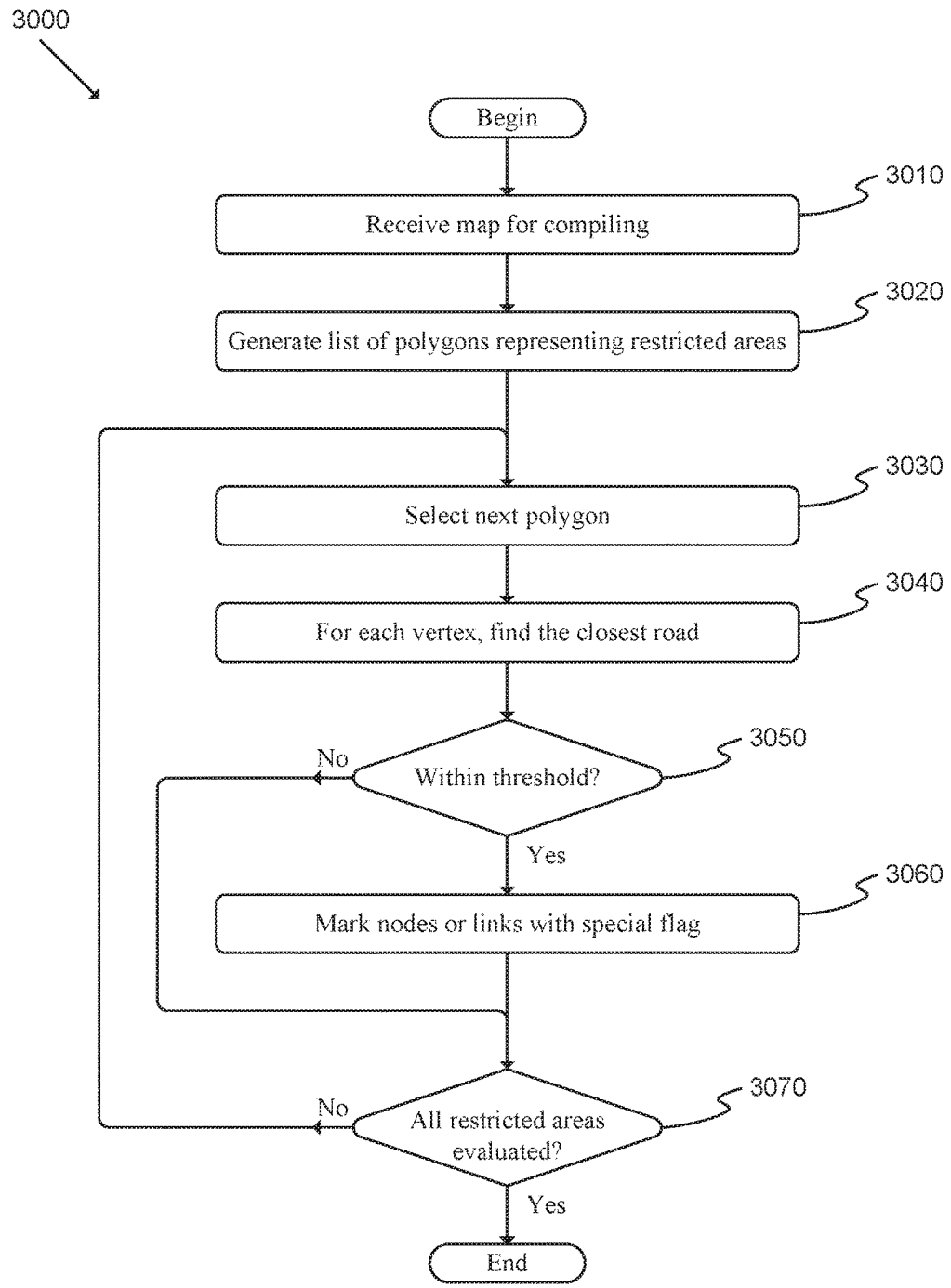
FIG. 30 illustrates a flow chart of a conceptual process used by some embodiments to identify restricted areas within a map area and mark roads that bound such areas.

FIG. 30 illustrates a flow chart of a conceptual process 3000 used by some embodiments to identify restricted areas within a map area and mark roads that bound such areas. Such a process may begin, for instance, when map data associated with some embodiments is generated and/or accessed.

As shown, the process may receive (at 3010) map data to be compiled. Next, the process may generate (at 3020) a list of polygons representing restricting areas (e.g., bays, lakes, oceans, military bases, parks, etc.) within the geographic area defined by the received map data. Such a list may be generated based at least partly on various nodes, flags, features, and/or other elements of the received map data, various parameters (e.g., user preferences, precision of the map data, etc.), and/or other appropriate factors (e.g., the list may only include restricted areas greater than a threshold size, may only include certain types of restricted areas, etc.).

Next, the process may select (at 3030) the next polygon in the list. Process 3000 may then iteratively, for each vertex in the polygon, find the closest road (as defined by a set of nodes and/or a set of shape points) to the vertex. Such closes roads may be identified, for instance, by performing an initial search using a bounding rectangle associated with each polygon to quickly find the close roads. Then, the closest road to each vertex of the polygon may be identified.

The process may then determine (at 3050) whether each identified closest road is within a threshold distance (and/or conforms to other appropriate evaluation criteria). Such a distance may be defined according to a system default value, user preference, and/or other appropriate factors and/or parameters. If the process determines that the road is within the threshold distance the process may mark (at 3060), with a special flag, the node (or links) associated with the road section. After marking the closest road section or after determining (at 3050) that the closest road is outside the threshold, the process may determine (at 3070) whether all restricted areas (or polygons) have been evaluated.

If the process determines (at 3070) that all restricted areas have been evaluated, the process may end. Alternatively, if the process determines that all restricted areas have not been evaluated, the process may repeat operations 3030-3070 until the process determines (at 3070) that all restricted areas have been evaluated and then ends.

As a result of such evaluation, the map database(s) of some embodiments may include links and/or nodes that surround restricted areas marked with a special flag, and the various range projection algorithms may create much more detailed polygons that follow only the correct roads. For a more accurate range projection polygon even the shape points of the roads (not only nodes) may be evaluated. This could be done for any shape points between two links with the special flag set. However, more efficiency may be achieved by using only the nodes to keep the overall polygon point count lower, which should still yield an acceptable visual effect.

In some embodiments, a direction attribute may be associated with each identified restricted area point (e.g., each point marked with the special flag). The direction may indicate a relative location of the restricted area with respect to the point. For instance, the restricted area may be assumed to be on one side of the vector defined by each point and associated direction (e.g., the left side of the vector, rotated counter-clockwise ninety degrees from the vector, etc.). In this way, a process such as process 3000 may ensure that every restricted point is part of a range polygon (i.e., not be located inside the polygon) and be positioned such that the vector of the other restricted area points is not crossed by the polygon.

One of ordinary skill in the art will recognize that while process 3000 has been described with reference to various specific details, the process may be implemented in various different ways without departing from the spirit of the invention. For instance, various operations may be omitted in some embodiments and/or various other operations may be added in some embodiments. As another example, different embodiments may perform the operations different orders. As yet another example, the process may be divided into a set of sub-processes and/or be included as a sub-process in a macro process. In addition, different embodiments may perform the process based at least partly on various criteria (e.g., at each request received, continuously, at regular intervals, etc.).

Figure 31:
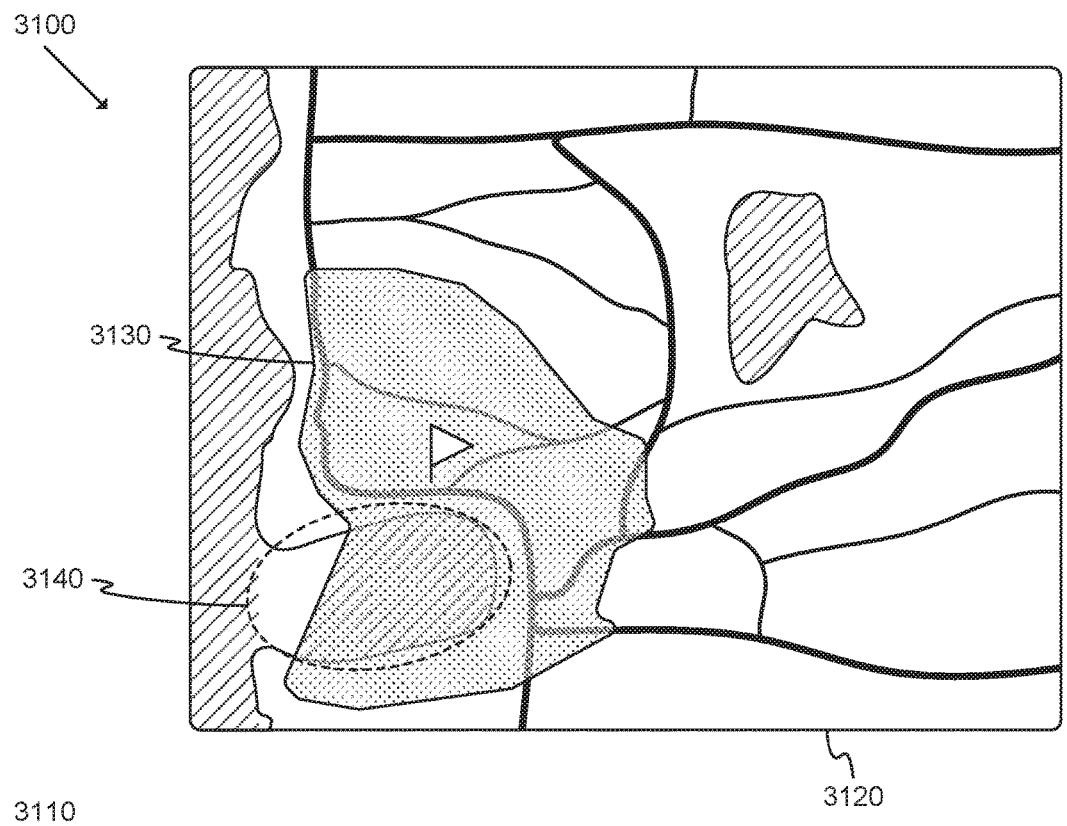
FIG. 31 illustrates example GUIs of some embodiments representing the input and output of the process of FIG. 30.
Figure 31:
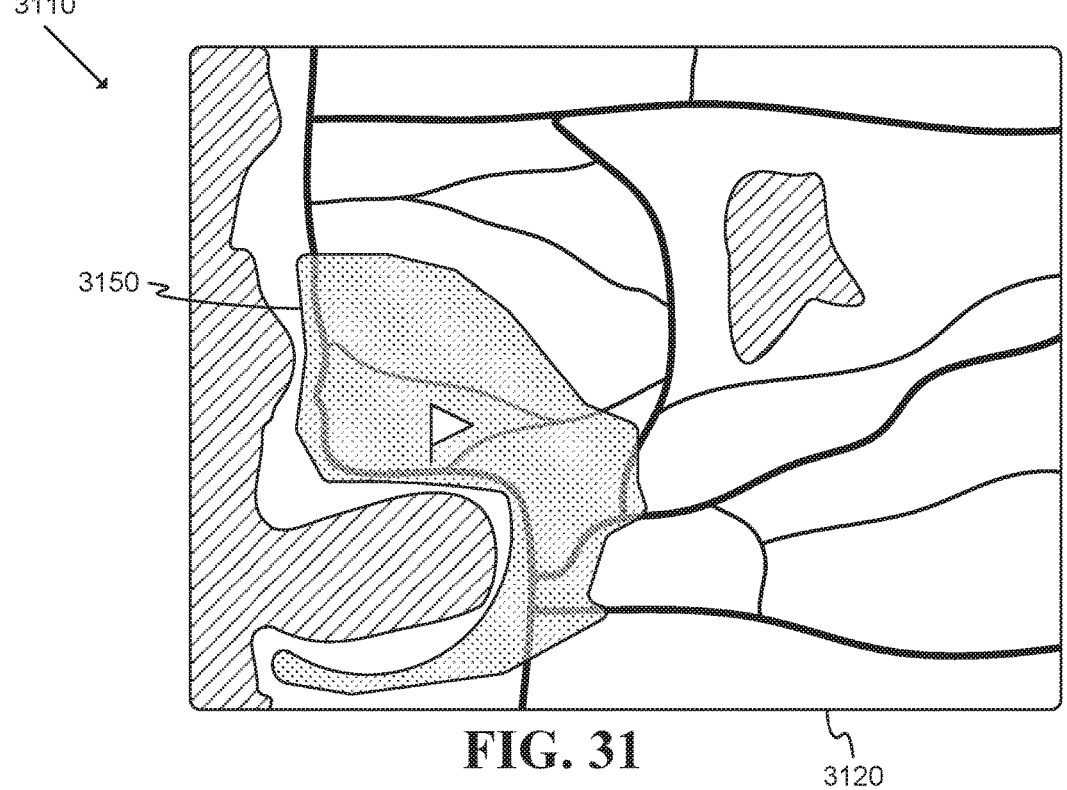

FIG. 31 illustrates example GUIs 3100-3110 of some embodiments representing the input and output of process 3000 (and/or other appropriate processes). The first GUI 3100 includes a displayed map section 3120 and a projection polygon 3130 that overlaps a section 3140 of a restricted area (in this example the restricted area may be an ocean inlet or bay).

The second GUI 3110 includes the same displayed map section 3120 and a polygon projection 3150 that has been modified such that it no longer overlaps the restricted area.

One of ordinary skill in the art will recognize that GUI 3100 may be implemented in various different ways without departing from the spirit of the invention. For instance, different embodiments may include different specific display elements. As another example, different embodiments may use different colors, line styles, and/or other features to distinguish among various items.

H. Map Data Caching and Retrieval

Figure 32:
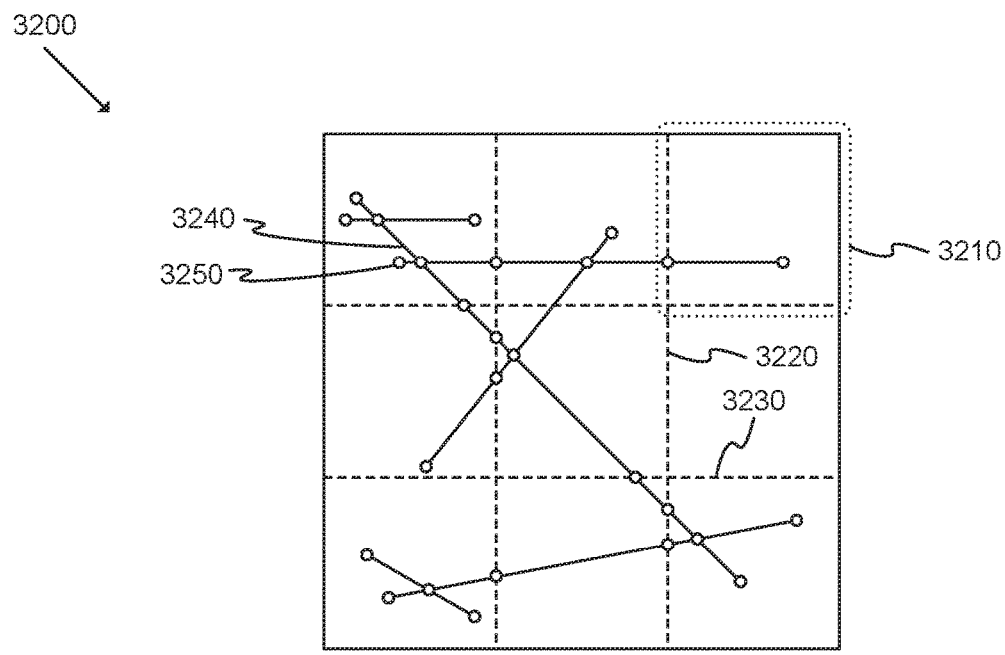
FIG. 32 illustrates a graphical representation of a map area divided into sections (or "tiles") that may be used to facilitate efficient data usage and access.

FIG. 32 illustrates a graphical representation of a map area 3200 divided into sections (or "tiles") 3210 that may be used to facilitate efficient data usage and access.

As shown, the map area 3200 may typically be represented as a rectangle, as it may be displayed to a user (e.g., using a vehicle head unit, a smartphone, etc.). The map area may be divided into sub-sections 3210 by a conceptual set of vertical 3220 and horizontal 3230 lines. Different embodiments may divide the area 3200 such that the tiles 3210 are appropriately sized for evaluation (e.g., the tiles may be sized such that the included data may be loaded into a memory of the device being used, the tiles may be sized based on the dimensions and features of the terrain depicted in the map area 3200, etc.). Different embodiments may include different numbers of dividing lines, different numbers of resulting tiles, differently shaped rectangles (e.g., rectangles with greater width than height, rectangles with grater height than width, or squares).

Within each tile 3210, each link 3240 may be defined such that a node 3250 is created at each tile defining line 3220-3230. In this way, each link is completely included in a single tile 3210, as shown. Thus, if a projection algorithm requires some map data, the entire tile may be loaded such that nearby links are available for analysis without reloading data. In addition, some embodiments may automatically load adjacent tiles when data is requested (such "adjacent" tiles may include tiles that are next to the requested tile, tiles within a range of tiles, etc.).

One of ordinary skill in the art will recognize that the representations of FIG. 32 are conceptual in nature and may be implemented in various different ways without departing from the spirit of the invention. For instance, different embodiments may divide a map area into different numbers of rows and columns.

Figure 33:
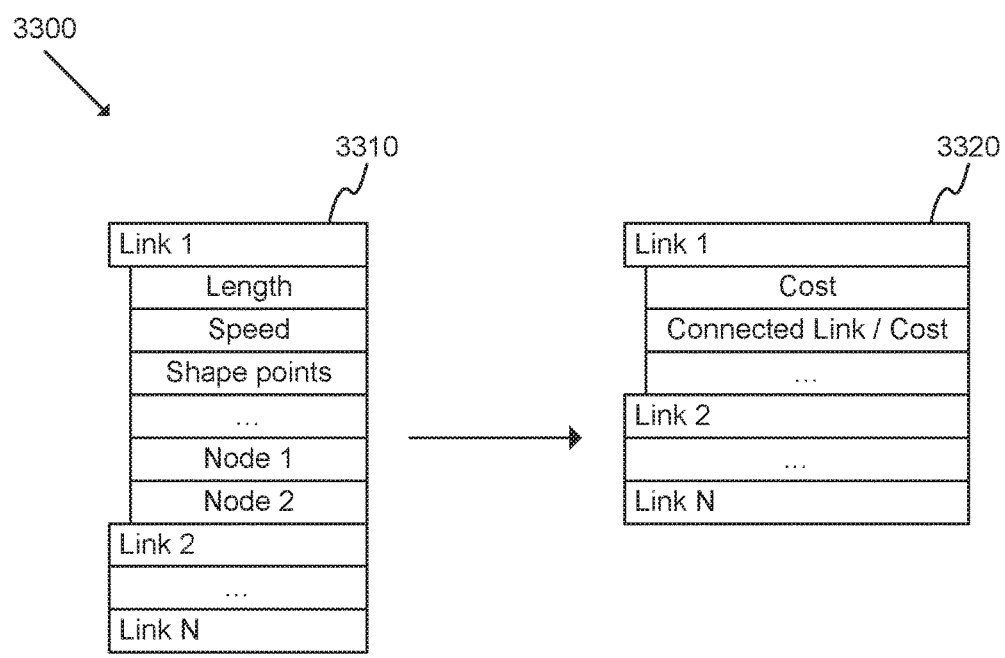
FIG. 33 illustrates a data structure diagram that may be used to cache map data such that the data requires a smaller amount of memory.

FIG. 33 illustrates a data structure diagram 3300 that may be used to cache map data such that the data requires a smaller amount of memory. As shown, a typical link data element 3310 may include various sub-elements (e.g., length or distance, speed, shape points, a begin node, an end node, street name, etc.). A map region (e.g., a tile) may include various numbers of links (or no links), each having associated sub-elements.

Data element 3320 represents an optimized data element. In this example, each link includes only a cost for the link, and a listing of connected links (and associated cost to transfer to the connected link). In this way, the data associated with each link may be optimized for use in projection or route calculation algorithms of some embodiments. Such optimization may allow larger map areas to be loaded to memory and analyzed in an efficient way with having to delete and reload data as space is required (e.g., random-access memory (RAM), cache, etc.).

In some embodiments, the original data element 3310 and the optimized data element 3320 may include a listing of the links associated with a single tile. In this way, when a tile is loaded, all the links associated with the tile may be loaded at once.

One of ordinary skill in the art will recognize that the representations of FIG. 33 are conceptual in nature and may be implemented in various different ways without departing from the spirit of the invention. For instance, different embodiments may include different specific sub-elements associated with each link.

Figure 34:
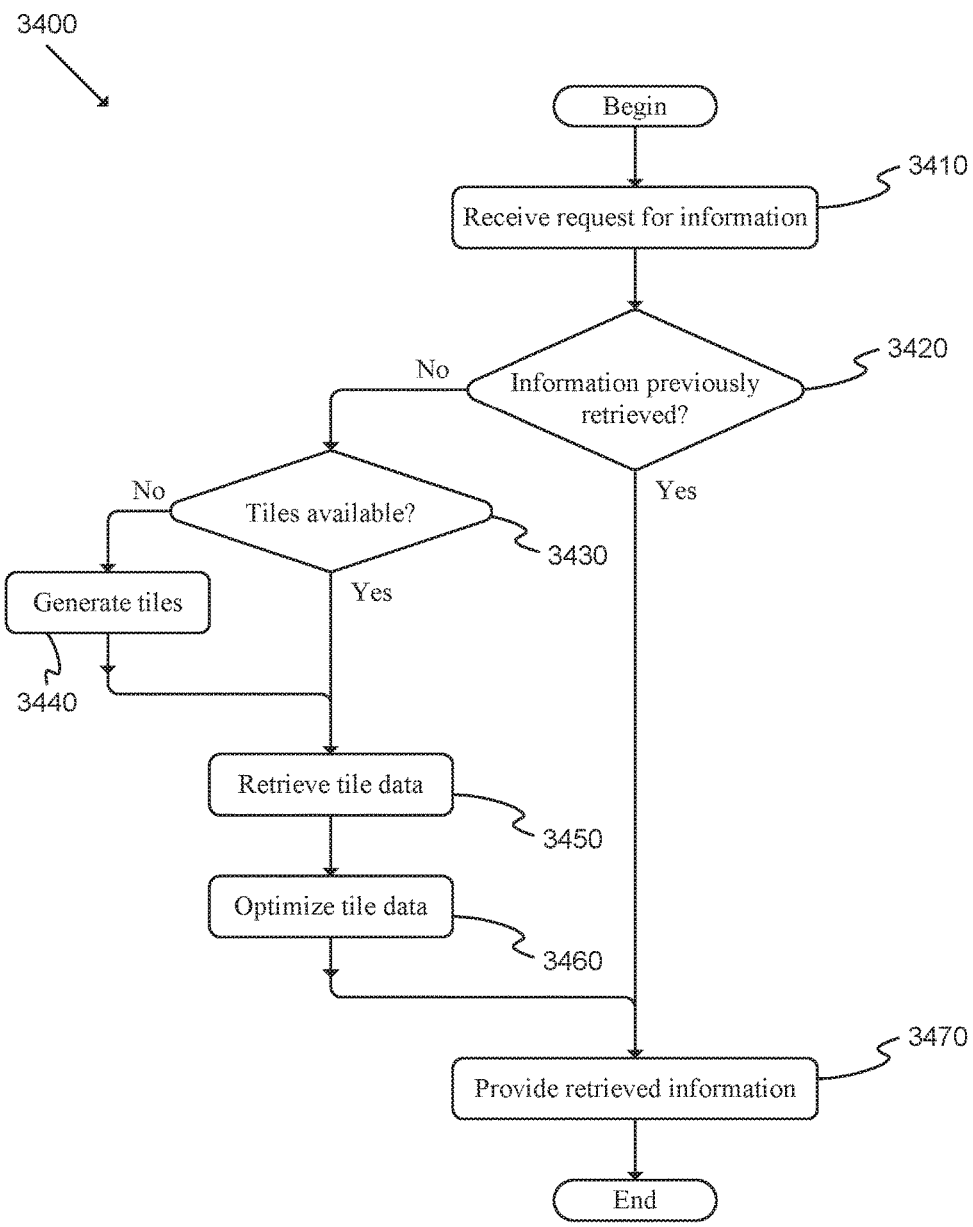
FIG. 34 illustrates a flow chart of a process used by some embodiments to optimize the retrieval and use of map data.

FIG. 34 illustrates a flow chart of a process 3400 used by some embodiments to optimize the retrieval and use of map data. In some embodiments, process 3400 may be implemented using optimized hardware and/or software (e.g., a physical and/or virtual cache may be used to store database information for quick retrieval). Such a process may begin, for instance, when a range finder application of some embodiments is launched.

Next, the process may receive (at 3410) a request for information. Such a request may be received in various appropriate ways and may be based on various appropriate criteria (e.g., an application may determine a current position using one or more appropriate elements and then request map information for an area surrounding the current position).

The process may then determine (at 3420) whether the requested information has been previously retrieved from storage. For instance, in some embodiments, the process may determine whether the requested information has been previously stored in RAM.

If process 3400 determines (at 3420) that the requested information has not been previously retrieved, the process may determine (at 3430) whether there are tiles available to load. In some embodiments, such tiles may include information for links that are near the requested link(s) and that may be structured such that all associated information is included in a set of data. If the process determines that tiles are, the process may generate (at 3440) tiles. Generation of tiles may include dividing a map area into sections as described above in reference to FIG. 32. Alternatively, if the process determines (at 3430) that tiles are already available, the process may retrieve (at 3450) the set(s) of associated information.

After retrieving (at 3450) the information, the process may optimize (at 3460) the retrieved information. Such optimization may be achieved as described above in reference to FIG. 33. In some embodiments, the retrieved information may include a complete section of a map database (e.g., information in a map database associated with a geographic area such as North America).

After optimizing (at 3460) the retrieved information or after determining (at 3420) that the information had been retrieved previously, the process may provide (at 3470) the retrieved information. After providing (at 3470) the retrieved data, the process may end.

Some embodiments may load all available map data at startup (or when a map is loaded, or other appropriate time). In this way, when a projection is requested, the map data may have already been divided and optimized before retrieval.

One of ordinary skill in the art will recognize that while process 3400 has been described with reference to various specific details, the process may be implemented in various different ways without departing from the spirit of the invention. For instance, various operations may be omitted in some embodiments and/or various other operations may be added in some embodiments. As another example, different embodiments may perform the operations different orders. As yet another example, the process may be divided into a set of sub-processes and/or be included as a sub-process in a macro process. In addition, different embodiments may perform the process based at least partly on various criteria (e.g., at each request received, continuously, at regular intervals, etc.).

IV. Display Algorithms and Graphical User Interfaces

Figure 35:
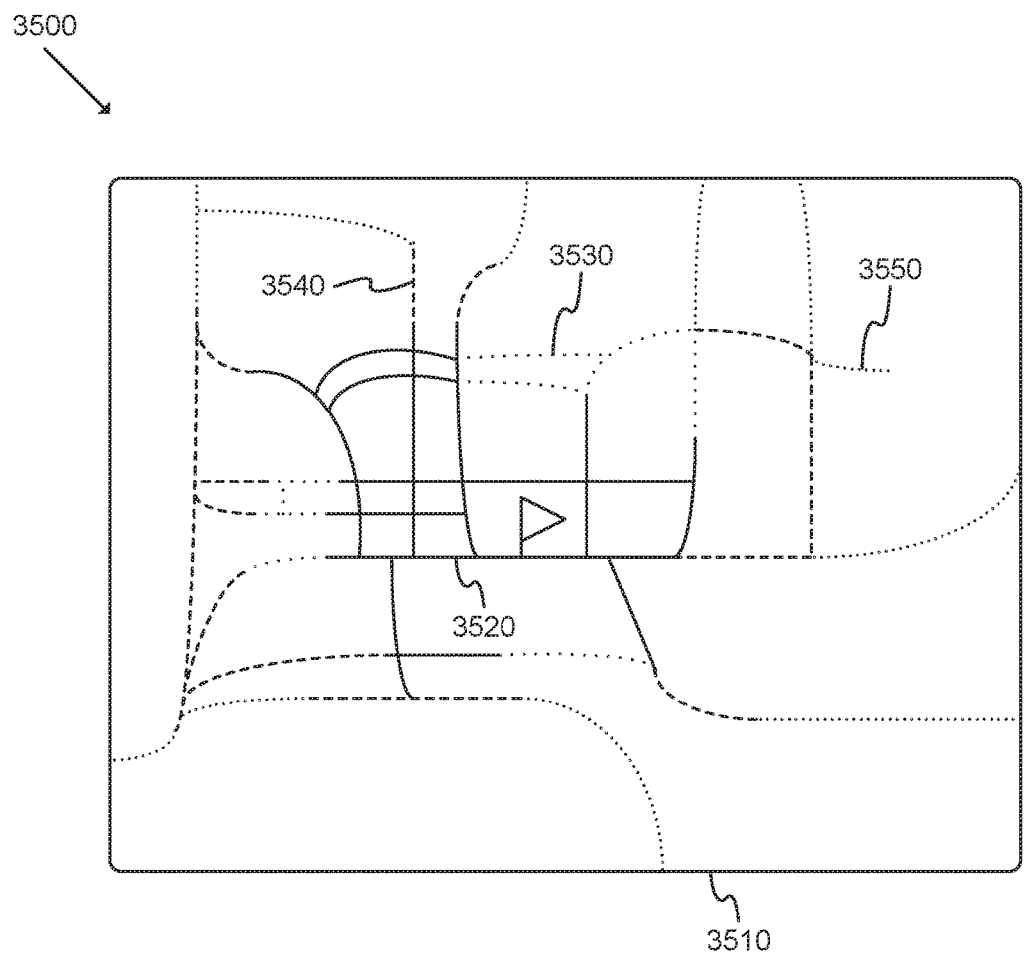
FIG. 35 illustrates an example GUI of some embodiments that displays a vehicle range using colored links.

FIG. 35 illustrates an example GUI 3500 of some embodiments that displays a vehicle range using colored links. Such a GUI may provide an intuitive user interface, where each link is displayed as a color and each color corresponds to a projection (e.g., a first color may be associated with links within a range that is based on twenty-five percent of available fuel, a second color may be associated with links within a range that is based on fifty percent of available fuel, etc.).

In this example, map area 3510 is displayed with various links having a first color 3520 (represented as a solid line in this example), various links having a second color 3530 (represented as a line with a first dash type in this example), various links having a third color 3540 (represented as a line with a second dash type in this example), and various links having a fourth color 3550 (represented as a line with a third dash type in this example).

Different embodiments may include different numbers of colors (and/or other appropriate representations such as different line thicknesses, line patterns, etc.) and may vary depending on the capabilities of a display device, user preference, default setting, and/or other appropriate criteria.

One of ordinary skill in the art will recognize that GUI 3500 may be implemented in various different ways without departing from the spirit of the invention. For instance, different embodiments may include different specific display elements. As another example, different embodiments may use different colors, line styles, and/or other features to distinguish among various items.

Figure 36:
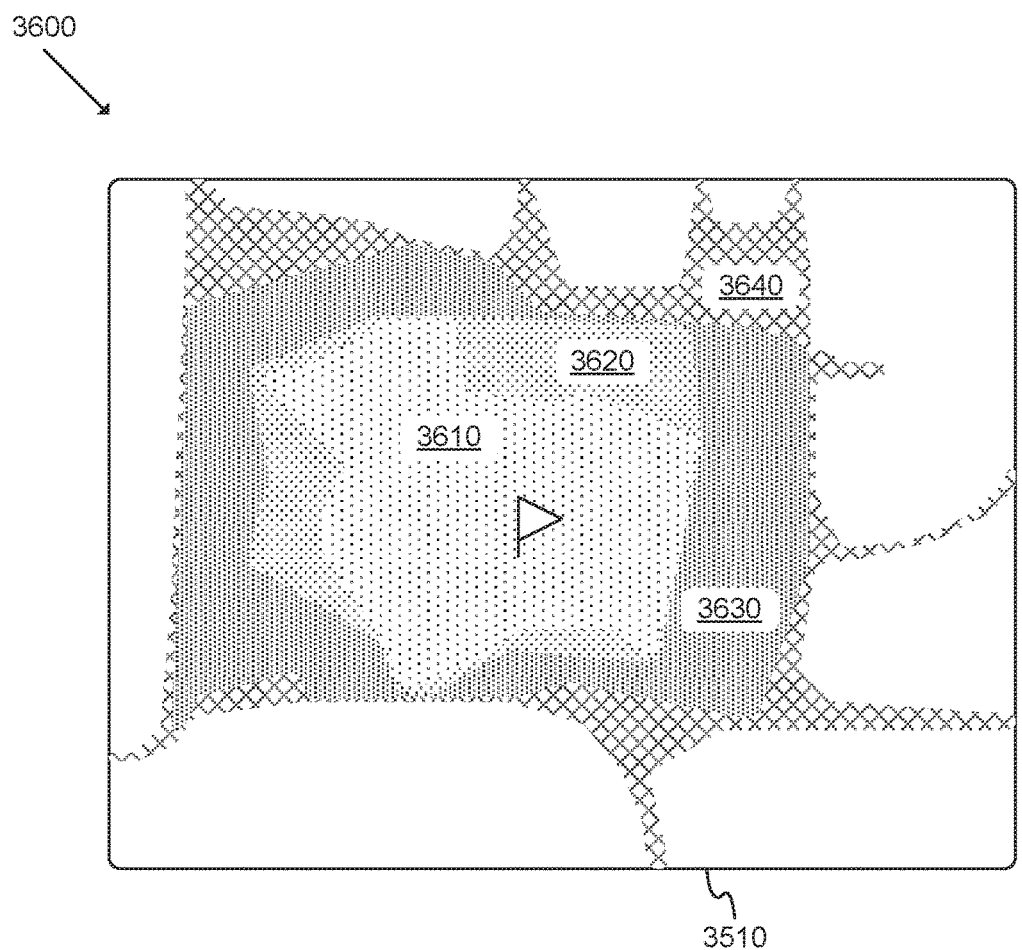
FIG. 36 illustrates an example GUI of some embodiments that displays a vehicle range using blended links.

FIG. 36 illustrates an example GUI 3600 of some embodiments that displays a vehicle range using blended links. In this example, map area 3510 is displayed with various a blended area having a first color 3610 (represented as a first fill type in this example), a blended area having a second color 3620 (represented as a second fill type in this example), a blended area having a third color 3630 (represented as a third fill type in this example), and a blended area having a fourth color 3640 (represented as a fourth fill type in this example).

Some embodiments may iterate through each pixel in the area 3510 to determine a blend color. Some pixels may be associated with links (e.g., the links of FIG. 35) that already have an associated color. For each pixel that does not have an associated color, some embodiments may determine the average color of neighboring pixels (that have assigned colors). Some embodiments may include a flag for each pixel indicating whether the color may be changed (e.g., whether the color has been generated using a blending algorithm or has been defined by a colored link).

One of ordinary skill in the art will recognize that GUI 3600 may be implemented in various different ways without departing from the spirit of the invention. For instance, different embodiments may include different specific display elements. As another example, different embodiments may use different colors, line styles, and/or other features to distinguish among various items.

V. Computer System

Many of the processes and modules described above may be implemented as software processes that are specified as at least one set of instructions recorded on a non-volatile storage medium. When these instructions are executed by one or more computational element(s) (e.g., microprocessors, microcontrollers, Digital Signal Processors (DSP), Application-Specific ICs (ASIC), Field Programmable Gate Arrays (FPGA), etc.) the instructions cause the computational element(s) to perform actions specified in the instructions.

Figure 37:
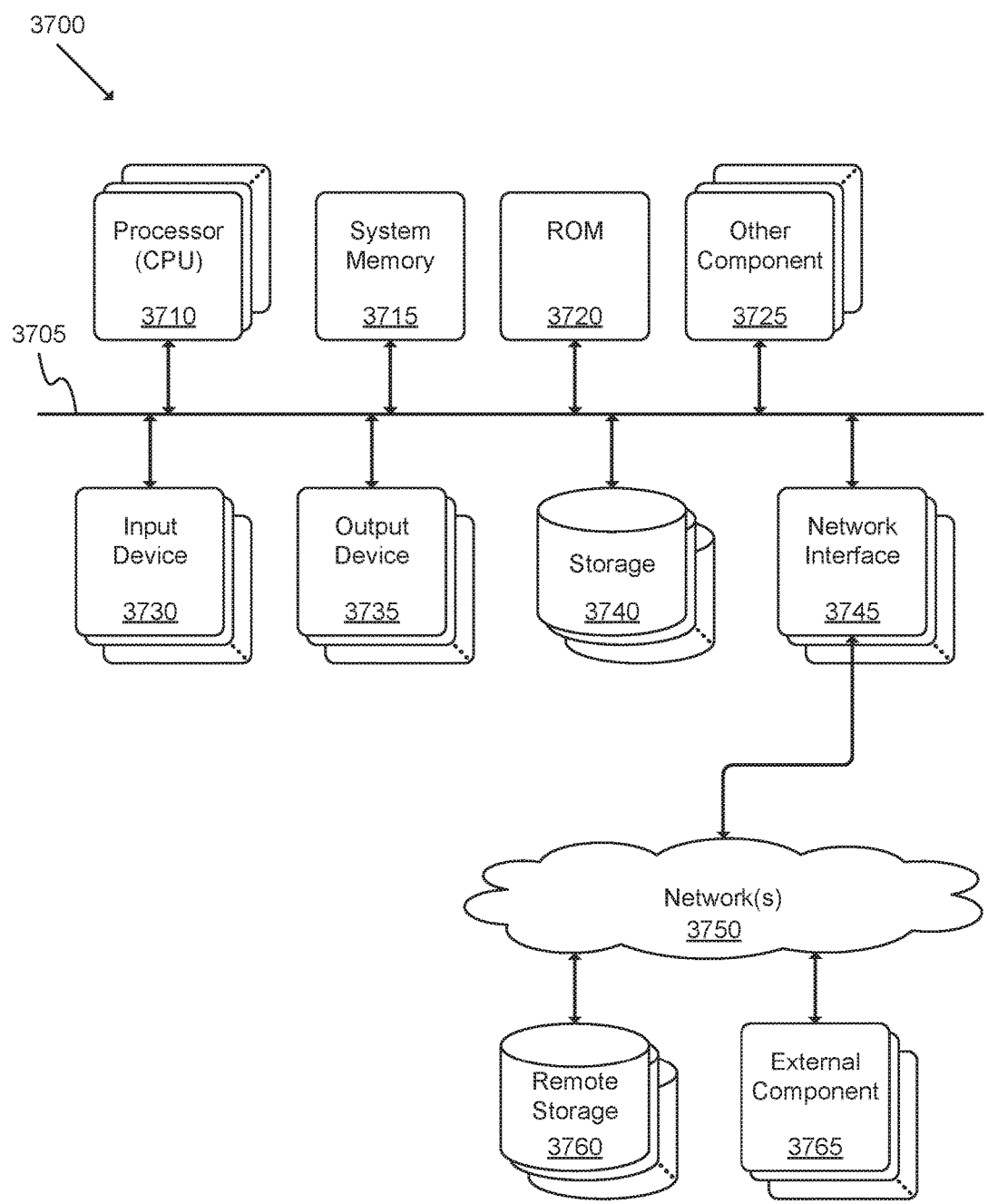
FIG. 37 conceptually illustrates a schematic block diagram of a computer system with which some embodiments of the invention may be implemented.

FIG. 37 conceptually illustrates a schematic block diagram of a computer system 3700 with which some embodiments of the invention may be implemented. For example, the systems described above in reference to FIGS. 1-3 and 9-12 may be at least partially implemented using computer system 3700 (alternatively, and/or in various combinations). As another example, the processes described in reference to FIGS. 16, 18, 20-22, 27, 30, and 34 may be at least partially implemented using sets of instructions that are executed using computer system 3700.

Computer system 3700 may be implemented using various appropriate devices. For instance, the computer system may be implemented using one or more personal computers (PC), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 3700 may include a bus 3705, at least one processing element 3710, a system memory 3715, a read-only memory (ROM) 3720, other components (e.g., a graphics processing unit) 3725, input devices 3730, output devices 3735, permanent storage devices 3740, and/or network interfaces 3745. The components of computer system 3700 may be electronic devices that automatically perform operations based on digital and/or analog input signals.

Bus 3705 represents all communication pathways among the elements of computer system 3700. Such pathways may include wired, wireless, optical, and/or other appropriate communication pathways. For example, input devices 3730 and/or output devices 3735 may be coupled to the system 3700 using a wireless connection protocol or system. The processor 3710 may, in order to execute the processes of some embodiments, retrieve instructions to execute and data to process from components such as system memory 3715, ROM 3720, and permanent storage device 3740. Such instructions and data may be passed over bus 3705.

ROM 3720 may store static data and instructions that may be used by processor 3710 and/or other elements of the computer system. Permanent storage device 3740 may be a read-and-write memory device. This device may be a non-volatile memory unit that stores instructions and data even when computer system 3700 is off or unpowered. Permanent storage device 3740 may include a mass-storage device (such as a magnetic or optical disk and its corresponding disk drive).

Computer system 3700 may use a removable storage device and/or a remote storage device as the permanent storage device. System memory 3715 may be a volatile read-and-write memory, such as a random access memory (RAM). The system memory may store some of the instructions and data that the processor uses at runtime. The sets of instructions and/or data used to implement some embodiments may be stored in the system memory 3715, the permanent storage device 3740, and/or the read-only memory 3720. Other components 3725 may perform various other functions. These functions may include interfacing with vehicle sensors.

Input devices 3730 may enable a user to communicate information to the computer system and/or manipulate various operations of the system. The input devices may include keyboards, cursor control devices, audio input devices, video input devices, steering wheel controls, rotary buttons, and/or other input devices. Output devices 3735 may include printers, displays, audio devices, tactile feedback devices, and/or other output devices. Some or all of the input and/or output devices may be wirelessly or optically connected to the computer system.

Finally, as shown in FIG. 37, computer system 3700 may be coupled to a network 3750 through a network interface 3745. For example, computer system 3700 may be coupled to a web server on the Internet such that a web browser executing on computer system 3700 may interact with the web server as a user interacts with an interface that operates in the web browser. In some embodiments, the network interface 3745 may include one or more APIs. The network interface and associated network(s) 3750 may allow the system 3700 to access various remote storages 3760 and/or other external components 3765 (e.g., third-party servers).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 3700 may be used in conjunction with the invention. Moreover, one of ordinary skill in the art will appreciate that many other system configurations may also be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the invention has been described with reference to numerous specific details, one of ordinary skill in the art will recognize that the invention can be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

I claim:

1. An automated method of caching map data for vehicle range projection using a computer system including a processor and a storage, the method comprising:
    retrieving, from the storage to the processor, data corresponding to an area of a map, wherein the retrieved data comprises a plurality of links and a plurality of nodes;
    dividing, at the processor, the area of the map into a set of tiles;
    associating, at the processor, a portion of the retrieved data with each tile in the set of tiles;
    evaluating, at the processor, each particular link in the plurality of links to determine whether the particular link spans multiple tiles from the set of tiles; and
    dividing, at the processor, the particular link into at least two sub-links if the particular link spans multiple tiles by adding a node at each point the particular link crosses a boundary between two tiles.

2. The automated method of claim 1, wherein each tile in the set of tiles is a same size as each other tile in the set.

3. The automated method of claim 1, wherein each link in the plurality of links comprises a set of fixed attributes including at least one of a length and a speed, a plurality of shape points, and a set of connected nodes.

4. The automated method of claim 3 further comprising compressing, at the processor, the retrieved data by determining a plurality of costs for each link in the plurality of links and a set of connected links for each link in the plurality of links and generating, for each tile in the set of tiles, an optimized tile including the plurality of costs and the set of connected links.

5. An automated method of retrieving map data for vehicle range projection using a computer system including a processor and a storage, the method comprising:
    receiving, at the processor, a request for data corresponding to an area of a map;
    identifying, at the processor, a set of tiles associated with the area of the map;
    retrieving, from the storage to the processor, tile data including a plurality of links and a plurality of nodes for the set of tiles, wherein each link from the plurality of links comprises a link cost and each node from the plurality of nodes comprises a transfer cost; and
    providing, from the processor, the retrieved tile data.

6. The automated method of claim 5, wherein each link in the plurality of links comprises a set of fixed attributes including at least one of a length and a speed, a plurality of shape points, and a set of connected nodes.

7. The automated method of claim 6 further comprising generating, at the processor, optimized tile data based on the retrieved tile data for the set of tiles.

8. The automated method of claim 7, wherein the optimized tile data comprises a plurality of optimized links, each optimized link from the plurality of optimized links comprising a plurality of link costs and at least one transfer cost associated with at least one connected link.

9. The automated method of claim 5, wherein each tile from the set of tiles is associated with a particular set of links from the plurality of links.

10. The automated method of claim 9, wherein each link from the plurality of links is associated with a pair of nodes.

11. The automated method of claim 5, wherein each link from the plurality of links is located within a particular tile from the set of tiles.

12. An automated method of optimizing map data for vehicle range projection using a computer system including a processor and a storage, the method comprising:
    retrieving, from the storage to the processor, map data;
    dividing, at the processor, the map data into a set of equally sized rectangular tiles; and
    generating, at the processor, a set of traversable links based on the retrieved map data, each traversable link in the set of traversable links located within a particular rectangular tile, and each traversable link in the set of traversable links comprising a traverse cost.

13. The automated method of claim 12, wherein each link in the set of traversable links comprises a set of fixed attributes including at least one of a length and a speed, a set of shape points, and a set of connected nodes.

14. The automated method of claim 13 further comprising generating, at the processor, an optimized link for each link in the set of traversable links.

15. The automated method of claim 14, wherein each optimized link consists of a plurality of link costs, at least one connected link, and a transfer cost for each connected link.

16. The automated method of claim 15 further comprising storing, from the processor to the storage, the optimized link data.

17. The automated method of claim 13, wherein each shape point in the set of shape points comprises at least one of world coordinates, elevation, slope, curvature, and heading.

18. The automated method of claim 17, wherein the set of shape points comprises a starting node and an ending node.

* * * * *